(12) United States Patent
Kondo et al.

(10) Patent No.: US 9,967,593 B2
(45) Date of Patent: May 8, 2018

(54) IMAGE PROCESSING DEVICE AND METHOD

(75) Inventors: Kenji Kondo, Tokyo (JP); Junichi Tanaka, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 443 days.

(21) Appl. No.: 13/389,474

(22) PCT Filed: Aug. 10, 2010

(86) PCT No.: PCT/JP2010/063514
§ 371 (c)(1),
(2), (4) Date: Feb. 8, 2012

(87) PCT Pub. No.: WO2011/021530
PCT Pub. Date: Feb. 24, 2011

(65) Prior Publication Data
US 2012/0140820 A1   Jun. 7, 2012

(30) Foreign Application Priority Data

Aug. 19, 2009   (JP) .................................. 2009-189990

(51) Int. Cl.
  H04N 7/12       (2006.01)
  H04N 19/86      (2014.01)
  (Continued)

(52) U.S. Cl.
  CPC ........... *H04N 19/86* (2014.11); *H04N 19/117* (2014.11); *H04N 19/174* (2014.11);
  (Continued)

(58) Field of Classification Search
  CPC ................... H04N 19/00521; H04N 19/00781
  (Continued)

(56) References Cited

U.S. PATENT DOCUMENTS 6,285,717 B1 *   9/2001   Bahng et al. ............ 375/240.29
8,332,751 B2 *  12/2012   Sadovsky et al. ............ 715/254
(Continued)

FOREIGN PATENT DOCUMENTS

EP      2 136 563 A2    12/2009
JP    2003-319389 A     11/2003
(Continued)

OTHER PUBLICATIONS

U.S. Appl. No. 13/515,878, filed Jun. 14, 2012, Kondo.
(Continued)

*Primary Examiner* — Gims Philippe
(74) *Attorney, Agent, or Firm* — Oblon, McClelland, Maier & Neustadt, L.L.P.

(57) ABSTRACT

The present invention relates to an image processing device and method enabling deterioration in encoding efficiency to be suppressed.
A control information adding unit 184 embeds one picture worth of control information held in a control information holding unit 183 into a slice header of a predetermined slice, in encoded data held in an encoded data holding unit 182. For example, the control information adding unit 184 embeds one picture worth of control information in the slice header of the first-transmitted slice in the frame to be processed in the encoded data. The control information adding unit 184 outputs encoded data to which the control information has been added, in a predetermined order. The present invention can be applied to, for example, an image processing device.

10 Claims, 50 Drawing Sheets

(51) Int. Cl.
*H04N 19/176* (2014.01)
*H04N 19/70* (2014.01)
*H04N 19/46* (2014.01)
*H04N 19/61* (2014.01)
*H04N 19/117* (2014.01)
*H04N 19/174* (2014.01)
*H04N 19/82* (2014.01)

(52) U.S. Cl.
CPC ........... *H04N 19/176* (2014.11); *H04N 19/46* (2014.11); *H04N 19/61* (2014.11); *H04N 19/70* (2014.11); *H04N 19/82* (2014.11)

(58) Field of Classification Search
USPC .................. 375/240, 240.24, 240.29; 455/7; 370/355; 715/254
See application file for complete search history.

(56) References Cited

U.S. PATENT DOCUMENTS

| | | | |
|---|---|---|---|
| 2004/0062310 A1 | 4/2004 | Xue et al. | |
| 2004/0076237 A1 | 4/2004 | Kadono et al. | |
| 2004/0101059 A1* | 5/2004 | Joch | H04N 19/159 375/240.29 |
| 2006/0078052 A1* | 4/2006 | Dang | 375/240.24 |
| 2006/0093042 A1* | 5/2006 | Kashima et al. | 375/240.24 |
| 2006/0239360 A1 | 10/2006 | Kadono et al. | |
| 2007/0189392 A1 | 8/2007 | Tourapis et al. | |
| 2008/0031233 A1* | 2/2008 | Ito et al. | 370/355 |
| 2008/0049843 A1 | 2/2008 | Kadono et al. | |
| 2008/0069247 A1* | 3/2008 | He | H04N 19/865 375/240.29 |
| 2008/0130756 A1* | 6/2008 | Sekiguchi et al. | 375/240.24 |
| 2008/0130761 A1 | 6/2008 | Kadono et al. | |
| 2008/0137752 A1 | 6/2008 | He | |
| 2008/0137753 A1 | 6/2008 | He | |
| 2008/0310516 A1* | 12/2008 | Kobayashi | H04N 19/172 375/240.24 |
| 2009/0257664 A1* | 10/2009 | Kao | H04N 19/159 382/232 |
| 2009/0316793 A1 | 12/2009 | Yang et al. | |
| 2011/0229049 A1 | 5/2011 | Kondo | |
| 2011/0255602 A1 | 5/2011 | Kondo et al. | |
| 2011/0235711 A1 | 6/2011 | Kondo et al. | |
| 2011/0243234 A1 | 6/2011 | Kondo et al. | |
| 2013/0059527 A1* | 3/2013 | Hasesaka et al. | 455/7 |
| 2013/0259117 A1 | 10/2013 | Fu et al. | |

FOREIGN PATENT DOCUMENTS

| | | |
|---|---|---|
| JP | 2004 180248 | 6/2004 |
| JP | 2004-180248 A | 6/2004 |
| JP | 2007-129369 A | 5/2007 |
| JP | 2008-219938 A | 9/2008 |
| WO | WO 2005/093661 A2 | 10/2005 |
| WO | WO 2008/057308 A2 | 5/2008 |
| WO | WO 2011/140960 A1 | 11/2011 |

OTHER PUBLICATIONS

U.S. Appl. No. 13/514,354, filed Jun. 7, 2012, Kondo.
U.S. Appl. No. 13/515,467, filed Jun. 12, 2012, Kondo.
U.S. Appl. No. 13/520,384, filed Jul. 3, 2012, Kondo.
International Search Report dated Sep. 14, 2010 in PCT/JP10/063514 filed on Aug. 10, 2010.
Takeshi, et al., "Specification and experimental results of Quadtree-based Adaptive Loop Filter", ITU—Telecommunications Standardization Sector, Document: VCEG-AK22 (r1), ITU-T SG16, Q.6 VCEG, p. 1-11, Apr. 15, 2009.
Office Action dated Dec. 3, 2013 in Japanese Patent Application No. 2009-189990.
Extended European Search Report dated Dec. 20, 2013 in Patent Application No. 10809875.7.
Chinese Office Action dated May 29, 2014, in China Patent Application No. 201080045758.7 (with English translation).
Japanese Office Action dated Jul. 28, 2015, for Japanese Patent Application No. 2014-171516. (English translation only).
Office Action dated Feb. 25, 2016 in Japanese Patent Application No. 2014-171516.
Office Action datissued Mar. 31, 2016 in Korean Patent Application No. 10-2012-7003475 (with English language translation).
European Office Action dated Jul. 28, 2016 in corresponding European Application No. 10 809 875.7.
Takeshi Chujoh et al, "Specification and Experimental Results of Quadtree-based Adaptive Loop Filter", ITU—Telecommunications Standardization Sector, Document: (VCEG)AK22 (r1), Q.6/SG16 (VCEG), Apr. 15-18, 2009.
Korean Office Action dated Jan. 19, 2017 in Patent Application No. 10-2016-7032778 (with English translation).
Japanese Office Action dated Jun. 1, 2017 in Patent Application No. 2016-103227 (without English Translation).
Japanese Office Action dated Aug. 24, 2017 in Patent Application No. 2016-103227.
Notice of Preliminary Rejection issued in correspsnding Korean Applicatian No. 10-2017-7026908 dated Nov. 17, 2017 (with English translation).

\* cited by examiner

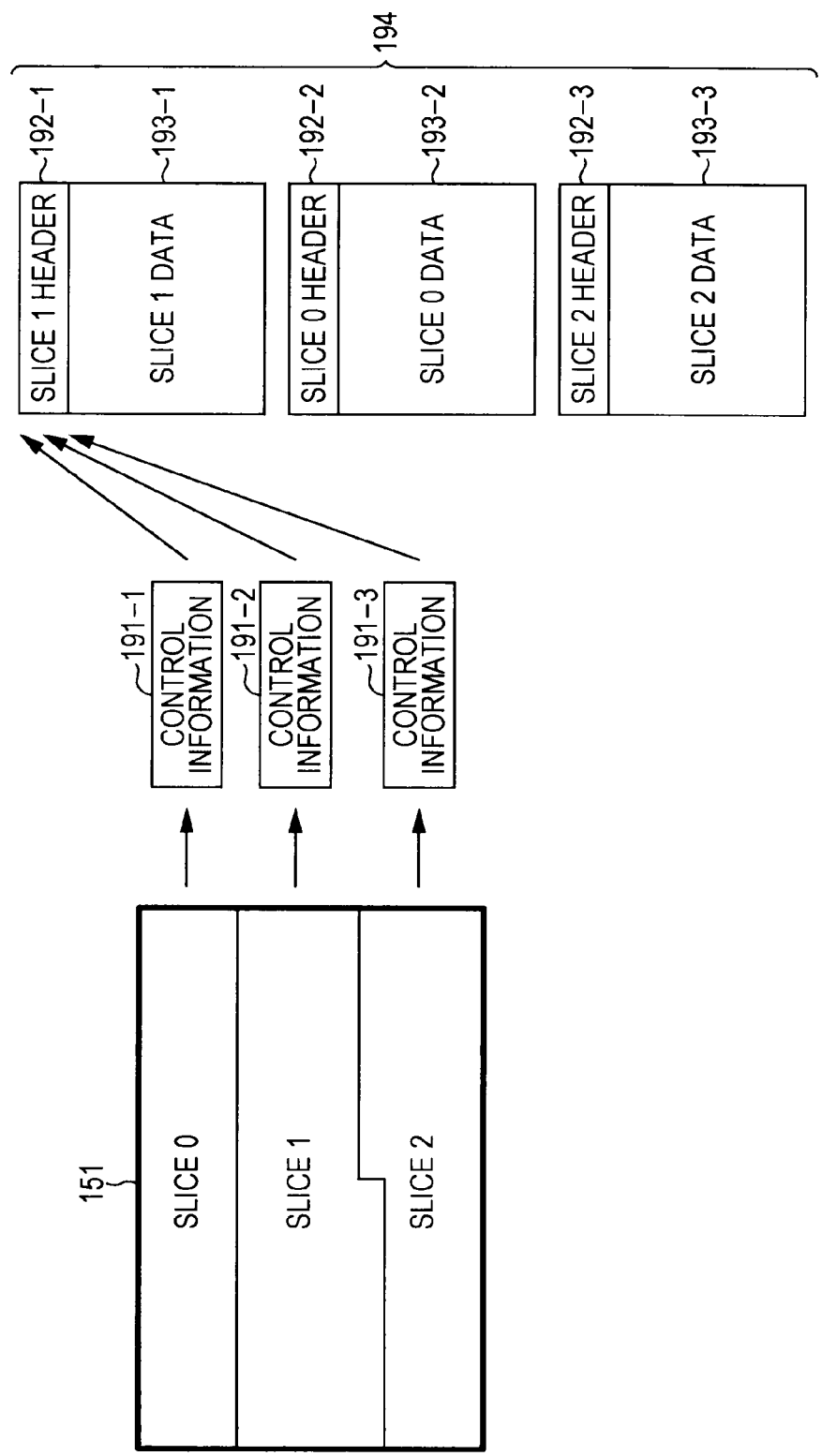

FIG. 12

| slice_header( ) { | Descriptor |
|---|---|
| first_mb_in_slice | ue(v) |
| ... | |
| if(first_mb_in_slice==0){ (OR PICTURE BOUNDARY) | |
| adaptive_loopfilter_flag | u(1) |
| while( !byte_aligned( ) ) { | |
| alignment_one_bit /* equal to 1 */ | u(1) |
| } | |
| } | |
| if(first_mb_in_slice==0){ (OR PICTURE BOUNDARY) | |
| if( adaptive_loopfilter_flag) { | |
| adaptive_loopfilter_data( ) | |
| } | |
| } | |
| } | |

A

| adaptive_loopfilter_data( ) { | Descriptor |
|---|---|
| pred_coef_mode | u(1) |
| alf_tap_size_luma | ue(v) |
| for(1=0; i < num_of_coeff_luma; i ++) { | |
| filter_coeff_luma[i] | se(v) |
| } | |

B

IMAGE PROCESSING DEVICE AND METHOD

TECHNICAL FIELD

The present invention relates to an image processing device and method, and specifically relates to an image processing device and method which enable suppression in deterioration of coding efficiency due to local control of filter processing when encoding or when decoding.

BACKGROUND ART

In recent years, there have come into widespread use devices, compliant to formats such as MPEG (Moving Picture Experts Group) or the like, which handle image information as digital signals, and take advantage of redundancy peculiar to the image information in order to perform highly effective information transmission and storage at that time, to compress the image by orthogonal transform such as discrete cosine transform or the like and motion compensation, as both information distribution such as broadcasting and information reception in general households.

In particular, MPEG2 (ISO (International Organization for Standardization)/IEC (International Electrotechnical Commission) 13818-2) is defined as a general-purpose image encoding format, and is a standard encompassing both of interlaced scanning images and sequential-scanning images, and standard resolution images and high definition images, and has widely been employed now by broad range of applications for professional usage and for consumer usage. By employing the MPEG2 compression format, a code amount (bit rate) of 4 through 8 Mbps is allocated in the event of an interlaced scanning image of standard resolution having 720×480 pixels, for example. Also, by employing the MPEG2 compression format, a code amount (bit rate) of 18 through 22 Mbps is allocated in the event of an interlaced scanning image of high resolution having 1920×1088 pixels, for example, whereby a high compression rate and excellent image quality can be realized.

With MPEG2, high image quality encoding adapted to broadcasting usage is principally taken as an object, but a lower code amount (bit rate) than the code amount of MPEG1, i.e., an encoding format having a higher compression rate is not handled. According to spread of personal digital assistants, it has been expected that needs for such an encoding format will be increased from now on, and in response to this, standardization of the MPEG4 encoding format has been performed. With regard to an image encoding format, the specification thereof was confirmed as international standard as ISO/IEC 14496-2 in December in 1998.

Further, in recent years, standardization of a standard called H.26L (ITU-T (ITU Telecommunication Standardization Sector) Q6/16 VCEG (Video Coding Experts Group)) has progressed, originally intended for image encoding for videoconferencing usage. With H.26L, it has been known that as compared to a conventional encoding format such as MPEG2 or MPEG4, though greater computation amount is requested for encoding and decoding thereof, higher encoding efficiency is realized. Also, currently, as part of activity of MPEG4, standardization for also taking advantage of functions not supported by H.26L with this H.26L taken as a base, to realize higher encoding efficiency, has been performed as Joint Model of Enhanced-Compression Video Coding. As a schedule of standardization, H.264 and MPEG-4 Part10 (AVC (Advanced Video Coding)) become an international standard in March, 2003.

Also, there is adaptive loop filter (ALF (Adaptive Loop Filter)) as a next generation video encoding technique which is being considered as of recent (see NPL 1 for example). According to this adaptive loop filter, optimal filter processing is performed each frame, and block noise which was not completely removed at the deblocking filter, and noise due to quantization, can be reduced.

However, images generally have various features locally, so optimal filter coefficients are locally different. With the method described in NPL 1, the same filter coefficient is applied to all pixels within one frame, so the image quality of the overall frame improves, but there has been the concern that there may be local deterioration.

Accordingly, there has been conceived not performing filter processing in regions which locally deteriorate (see NPL 2 and NPL 3, for example). In this case, the image encoding device corresponds multiple control blocks arrayed without gaps as if they were being used for paving, with regions of the image, and controls whether or not to perform filter processing on the image for each control block. The image encoding device sets flag information for each block, and performs adaptive filter processing according to the flag information. In the same way, the image decoding device also performs adaptive filter processing based on the flag information.

In this case, control information (ALF control information) such as control block size, flag information of various control blocks, and filter coefficient information and the number of filter TAPs of the adaptive filter processing and so forth need to be included in the encoded data, so as to enable executing adaptive filter processing to be performed when decoding that is the same as that when encoding.

The ALF control information herein often changes with every picture, whereby the general thought is to include in a picture parameter set (PPS (Picture Parameter Set)) or sequence parameter set (SPS (Sequence Parameter Set)). However, when including ALF control information in these PPS and SPS, ALF such as pic_order_present_flag, num_ref_idx_10_active_minus1, profile_idc, and level_idc, may include unnecessary bits in the image compression information since information with no direct correlation is added, thereby worsening the coding efficiency from the overhead thereof.

Also, even in a case of creating an independent NAL (Network Abstraction Layer) unit and removing the above-mentioned unnecessary information, start code, nal_ref_idc, and nal_unit_type become necessary, and the overhead thereof may worsen the coding efficiency.

In order to avoid such problems, including the ALF control information in the slice header has been proposed (for example, see NPL 4). Also, a method to place pointer information indicating the location of ALF control information without placing the ALF control information in the slice header has also been proposed (for example, see NPL 5).

CITATION LIST

Non Patent Literature

NPL 1: Yi-Jen Chiu and L. Xu, "Adaptive (Wiener) Filter for Video Compression," ITU-T SG16 Contribution, C437, Geneva, April 2008.

NPL 2: Takeshi. Chujoh, et al., "Block-based Adaptive Loop Filter" ITU-T SG16 Q6 VCEG Contribution, AI18, Germany, July, 2008

NPL 3: T. Chujoh, N. Wada and G. Yasuda, "Quadtree-based Adaptive Loop Filter," ITU-T SG16 Q6 VCEG Contribution, VCEG-AK22(r1), Japan, April, 2009

NPL 4: Takeshi. Chujoh, et al., "Improvement of Block-based Adaptive Loop Filter" ITU-T SG16 Q6 VCEG Contribution, AJ13, San Diego, October, 2008

NPL 5: Yu-Wen Huang, et al., "Adaptive Quadtree-based Multi-reference Loop Filter", ITU-T SG16 Q6 VCEG Contribution, AK24, Yokohama Japan, April, 2009

SUMMARY OF INVENTION

Technical Problem

Now, there is a method in which one frame is divided into multiple slices, and encoding processing and decoding processing of the image is performed for each such slice (multi-slice). Dividing a frame into multiple slice regions is an effective method for increasing the error resistance of image controlled information during transfer.

However, NPL 2 through NPL 5 only describe simply setting blocks for an entire one frame, and generating and transmitting flag information for all blocks, so there is no description regarding processing of flag information in the case of such multi-slice, and it has been unclear how to generate and use flag information.

Accordingly, in the case of the method described in the Non Patent Literature, the image encoding device generates, for each slice, flag information for all blocks within the frame, and there has been concern that encoding efficiency might deteriorate due to unnecessary flag information and so forth.

Also, as described above, NPL 4 proposes including ALF control information is the slice header, but in the case of multi-slice, with an arrangement where multi-slice where ALF control information generated for each slice is to be included in each slice header of the encoded data, there has been concern that there would occur portions among multiple ALF control information with redundant content. That is to say, there has been concern that the encoding efficiency would be unnecessarily deteriorated.

This is also the same with the case of placing a pointer in the slice header as described in NPL 5, as in the case of placing pointers in multiple slice headers, this means including redundant information in the encoded data, and there has been concern that the encoding efficiency would be unnecessarily deteriorated.

The present invention has been proposed in light of this situation, and it is an object thereof to suppress deterioration of encoding efficiency due to local control of filter processing when encoding or when decoding.

Solution to Problem

One aspect of the present invention is an image processing device including: control information generating means configured to generate filter control information, to control filter processing locally performed as to an image for each region of a control block; filter means configured to perform the filter processing as to the image, following the filter control information generated by the control information generating means; and control information adding means configured to add, to header information for each predetermined data increment of encoded data of which the image has been encoded, the filter control information corresponding to a plurality of the data increments of a frame to which the header information belongs.

The control information adding means may add the filter control information to header information of a data increment first transmitted of the frame.

The control information adding means may add the filter control information to header information of a data increment situated at the start of the frame.

The control information adding means may add the filter control information corresponding to the entire frame, to the header information.

The control information adding means may add, to each of a plurality of the header information within the frame, the filter control information corresponding to a plurality of the data increments which are mutually different.

The image processing device may further include setting means configured to set the number of the header information within the frame, to which the filter control information is to be added.

The control information adding means may add, to the header information, a pointer indicating the position of the filter control information added to the encoded data.

The data increment may be a slice, of which a plurality are formed within the frame.

The control information may include a filter coefficient of the filter processing, a block size indicating the size of the region of the control block, and a flag indicating whether or not to perform the filter processing for each region of the control block.

The image processing device may further include encoding means configured to encode an image generated using the image regarding which the filter processing has been performed by the filtering means, with the control information adding means adding the filter control information to the header information of the encoded data generated by encoding at the encoding means.

An aspect of the present invention is also an image processing method, wherein control information generating means of an image processing device generate filter control information, to control filter processing locally performed as to an image for each region of a control block, filter means of the image processing device perform the filter processing as to the image, following the generated filter control information, and control information adding means of the image processing device add, to header information for each predetermined data increment of encoded data of which the image has been encoded, the filter control information corresponding to a plurality of the data increments of a frame to which the header information belongs.

Another aspect of the present invention is an image processing device including: control information extracting means configured to extract filter control information, which has been added to header information for each predetermined data increment of encoded data of which an image has been encoded, so as to control filter processing locally performed as to the image of each region of a control block, corresponding to a plurality of the data increments; and filtering means configured to perform filter processing as to the image regarding which the encoded data has been decoded, following the filter control information extracted by the control information extracting means.

The image processing device may further include decoding means configured to decode the encoded data, with the filtering means performing the filter processing as to the image obtained by the encoded data being decoded by the decoding means.

Another aspect of the present invention is an image processing method, wherein control information extracting means of an image processing device extract filter control information, which has been added to header information for each predetermined data increment of encoded data of which an image has been encoded, so as to control filter processing locally performed as to the image of each region of a control block, corresponding to a plurality of the data increments, and filtering means of the image processing device perform filter processing as to the image regarding which the encoded data has been decoded, following the extracted filter control information.

According to an aspect of the present invention, filter control information is generated to control filter processing locally performed as to an image for each region of a control block, filter processing is performed as to the image following the generated filter control information, and the filter control information corresponding to a plurality of the data increments of a frame to which the header information belongs is added to header information for each predetermined data increment of encoded data of which the image has been encoded.

According to another aspect of the present invention filter control information is extracted, which has been added to header information for each predetermined data increment of encoded data of which an image has been encoded, so as to control filter processing locally performed as to the image of each region of a control block, corresponding to a plurality of the data increments, and filter processing is performed as to the image regarding which the encoded data has been decoded following the filter control information extracted by the control information extracting means.

Advantageous Effects of Invention

According to the present invention, an image can be encoded or decoded. Particularly, deterioration of coding efficiency due to local control of filter processing when encoding or decoding can be suppressed even further. For example, the deterioration in coding efficiency can be suppressed even in case of performing encoding or decoding with each frame of an image divided into a plurality.

BRIEF DESCRIPTION OF DRAWINGS

FIG. 11 is a diagram describing a situation which includes control information in the header of the first slice transmitted.

FIG. 12 is a diagram illustrating an example of slice header syntax.

DESCRIPTION OF EMBODIMENTS

Now, embodiments of the present invention (hereinafter, embodiments) will be described. Note that description will proceed in the following order.
1. First Embodiment (image encoding device)
2. Second Embodiment (image decoding device)
3. Third Embodiment (example of including control information in header of start slice)
4. Fourth Embodiment (example of including control information in header of an optional slice)
5. Fifth Embodiment (example of using a pointer)
6. Sixth Embodiment (example of assembling control information in multiple groups)
7. Seventh Embodiment (example of controlling the number of groups)
8. Eighth Embodiment (example of grouping independently by element)
9. Ninth Embodiment (QALF)
10. Tenth Embodiment (personal computer)
11. Eleventh Embodiment (television receiver)
12. Twelfth Embodiment (cellular telephone)
13. Thirteenth Embodiment (hard disk recorder)
14. Fourteenth Embodiment (camera)

1. First Embodiment

Configuration of Device

Figure 1:
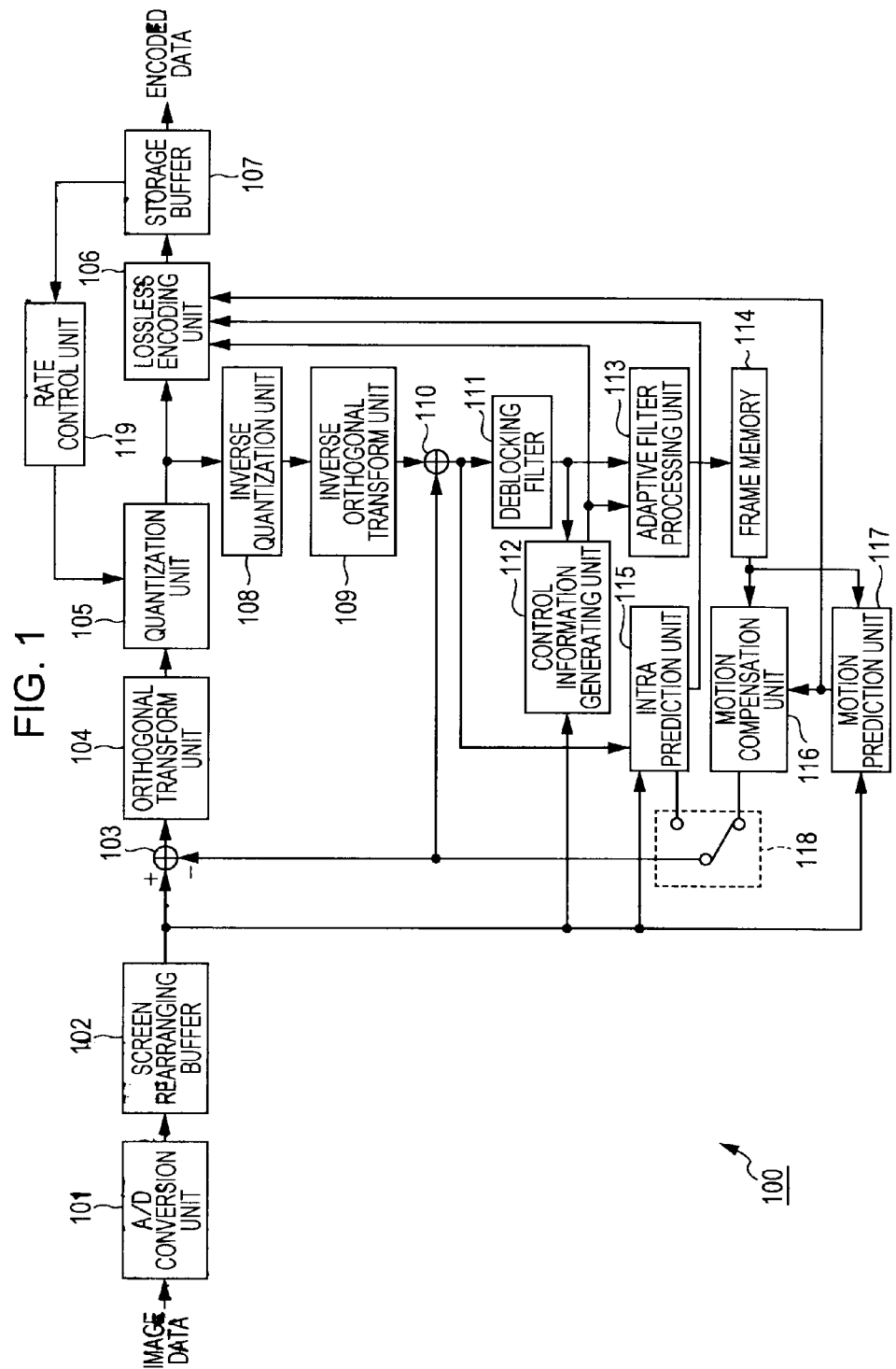
FIG. 1 is a block diagram illustrating a principal configuration example of an image encoding device to which the present invention has been applied.

FIG. 1 represents the configuration of an embodiment of an image encoding device serving as an image processing device to which the present invention has been applied.

An image encoding device 100 shown in FIG. 1 is an encoding device which subjects an image to compression encoding using, for example, the H.264 and MPEG-4 Part10 (Advanced Video Coding) (hereinafter, written as H.264/AVC) format, and further employs an adaptive loop filter.

With the example in FIG. 1, the image encoding device 100 has an A/D (Analog/Digital) conversion unit 101, a screen rearranging buffer 102, a computing unit 103, an orthogonal transform unit 104, a quantization unit 105, a lossless encoding unit 106, and a storing buffer 107. The image encoding device 100 also has an inverse quantization unit 108, an inverse orthogonal transform unit 109, a computing unit 110, and a deblocking filter 111. Further, the image encoding device 100 has a control information generating unit 112, an adaptive filter processing unit 113, and frame memory 114. Also, the image encoding device 100 has an intra prediction unit 115, a motion compensation unit 116, a motion prediction unit 117, and a prediction image selecting unit 118. Further, the image encoding device 100 has a rate control unit 119.

The A/D conversion unit 101 performs A/D conversion of input image data, and outputs to the screen rearranging buffer 102 and stores. The screen rearranging buffer 102 rearranges the images of frames in the stored order for display into the order of frames for encoding according to GOP (Group of Picture) structure.

The computing unit 103 subtracts from the image read out from the screen rearranging buffer 102 the prediction image from the intra prediction unit 115 selected by the prediction image selecting unit 118 or the prediction image from the motion compensation unit 116, and outputs difference information thereof to the orthogonal transform unit 104. The orthogonal transform unit 104 subjects the difference information from the computing unit 103 to orthogonal transform, such as discrete cosine transform, Karhunen-Loéve transform, or the like, and outputs a transform coefficient thereof. The quantization unit 105 quantizes the transform coefficient that the orthogonal transform unit 104 outputs.

The quantized transform coefficient that is the output of the quantization unit 105 is input to the lossless encoding unit 106. The lossless encoding unit 106 subjects the quantized transform coefficient to lossless encoding, such as variable length coding, arithmetic coding, or the like.

The lossless encoding unit 106 obtains information indicating intra prediction and so forth from the intra prediction unit 115, and obtains information indicating an inter prediction mode and so forth from the motion prediction unit 117. Note that the information indicating intra prediction will also be referred to as intra prediction mode information hereinafter. Also, the information indicating information mode indicating inter prediction will also be referred to as inter prediction mode information hereinafter.

The lossless encoding unit 106 further obtains control information of adaptive filter processing performed at the adaptive filter processing unit 113 from the control information generating unit 112.

The lossless encoding unit 106 encodes the quantized transform coefficient, and also takes the control information of adaptive filter processing, the information indicating intra prediction, the information indicating an inter prediction mode, quantization parameters, and so forth, as part of header information of the encoded data (multiplexes). The lossless encoding unit 106 supplies the encoded data obtained by encoding to the storing buffer 107 for storage.

For example, with the lossless encoding unit 106, lossless encoding processing, such as variable length coding, arithmetic coding, or the like, is performed. Examples of the variable length coding include CAVLC (Context-Adaptive Variable Length Coding) determined by the H.264/AVC format. Examples of the arithmetic coding include CABAC (Context-Adaptive Binary Arithmetic Coding).

The storing buffer 107 temporarily holds the encoded data supplied from the lossless encoding unit 106, and at a predetermined timing outputs this to, for example, a storage device or transmission path or the like downstream not shown in the drawing, as an encoded image encoded by the H.264/AVC format.

Also, the quantized transform coefficient output from the quantization unit 105 is also input to the inverse quantization unit 108. The inverse quantization unit 108 performs inverse quantization of the quantized transform coefficient with a method corresponding to quantization at the quantization unit 105, and supplies the obtained transform coefficient to the inverse orthogonal transform unit 109.

The inverse orthogonal transform unit 109 performs inverse orthogonal transform of the supplied transform coefficients with a method corresponding to the orthogonal transform processing by the orthogonal transform unit 104. The output subjected to inverse orthogonal transform is supplied to the computing unit 110. The computing unit 110 adds the prediction image supplied from the prediction image selecting unit 118 to the inverse orthogonal transform result supplied from the inverse orthogonal transform unit 109, i.e., the restored difference information, and obtains a locally decoded image (decoded image). The addition results thereof are supplied to the deblocking filter 111.

The deblocking filter 111 removes block noise from the decoded image. The deblocking filter 111 then supplies the noise removal results to the control information generating unit 112 and the adaptive filter processing unit 113.

The control information generating unit 112 obtains the decoded image supplied from the deblocking filter 111 and the current input image read out from the screen rearranging buffer 102, and generates from these control information for adaptive filtering to be performed at the adaptive filter processing unit 113. While details will be described later, the control information includes filter coefficients, block size, filter block flags, and the like.

The control information generating unit 112 supplies the generated control information to the adaptive filter processing unit 113. The control information generating unit 112 also supplies the generated control information to the lossless encoding unit 106 as well. As described above, the control information is included in the encoded data (multiplexed) by the lossless encoding unit 106. That is to say, the control information is sent to the image decoding device along with the encoded data.

The adaptive filter processing unit 113 performs filter processing on the decoded image supplied from the deblocking filter 111, using the filter coefficients, block size specification, and filter block flags and the like, of the control information supplied from the control information generating unit 112. A Wiener filter (Wiener Filter), for example, is used as this filter. Of course, a filer other than a Wiener filter may be used. The adaptive filter processing unit 113 supplies the filter processing results to the frame memory 114, and stores as a reference image.

The frame memory 114 outputs the stored reference image to the motion compensation unit 116 and motion prediction unit 117 at a predetermined timing.

With this image encoding device 100, the I picture, B picture, and P picture from the screen rearranging buffer 102 are supplied to the intra prediction unit 115 as an image to be subjected to intra prediction (also referred to as intra processing), for example. Also, the B picture and P picture read out from the screen rearranging buffer 102 are supplied to the motion prediction unit 117 as an image to be subjected to inter prediction (also referred to as inter processing).

The intra prediction unit 115 performs intra prediction processing of all of the candidate intra prediction modes based on the image to be subjected to intra prediction read out from the screen rearranging buffer 102, and the reference image supplied from the frame memory 114 to generate a prediction image.

With the intra prediction unit 115, information relating to the intra prediction mode applied to the current block/macroblock is transmitted to the lossless encoding unit 106, and is included as a part of the header information in the encoded data. With the H.264 image information encoding format, the intra 4×4 prediction mode, intra 8×8 prediction mode, and intra 16×16 prediction mode are defined for luminance signals, and also with regard to color difference signals, a prediction mode can be defined for each macroblock, independent from the luminance signals. For the intra 4×4 prediction mode, one intra prediction mode is defined for each 4×4 luminance block. For the intra 8×8 prediction mode, one intra prediction mode is defined for each 8×8 luminance block. For the intra 16×16 prediction mode and color difference signals, one prediction mode is defined for each macroblock.

The intra prediction unit 115 calculates a cost function value as to the intra prediction mode where the prediction image has been generated, and selects the intra prediction mode where the calculated cost function value gives the minimum value, as the optimal intra prediction mode. The intra prediction unit 115 supplies the prediction image generated in the optimal intra prediction mode to the prediction image selecting unit 118.

With regard to the image to be subjected to inter encoding, the motion prediction unit 117 obtains image information supplied from the screen rearranging buffer 102 (input image) and image information serving as the reference frame supplied from the frame memory 114 (decoded image), and calculates a motion vector. The motion prediction unit 117 supplies motion vector information indicating the calculated motion vector to the lossless encoding unit 106. This motion vector information is included in the encoded data (multiplexed) by the lossless encoding unit 106. That is to say the motion vector information is sent to the image decoding device along with the encoded data.

Also, the motion prediction unit 117 also supplies the motion vector information to the motion compensation unit 116.

The motion compensation unit 116 performs motion compensation processing in accordance with the motion vector information supplied from the motion prediction unit 117, and generates inter prediction image information. The motion compensation unit 116 supplies the generated prediction image information to the prediction image selecting unit 118.

In the case of an image for performing intra encoding, the prediction image selecting unit 118 supplies the output of the intra prediction unit 115 to the computing unit 103, and in the event of an image for performing inter encoding, supplies the output of the motion compensation unit 116 to the computing unit 103.

The rate control unit 119 controls the rate of quantization operations of the quantization unit 105 based on the compressed image stored in the storing buffer 107, such that overflow or underflow does not occur.

With MPEG (Moving Picture Experts Group) 2, the increment of motion prediction/compensation processing is motion compensation blocks, and independent motion vector information can be held at each motion compensation block. The size of a motion compensation block is 16×16 pixels in the case of frame motion compensation mode, and in the case of field motion compensation mode is 16×8 pixels for each of the first field and the second field.

Figure 2:
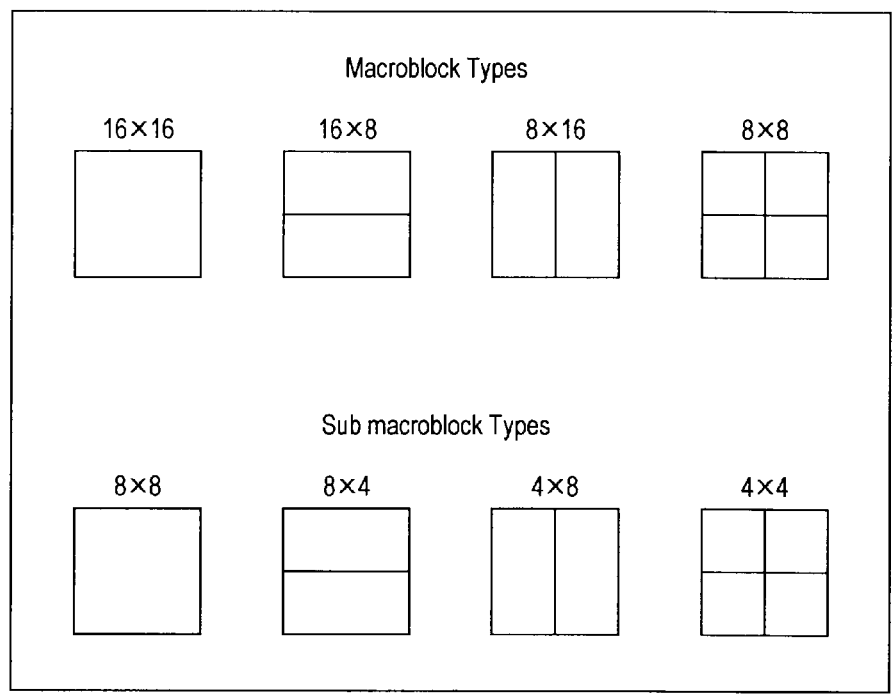
FIG. 2 is a diagram describing variable block size motion prediction/compensation processing.

On the other hand, with AVC (Advanced Video Coding), one macroblock configured of 16×16 pixels, as shown at the upper side in FIG. 2, can be divided into any of the partitions of 16×16, 16×8, 8×16, or 8×8, with each holding independent motion vector information. Also, as shown at the lower side in FIG. 2, a 8×8 partition can be divided into any of the sub partitions of 8×8, 8×4, 4×8, or 4×4, with each holding independent motion vector information. Motion prediction/compensation processing is performed with this motion compensation block as an increment.

Figure 3:
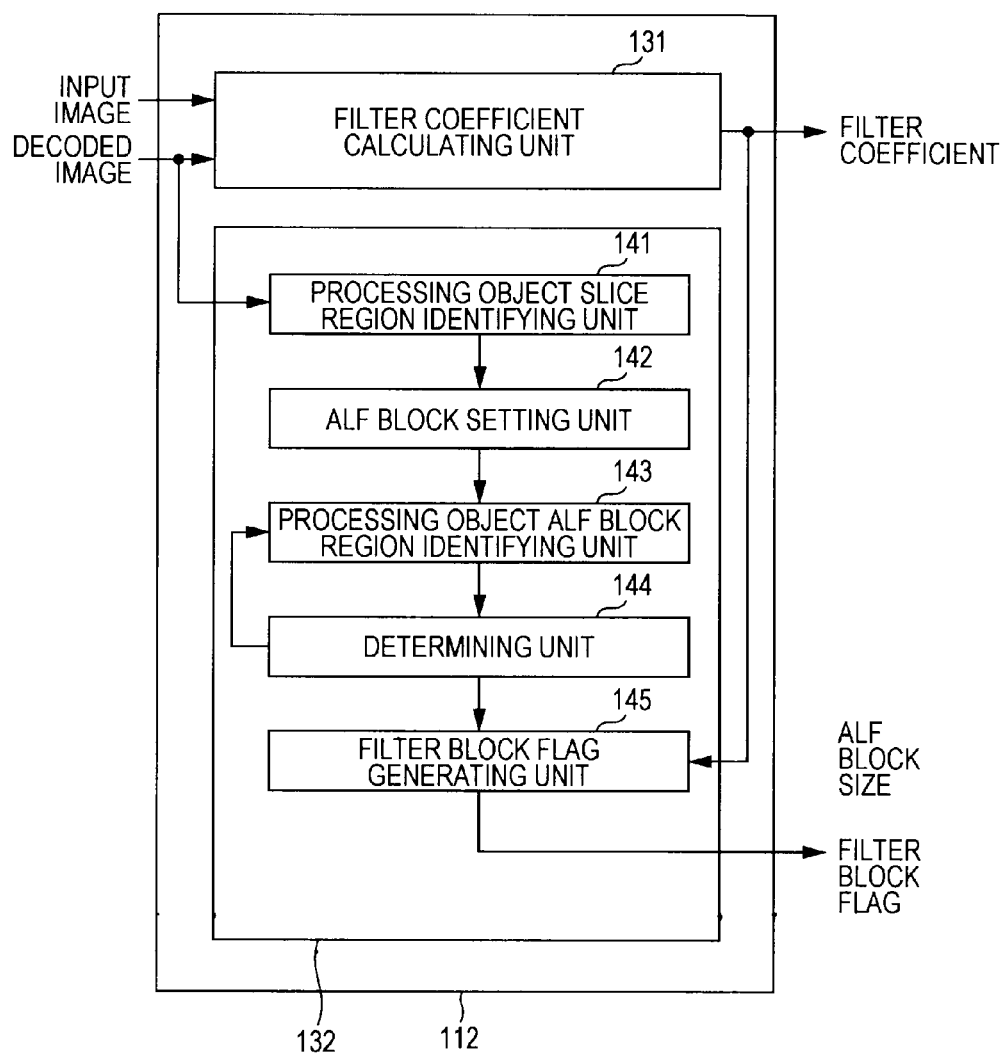
FIG. 3 is a block diagram illustrating a principal configuration example of a control information generating unit.

FIG. 3 is a block diagram illustrating a principal configuration example of the control information generating unit 112.

As described above, the control information generating unit 112 generates control information used at the adaptive filter (ALF (Adaptive Loop Filter)) which is a loop filter, performed at the adaptive filter processing unit 113. The control information generating unit 112 generates, as the control information, filter coefficients, ALF block size, and filter block flags, for example.

The control information generating unit 112 has a filter coefficient calculating unit 131 and block information generating unit 133.

The filter coefficient calculating unit 131 obtains the decoded image supplied from the deblocking filter 111 and current input image read out from the screen rearranging buffer 102, and calculates an ALF filter coefficient for each frame. ALF filter coefficients are then calculated for each of the frames.

The block information generating unit 132 generates block information such as the ALF block size, filter block flags, and so forth. For example, the block information generating unit 132 determines the ALF block size based on the decoded image supplied from the deblocking filter 111 and the filter coefficients calculated by the filter coefficient calculating unit 131. Also, for example, the block information generating unit 132 generates a filter block flag for each ALF block within the slice to be processed.

Figure 4:
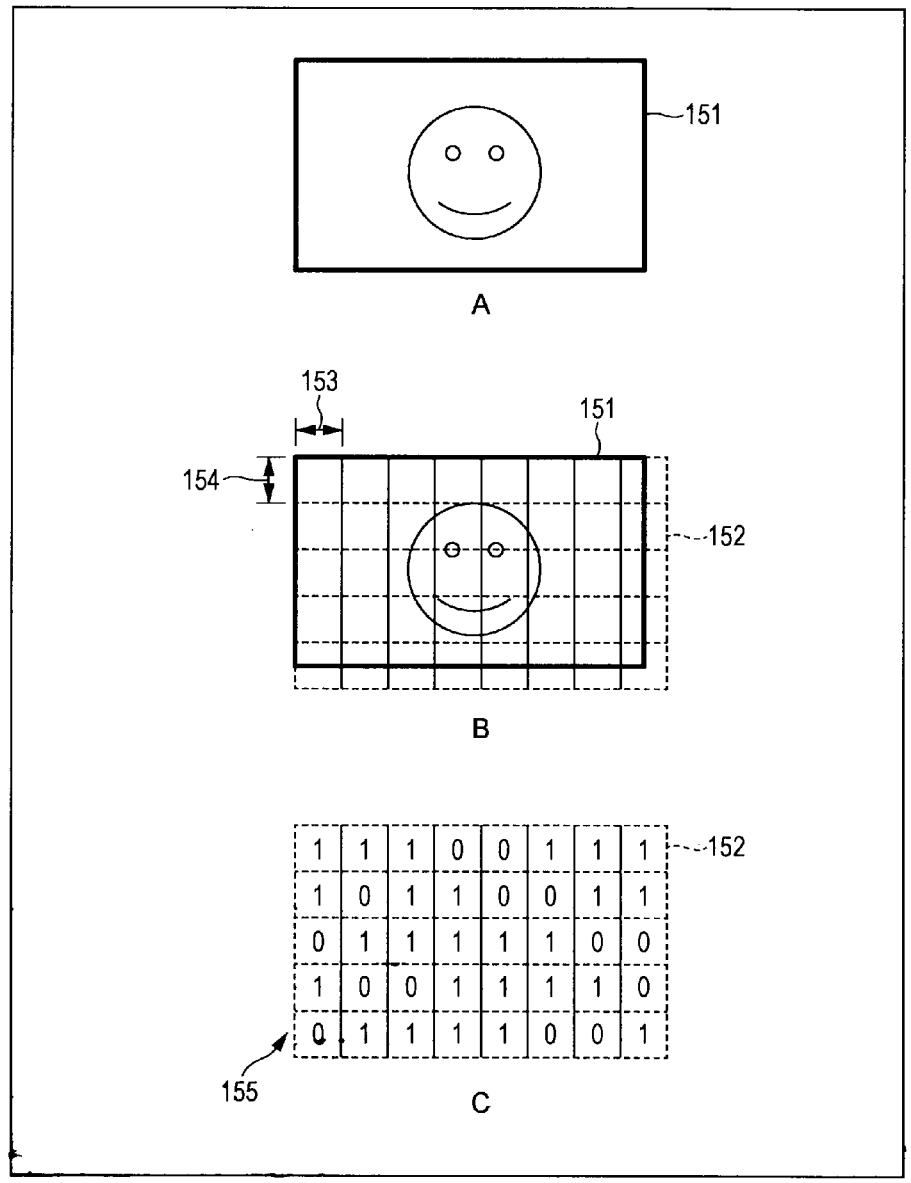
FIG. 4 is a diagram describing ALF blocks and filter block flags.

Now, description will be made regarding the ALF block and filter block flag of the block information. FIG. 4 is a diagram for describing ALF blocks and filter block flags.

As described above, the adaptive filter has filter coefficients set for each frame. That is to say, optimal filter processing is performed in increments of frames. However, generally, frame images are not uniform overall, and have various features locally. Therefore, optimal filter coefficients differ locally. Accordingly, while the filter processing using filter coefficients determined each frame as described above improves the image quality for the overall frame, there has been concern that this will in fact deteriorate locally.

Accordingly, BALF (Block based Adaptive Loop Filter) in which filter processing is not performed at regions where image quality locally deteriorates, has been conceived.

A decoded image following deblocking filter processing is shown in frame 151 in A in FIG. 4. As shown in B in FIG. 4, the block information generating unit 132 arrays multiple ALF blocks 152, which are control blocks serving as the increment of control for adaptive filter processing locally performed, without gaps as if they were being used for paving the entire region of the frame 151. The region where the ALF blocks 152 are placed does not have to be the same as the region of the frame 151, but includes at least the entire region of the frame. The region of the frame 151 is resultantly divided by the regions of the ALF blocks 152 (multiple control regions).

The block information generating unit 132 determines the horizontal direction size (both-sided arrow 153) and vertical direction size (both-sided arrow 154) of the ALF blocks 152. For the size of the ALF blocks, one of 8×8, 16×16, 24×24, 32×32, 48×48, 64×64, 96×96, or 128×128, for example, can be specified for each slice. Note that the information specifying the size of the ALF block will be called block size index.

Once the block size is decided, the number of ALF blocks per frame has also been decided, since the frame size is fixed.

As shown in C in FIG. 4, the block information generating unit 132 sets a filter block flag 155 which controls whether or not to perform filter processing, in each Alf block 152. For example, a filter block flag 155 with a value of "1" is generated for a region where the image quality is improved by the adaptive filter, and a filter block flag 155 with a value of "0" is generated for a region where the image quality is deteriorated by the adaptive filter. With the filter block flag 155, the value of "1" is a value indicating that filter processing is to be performed, and the value of "0" is a value indicating that filter processing is not to be performed.

The adaptive filter processing unit 113 controls the adaptive filter processing based on the value of the filter block flag 155. For example, the adaptive filter processing unit 113 performs filter processing only at the regions where the ALF blocks 152 have a value of "1" for the filter block flag 155, and does not perform filter processing at the regions where the ALF blocks 152 have a value of "0" for the filter block flag 155.

Also, the above-described block size index and filter block flag are included in the slice header of the encoded data, and sent from the image encoding device 100 to the image decoding device. The one or more filter block flags corresponding to the number of ALF blocks are included in the slice header in the order of raster scan, for example.

Accordingly, the smaller the size of the ALF block, the finer filter control can be realized, and more appropriate ALF filtering can be performed. However, a smaller ALF block size increases the bit amount of the filter block flags. That is to say, the smaller the ALF block size is the more the encoding efficiency of the encoded data decreases. Thus, the capabilities of the adaptive filter and the encoding efficiency of the encoded data are in a tradeoff relation.

The number of ALF blocks is calculated as with the following Expression (1).

[Mathematic Expression 1]

$$N_{ALFBLOCK} = \text{floor}\left[\frac{16 \times N_{MBw} + N_{SIZE} - 1}{N_{SIZE}}\right] \times \text{floor}\left[\frac{16 \times N_{MBh} + N_{SIZE} - 1}{N_{SIZE}}\right] \quad (1)$$

In Expression (1), $N_{ALFBLOCK}$ represents the number of ALF blocks. Also, $N_{MBw}$ represents the number of macro blocks in the horizontal direction of the picture, and $N_{MBh}$ represents the number of macro blocks in the vertical direction of the picture. Further, $N_{SIZE}$ represents the size of one side of an ALF block. Also, floor[x] is a function where x is rounded off to the decimal so as to be an integer.

Figure 5:
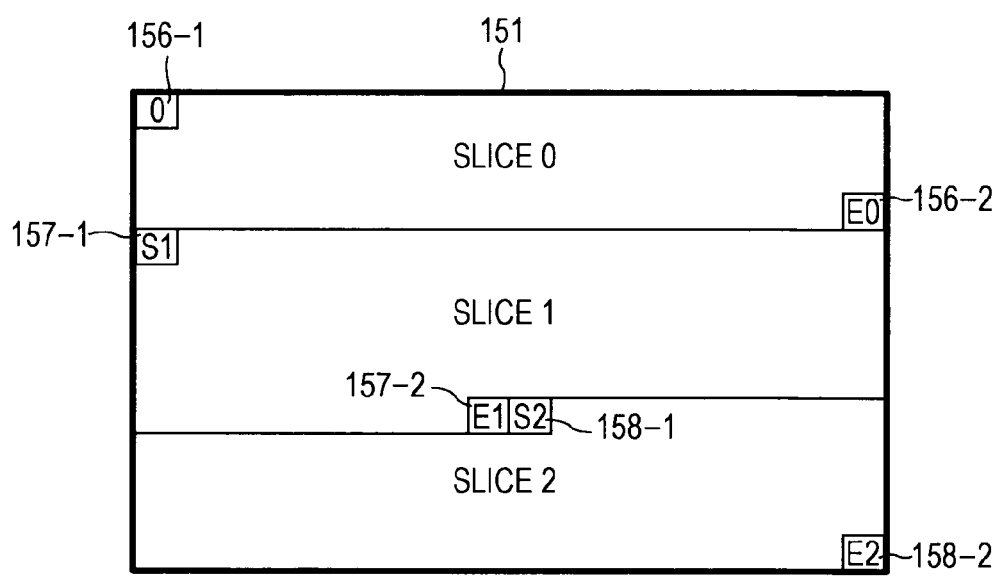
FIG. 5 is a diagram describing an example of multi-slice.

Now, with H.264/AVC, one frame can be divided into multiple slices, and encoded data can be output for each slice. FIG. 5 is a diagram for describing an example of multi-slice. In the case of the example in FIG. 5, the frame 151 is divided into the three slices of slice 0, slice 1, and slice 2.

Dividing the frame into multiple slice regions is an effective method to increase error resistance during transferring of image compression information.

NPL 2 which describes BALF does not disclose this multi-slice. That is to say, only setting ALF blocks for the entire frame are described. The ALF blocks are set for the entire frame, as described above. That is to say, the ALF blocks for the entire frame are set for each slice, and there has been the concern that unnecessary ALF blocks outside the slice region might be set.

Figure 6:
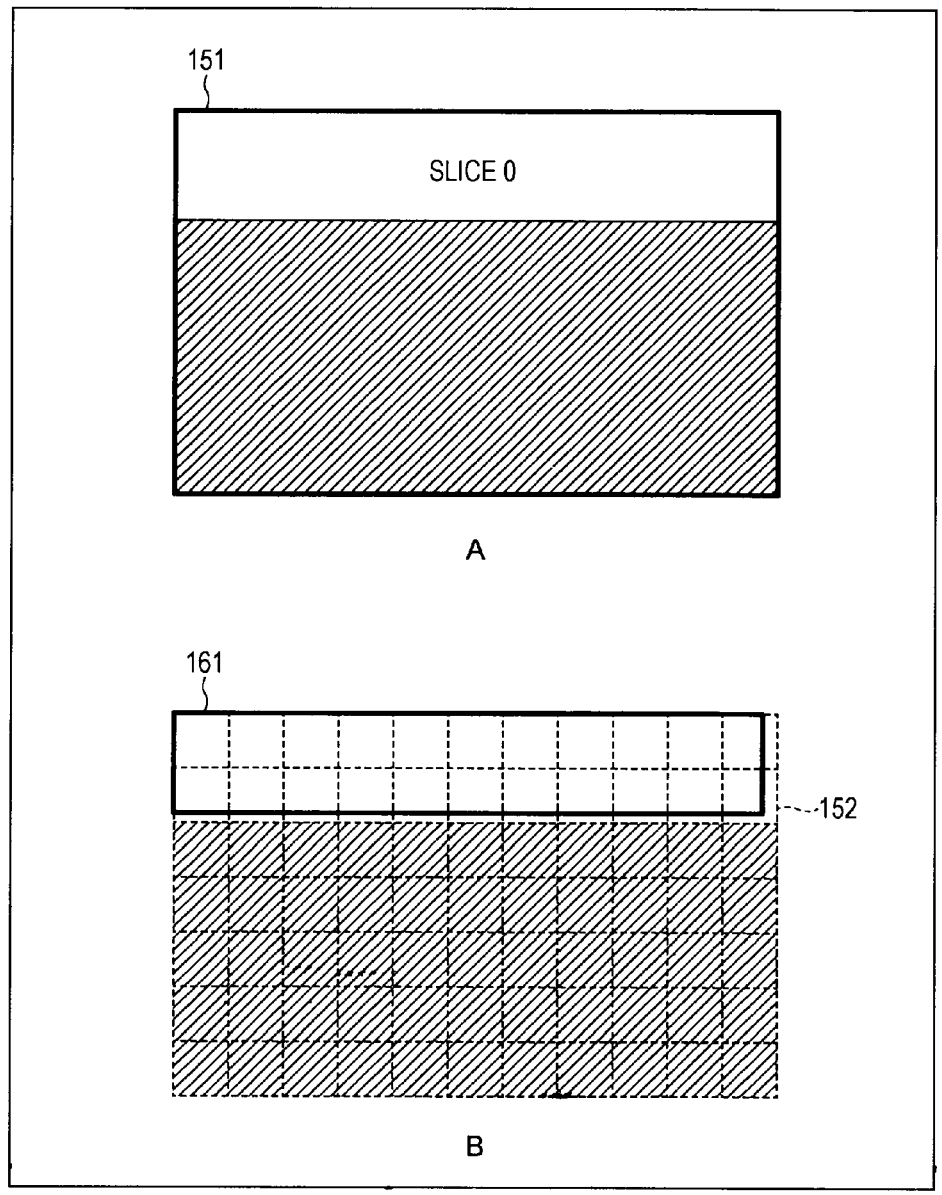
FIG. 6 is a diagram describing the processing of slice 0.

For example, in the example of the slice configuration shown in FIG. 5, in the case of processing a slice 0 as shown in A in FIG. 6, as shown in B in FIG. 6, the ALF blocks 152 for the entire frame 151 are set as to the slice 0 region shown in frame 161.

Figure 7:
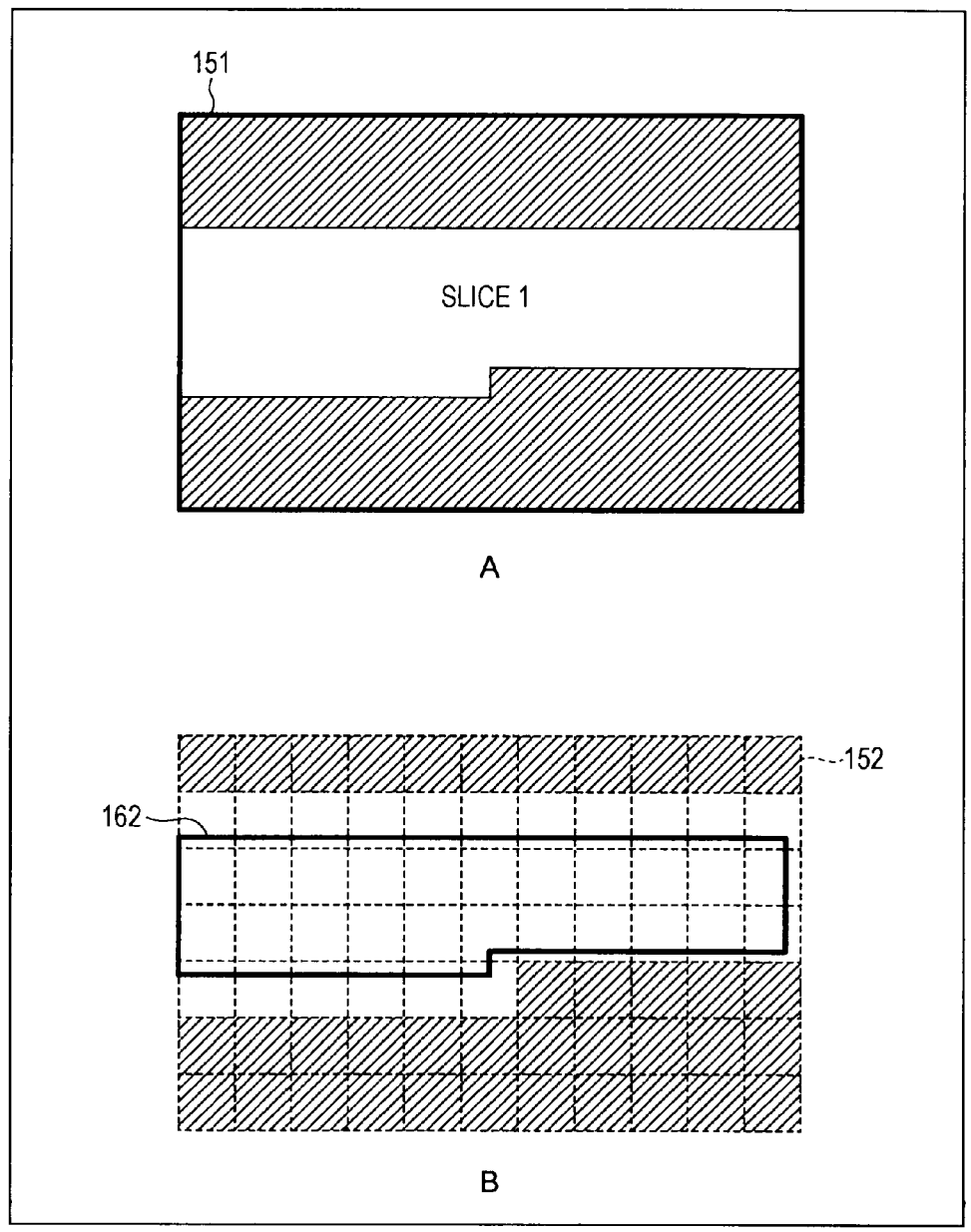
FIG. 7 is a diagram describing the processing of slice 1.

Similarly, in the case of processing the slice 1 as shown in A in FIG. 7 in the example of the slice configuration shown in FIG. 5, for example, the ALF blocks 152 are set for the entire frame 151 as to the slice 1 region indicated by frame 162, as shown in B in FIG. 7.

The ALF blocks 152 shown in the shaded area of B in FIG. 6 and B in FIG. 7 are blocks outside the slice 0 or slice 1 regions, and are unnecessary blocks as to the processing of the slice 0 or slice 1 regions.

Setting such unnecessary blocks or flags for such blocks is irrelevant processing. Thus, so as to not needlessly increase processing, the block information generating unit 132 of the control information generating unit 112 in FIG. 3 generates only the ALF blocks including the region of the slice to be processed and the filter block flags.

Figure 8:
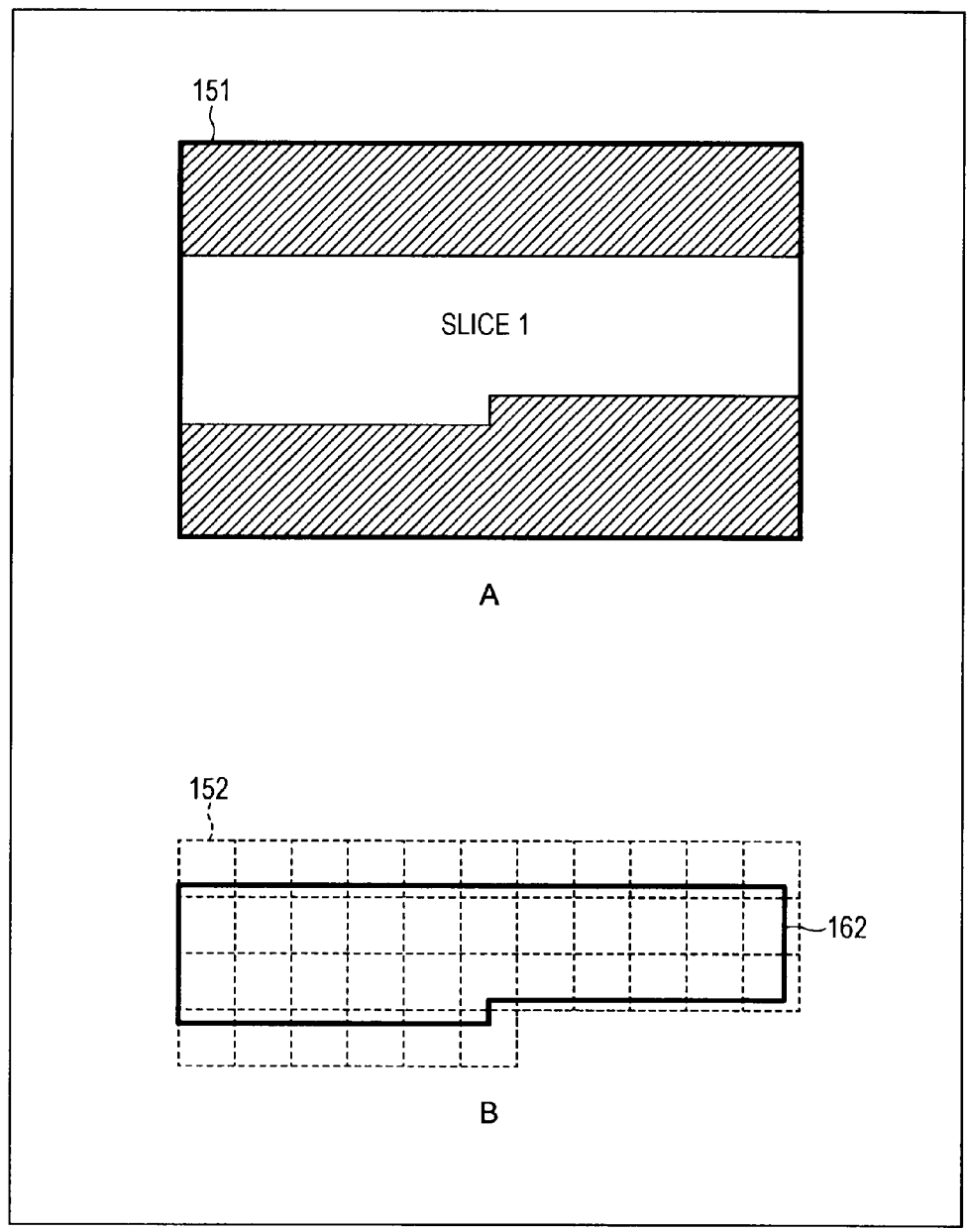
FIG. 8 is a diagram describing the processing of slice 1 to which the present invention has been applied.

For example, in the case of processing slice 1 as shown in A in FIG. 8 in the slice configuration example shown in FIG. 5, the block information generating unit 132 sets, as to the region of slice 1 shown in frame 162, only the ALF blocks 152 included in the region thereof, as shown in B in FIG. 8, and generates the filter block flags for only the ALF blocks 152 thereof.

Returning to FIG. 3, the block information generating unit 132 has a processing object slice region identifying unit 141, ALF block setting unit 142, processing object ALF block region identifying unit 143, determining unit 144, and filter block flag generating unit 145.

The processing object slice region identifying unit 141 identifies the position over the entire frame of the region of the slice to be processed that is supplied as a decoding image.

The ALF block setting unit 142 determines ALF block size, and sets the ALF block 152 over the entire frame. Thus, the number of ALF blocks in the entire frame is also identified.

The processing object ALF block region identifying unit 143 selects one ALF block to be processed from each of the ALF blocks 152 set by the ALF block setting unit 142, and identifies the position of the region of selected ALF blocks to be processed.

The determining unit 144 determines whether or not the region of ALF blocks to be processed includes the region of the slice to be processed. The filter block flag generating unit 145 generates the filter block flag of the ALF block determined as "including the region of the slice to be processed" by the determining unit 144. The filter block flag generating unit 145 uses a filter coefficient calculated by the filter coefficient computing unit 131 to perform adaptive filter processing as to the region of the ALF block to the processed, and determines the value of the filter block flag depending on whether the image quality of the filter processing result is improved from before the processing.

The filter block flag generating unit 145 outputs control information such as the filter block flag and ALF block size or the like.

Figure 9:
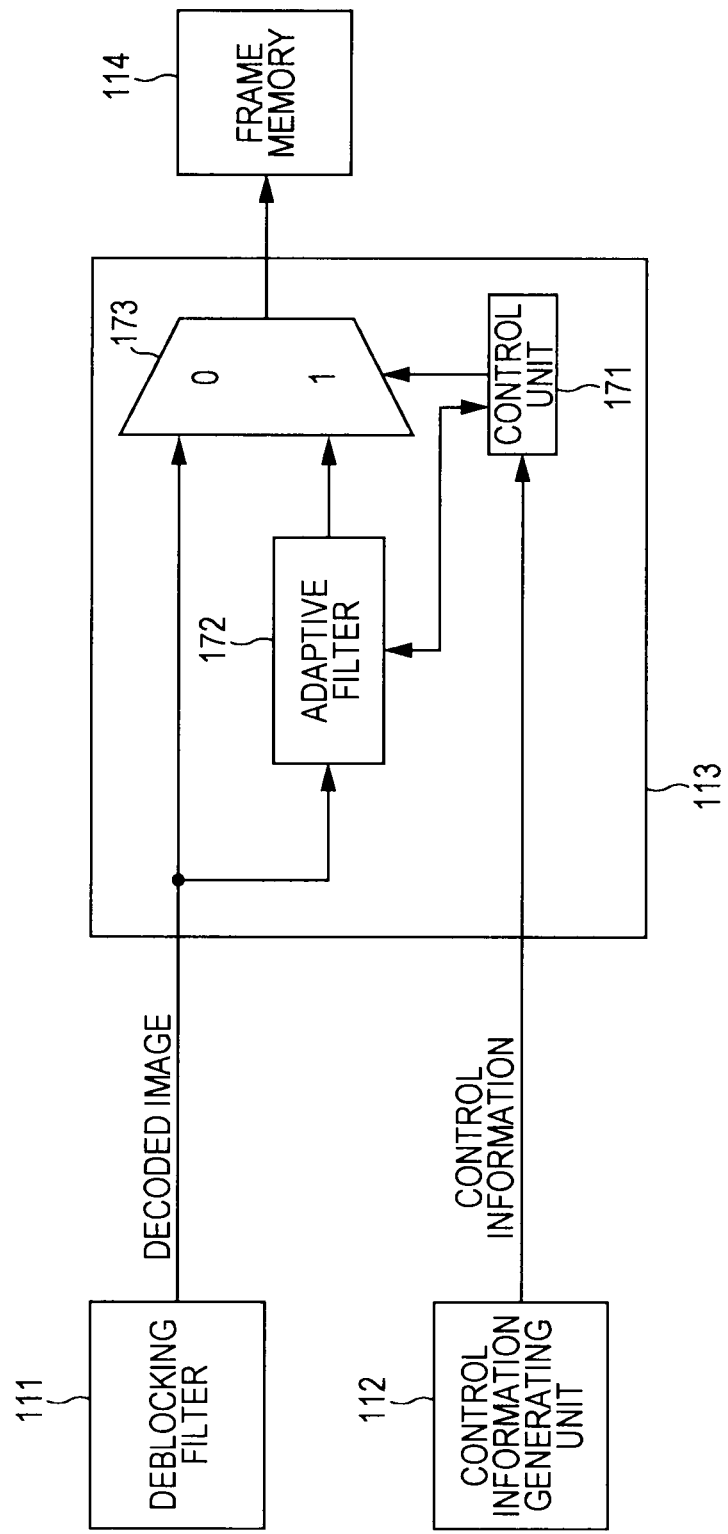
FIG. 9 is a block diagram illustrating a principal configuration example of an adaptive filter processing unit.

FIG. 9 is a block diagram showing a principal configuration example of the adaptive filter processing unit 113 in FIG. 1.

The adaptive filter processing unit 113 uses the control information supplied from the control information generating unit 112 to perform filter processing on the decoded image supplied from the deblocking filter 111.

The adaptive filter processing unit 113 has a control unit 171, adaptive filter 172, and selecting unit 173, as shown in FIG. 9.

The control unit 171 controls the adaptive filter 172 and selecting unit 173. For example, the control unit 171 obtains control information from the control information generating unit 112. Also, the control unit 171 supplies and sets the filter coefficient included in the obtained control information to the adaptive filter 172. Further, the control unit 171 identifies the position of the region of the ALF block to be processed, based on the ALF block size included in the control information. Also, the control unit 171 controls the adaptive filter 172, based on the value of the filter block flag included in the control information, and subjects each ALF block region to filter processing as needed, while controlling the operations of the selecting unit 173.

The adaptive filter 172 subjects the region specified by the control unit 171 as an ALF block to be processed, of the decoded image supplied from the deblocking filter 111, to filter processing using the filter coefficient set by the control unit 171. The adaptive filter 172 supplies the filter processing results to the selecting unit 173.

The selecting unit 173 is controlled by the control unit 171 to select one or the other of the decoded image supplied from the deblocking filter 111 (decoded image not subjected to adaptive filter processing) and the decoded image supplied from the adaptive filter 172 (decoded image subjected to adaptive filter processing), supplies this to the frame memory 114, and stores this as a reference image.

That is to say, the adaptive filter processing unit 113 performs filter processing only as to regions wherein the filter block flag of the decoded image supplied from the deblocking filter 111 has indicated to perform filter processing (regions determined to have improved image quality by filter processing).

Figure 10:
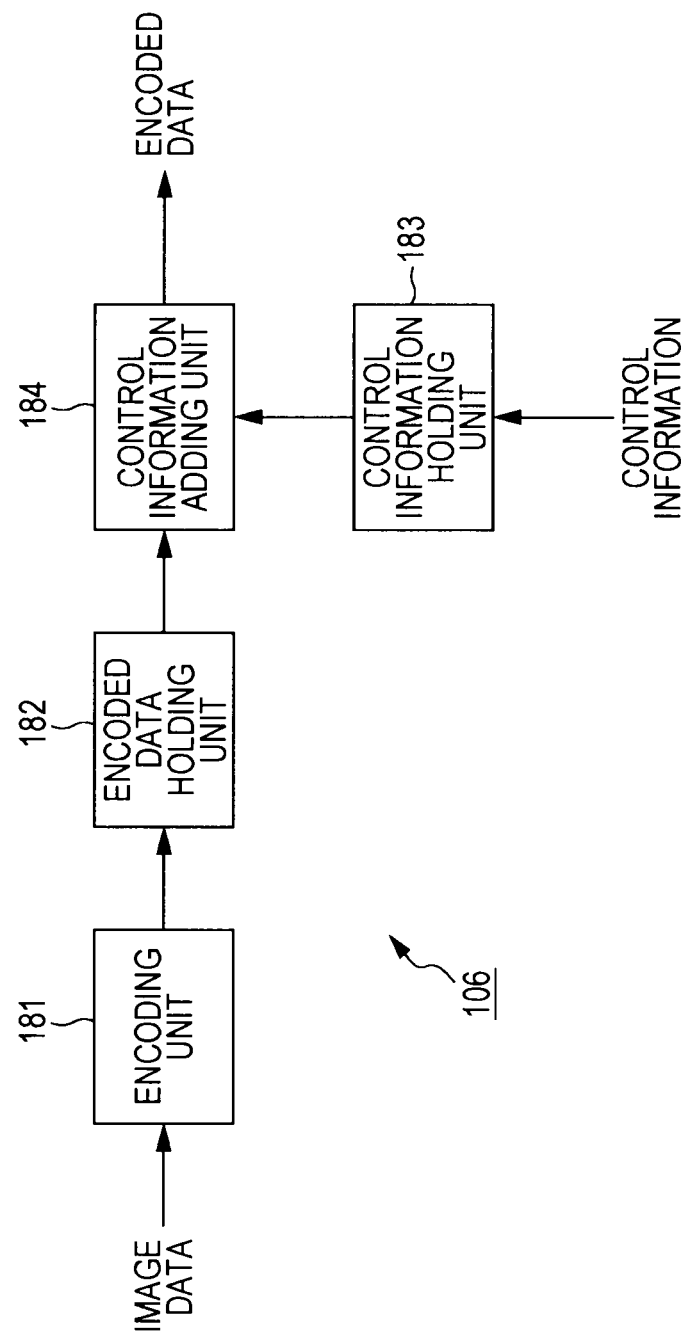
FIG. 10 is a block diagram illustrating a principal configuration example of a lossless encoding unit.

FIG. 10 is a block diagram showing a principal configuration example of the lossless encoding unit 106 in FIG. 1.

As described above, the lossless encoding unit 106 subjects the quantized coefficient data supplied from the quantizing unit 105 to lossless encoding and generates the encoded data, while embedding (writing) the control information supplied from the control information generating unit 112 into the slice header of the encoded data thereof. At this time, the lossless encoding unit 106 compiles the control information for each slide within the picture (frame), and embeds the one picture (one frame) worth of control information thereof into one slice header. Thus, the lossless encoding unit 106 can delete the overlapping portions between the control information of each slice (redundant portion), and embed into the slice header. Thus, the lossless encoding unit 106 can improve the encoding efficiency of the encoded data more than in the case of embedding the control information for each slice into the encoded data respectively.

The lossless encoding unit 106 has an encoding unit 181, encoded data holding unit 182, control information holding unit 183, and control information adding unit 184, as shown in FIG. 10.

The encoding unit 181 subjects the image data for each slice (quantized coefficient data) to lossless encoding, then generates encoded data. The encoded data of each slice is held in the encoded data holding unit 182. The encoded data holding unit 182 can hold the encoded data of at least one picture worth.

The control information holding unit 183 obtains and holds control information for each slice generated by the control information generating unit 112. The control information holding unit 183 can hold the control information of at least one picture worth. The control information adding unit 184 embeds the control information held in the control information holding unit 183 into the header information of the slice first output within the picture of the encoded data held in the encoded data holding unit 182, and supplies this to the storing buffer 107.

At this time, the control information adding unit 184 compiles the control information of the picture to be processed that is held in the control information holding unit 183, deletes the redundant portions and generates one picture worth of control information, and embeds this into the slice header of the encoded data.

For example, as shown in FIG. 11, the frame 151 is made up of slice 0, slice 1, and slice 2, and with the control information generating unit 112, control information 191-1 is generated as to the slice 0, control information 191-2 is generated as to the slice 1, and control information 191-3 is generated as to the slice 2.

Also, the encoded data 194 is output in the order of slice 1, slice 0, and slice 2. That is to say, encoded data 194 is output in the order of slice 1 header 192-1, slice 1 data 193-1, slice 0 header 192-2, slice 0 data 193-2, slice 2 header 192-3, slice 2 data 193-3.

At this time, the control information adding unit 184 embeds the control information 191-1 through control information 191-3 of the frame 151 all into the slice 1 header 192-1 which is the header of slice 1 (slice header) first output. At this time, the control information adding unit 184 compiles the control information 191-1 through control information 191-3, deletes the redundant portions, generates (one picture worth of) control information 191 (unshown) which corresponds to the entire frame 151, and embeds the control information 191 thereof into the slice 1 header 192-1.

The control information adding unit 184 embeds the control information into the slice header according to a syntax such as that shown in A in FIG. 12 and B in FIG. 12, for example. A in FIG. 12 indicates an example of a slice header syntax, and B in FIG. 12 indicates an example of a syntax for a portion of control information. As shown in B in FIG. 12, the control information adding unit 184 embeds the filter block flag of all of the control blocks of the frame 151 into one slice header.

[Flow of Processing]

Next, the flow of processing using the portions configured as described above will be described. First, an example of the flow of encoding processing performed by the image encoding device 100 will be described with reference to the flowchart in FIG. 13.

In step S101, the A/D conversion unit 101 converts an input image from analog to digital. In step S102, the screen rearranging buffer 102 stores the A/D converted image, and performs rearranging from the sequence for displaying the pictures to the sequence for encoding.

In step S103, the computing unit 103 computes difference between an image rearranged by the processing in step S102 and the prediction image. The prediction image is supplied to the computing unit 103 from the motion compensation unit 116 in the event of performing inter prediction, and from the intra prediction unit 115 in the event of performing intra prediction, via the prediction image selecting unit 118.

The difference data is smaller in the data amount as compared to the original image data. Accordingly, the data amount can be compressed as compared to the case of encoding the original image without change.

In step S104, the orthogonal transform unit 104 subjects the difference information generated by the processing in step S103 to orthogonal transform. Specifically, orthogonal transform, such as discrete cosine transform, Karhunen-Loéve transform, or the like, is performed, and a transform coefficient is output. In step S105, the quantization unit 105 quantizes the transform coefficient. At the time of this quantization, a rate is controlled such as later-described processing in step S119 will be described.

The difference information thus quantized is locally decoded as follows. Specifically, in step S106, the inverse quantization unit 108 subjects the transform coefficient quantized by the quantization unit 105 to inverse quantization using a property corresponding to the property of the quantization unit 105. In step S107, the inverse orthogonal transform unit 109 subjects the transform coefficient subjected to inverse quantization by the inverse quantization unit 108 to inverse orthogonal transform using a property corresponding to the property of the orthogonal transform unit 104.

In step S108 the computing unit 110 adds the prediction image input via the prediction image selecting unit 118 to the locally decoded difference information, and generates a locally decoded image (the image corresponding to the input to the computing unit 103). In step S109, the deblocking filter 111 subjects the image output from the computing unit 110 to filtering. Thus, block noise is removed.

Upon the above processing being performed for one slice, in step S110 the control information generating unit 112 generates control information to be used for adaptive filter processing. The details of the control information generating processing will be described later.

Upon control information such as filter coefficients, ALF block size, and filter block flag and the like being generated by the processing in step S110, in step S111 the adaptive filter processing unit 113 performs adaptive filter processing on the decoded image subjected to the deblocking filter processing in the processing of step S109, using the control information. Details of this adaptive filter processing will be described later.

In step S112, the frame memory 114 stores the image subjected to adaptive filter processing in step S111.

In step S113, the intra prediction unit 115 performs intra prediction processing in the intra prediction mode. In step S114, the motion prediction unit 117 and motion compensation unit 116 perform inter motion prediction/compensation processing in the inter prediction mode.

In step S115, the prediction image selecting unit 118 selects one of a prediction image generated by intra prediction processing or a prediction image generated by inter motion prediction/compensation processing, in accordance with the prediction mode of the frame to be processed. The prediction image selecting unit 118 supplies the selected prediction image to the computing units 103 and 110. This prediction image is, as described above, used for calculations in steps S103 and S108.

In step S116, the lossless encoding unit 106 performs lossless encoding processing to encode the quantized transform coefficient output from the quantization unit 105. Specifically, the difference image is subjected to lossless encoding such as variable length coding, arithmetic coding, or the like, and compressed. At this time, the lossless encoding unit 106 embeds (writes), in the slice header, metadata of the control information generated in step S110, the intra prediction mode information for intra prediction processing in step S113, the inter prediction mode for inter motion prediction/compensation processing in step S114, and so forth. The metadata herein is read out and used at the time of image decoding. Details of the lossless encoding processing herein will be described later.

In step S117, the storing buffer 107 stores encoded data. The encoded data stored in the storing buffer 107 is read out as appropriate and transmitted to the decoding side via the transmission path.

In step S118, the rate control unit 119 controls the rate of the quantization operation of the quantization unit 105, so that overflow or underflow does not occur, based on the encoded data stored in the storing buffer 107.

Next, description will be made of an example of the flow of control information generating processing executed by the control information generating unit 112 in step S110 in FIG. 13, with reference to the flowchart in FIG. 14.

Upon the control information generating processing being started, in step S131 the filter coefficient calculating unit 131 of the control information generating unit 112 calculates a filter coefficient using the input image supplied from the screen rearranging buffer 102 and the decoded image subjected to deblocking filter processing that is supplied from the deblocking filter 111. For example, the filter coefficient calculating unit 131 determines the value of the filter coefficient such that the residual of the input image and decoded image is the smallest.

Upon the filter coefficient being calculated, in step S132 the block information generating unit 132 performs generating of block information including ALF block size and filter block flag. Details of the block information generating processing will be described later. Upon the block information being generated, the flow returns to step S110 in FIG. 13, and the processing in step S111 and thereafter is executed.

Note that the calculation of the filter coefficient performed in step S131 may be performed in frame increments. In this case, the processing in step S131 may be performed only on a predetermined slice within the frame (e.g., a slice where the identification number within the frame is a predetermined value (e.g., "0"), or a slice first processed within the frame, or the like), with this value used for the other slices. Also, an arbitrary image can be used for calculation of filter coefficients. For example, calculation may be performed based on past frame images.

Next, an example of flow of the block information generating processing executed in step S132 in FIG. 14 will be described with reference to the flowchart in FIG. 15.

Upon the block information generating processing being started, in step S151 the processing object slice region identifying unit 141 identifies the region of the slice to be processed.

In order to know the region of the current slice which is to be processed, this can be found by knowing the macroblocks included in the current slice, and knowing the pixels included in the macroblocks therefrom. The processing object slice region identifying unit 141 obtains the start macroblock address of the current slice from the slice header.

Now, the start macroblock address is a number assigned to macroblocks in raster scan order from the upper left of the screen. As shown in FIG. 5, the macroblock address at the upper left in the image (frame 151) is 0. Slice 0 is started from the upper left of the frame 151, so the macroblock address of the start macroblock 156-1 of the slice 0 is 0. Following this order, we will way that the macroblock address of the end macroblock 156-2 of the slice 0 is E0. Also, in the same way as with this slice 0, the macroblock address of the start macroblock 157-1 of slice 1 is S1, and the macroblock address of the end macroblock 157-1 is E1. Further, the macroblock address of the start macroblock 158-1 of slice 2 is S2, and the macroblock address of the end macroblock 158-2 is E2.

As the current slice is decoded, one macroblock address is added each time decoding processing of one macroblock is completed, and eventually the end macroblock of the current slice is reached. A flag indicating the end macroblock of the slice is set at the end macroblock. Due to these, all macroblock addresses which the current slice holds can be known. That is to say, this is from the start macroblock address to the end macroblock address.

Now, with a sequence parameter set (SPS (Sequence Parameter Set)) of an AVC stream (image compression information), the image size of one frame is indicated by the number of macroblocks. pic_height_in_map_units_minus1 indicates the number of macroblocks in the vertical direction of the image. pic_width_in_mbs_minus1 indicates the number of macroblocks in the horizontal direction of the image.

Accordingly, from the macroblock address, the position of the macroblock is expressed by the following Expression (2) and Expression (3).

$$mbx=\text{macro block address} \% \text{pic\_width\_in\_}mbs\text{\_minus1} \quad (2)$$

$$mby=\text{floor[macro block address/pic\_width\_in\_}mbs\text{\_minus1]} \quad (3)$$

In Expression (2) and Expression (3), mbx indicates which number from the left the macroblock is, and mby indicates what number from the top the macroblock is. Also, floor [z] indicates z being rounded out at the decimal so as to be an integer, and A % B indicates the remainder of having divided A with B.

If we say that the size of the macroblock is determined to be 16×16 pixels, the vertical direction and horizontal direction position of the pixel at the upper left of the macroblock is (16×mbx, 16×mby), and the pixels included in the macroblock are pixels included in the range of 16 pixels to the lower direction and 16 pixels to the right direction from the upper left pixel position. Thus far, all pixels of the current slice can be known. That is to say, the region of the slice to be processed is identified.

Figure 15:
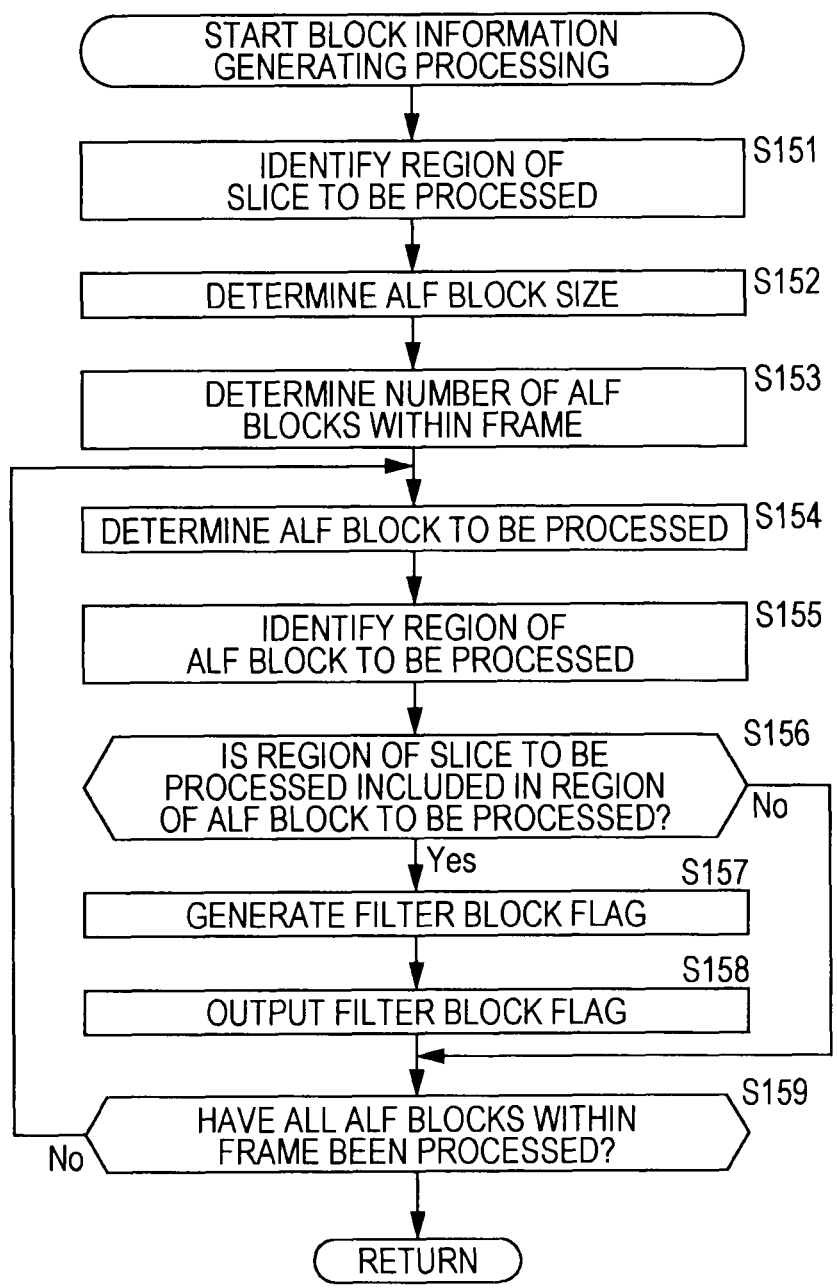
FIG. 15 is a flowchart describing an example of the flow of block information generating processing.

In step S152 in FIG. 15, the ALF block setting unit 142 determines the ALF block size. In step S153, the ALF lock setting unit 142 determines the number of ALF blocks within a frame. Since the image size of the frame is determined beforehand, upon the ALF block size being determined, the number of ALF blocks necessary to pave ALF blocks with the upper left of the frame as the point of origin (number of ALF blocks within the frame) can also be calculated. The setting values of the vertical direction size (number of pixels) and horizontal direction size (number of pixels) of the ALF blocks are provided beforehand, so the ALF block setting unit 142 determines size of the ALF blocks and the number of ALF blocks following the setting values, and places the ALF blocks as to the decoded image.

Note that the number of ALF blocks is calculated by the following Expression (4) and Expression (5).

$$\text{num\_alf\_block\_}x=\text{floor[(16×(pic\_width\_in\_}mbs\text{\_minus1+1)+(alf\_block\_size−1))/alf\_block\_size]} \quad (4)$$

$$\text{num\_alf\_block\_}y=\text{floor[(16×(pic\_height\_in\_map\_units\_minus1+1)+(alf\_block\_size−1))/alf\_block\_size]} \quad (5)$$

In Expression (4) and Expression (5), num_alf_block_x and num_alf_block_y are the number of horizontal and vertical ALF blocks included in the image, respectively. Also, alf_block_size represents the size of one side of an ALF block. To simplify description here, we will say that ALF blocks are squares. Of course, an arrangement may be made where the vertical direction size and horizontal direction size of the ALF blocks are different from each other.

In step S154, the processing object ALF block region identifying unit 143 determines the ALF blocks to be processed. In step S155, the processing object ALF block region identifying unit 143 determines the region of the ALF block to be processed.

The position of the i'th ALF block is expressed by the following Expression (6) and Expression (7).

$$\text{alf\_block\_}x = i\% (\text{num\_alf\_block\_}x - 1) \quad (6)$$

$$\text{alf\_block\_}y = \text{floor}[i/(\text{num\_alf\_block\_}x - 1)] \quad (7)$$

In Expression (6) and Expression (7), alf_block_x and alf_block_y each indicate what number in the horizontal direction and vertical direction the i'th ALF block is. The position of the upper left pixel of the i'th ALF block is a position obtained by multiplying each of alf_block_x and alf_block_y by the alf_block_size. That is to say, the horizontal direction is 16×alf_block_x, and the vertical direction is 16×alf_block_y. Accordingly, the region of the i'th ALF block is a range of alf_block_size_x alf_block_size from the upper left pixel thereof.

In step S156, the determining unit 144 determines whether or not a region of the slice to be processed is included within the region of the ALF block to be processed which has been identified as described above.

In the event that determination is made that the region of the slice to be processed is included within the region of the ALF block to be processed, the flow advances to step S157. The ALF block to be processed is an ALF block necessary to the slice to be processed, whereby in step S157 the filter block flag generating unit 145 generates a filter block flag for the ALF block thereof. In step S158, the filter block flag generating unit 145 outputs the generated filter block flag.

Upon the processing in step S158 ending, the flow advances to step S159. Also, in step S156, in the case determination is made that the region of the slice to be processed is not included within the region of the ALF block to be processed, the ALF block is unnecessary to the slice to be processed, whereby the flow advances to step S159.

In step S159, determination is made as to whether or not the processing object ALF block region identifying unit 143 has processed all of the ALF blocks within a frame, and in the case determination is made the processing has not been performed, the flow returns to step S154, a new ALF block is set to be processed, and the processing thereafter is repeated. Each time this loop processing is repeated, the processing object ALF block region identifying unit 143 selects an ALF block from an ALF block group paved in a frame region as an ALF block to be processed, one at a time from the upper left ALF block in the order of raster scan.

Figure 13:
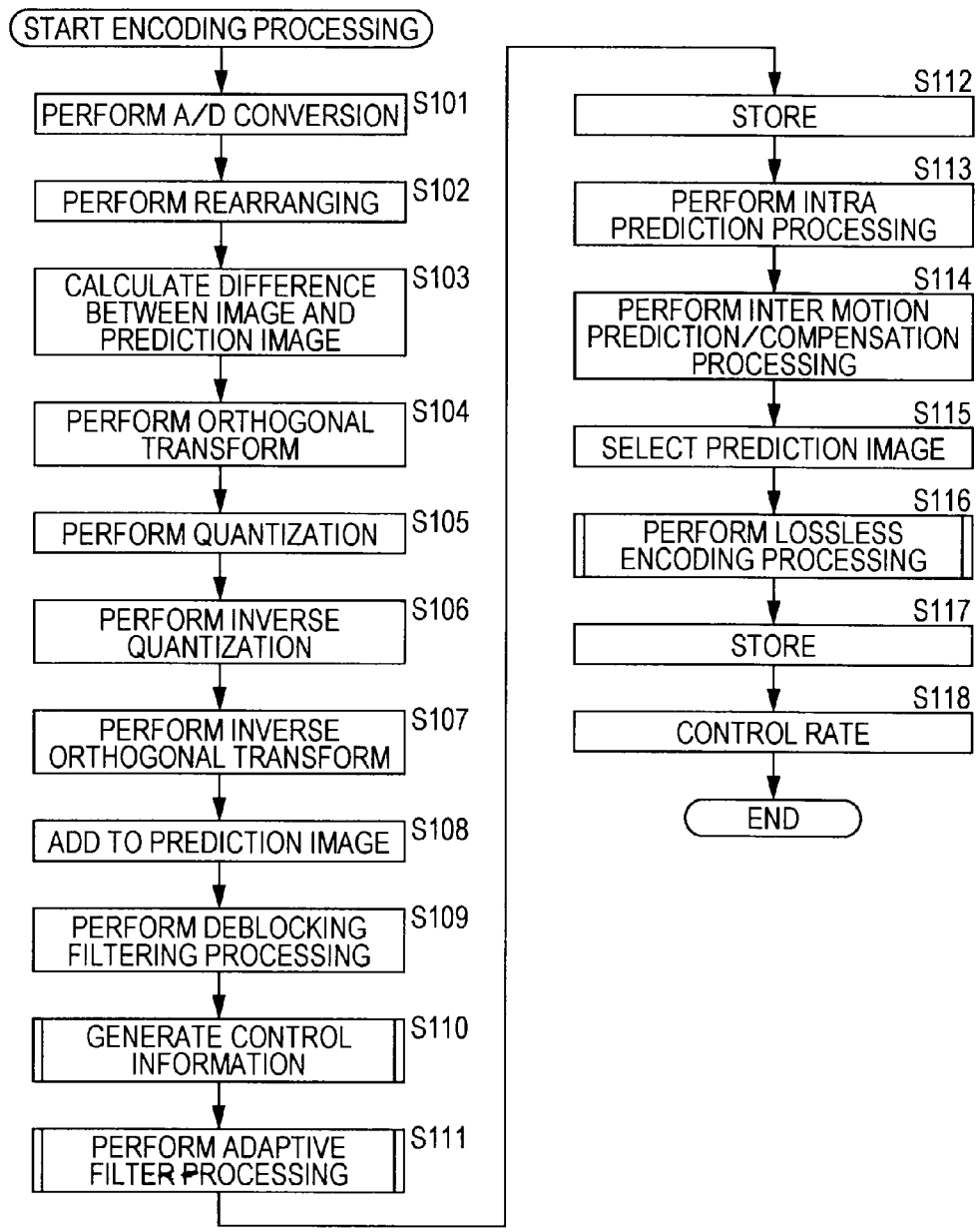
FIG. 13 is a flowchart describing an example of the flow of encoding processing.
Figure 14:
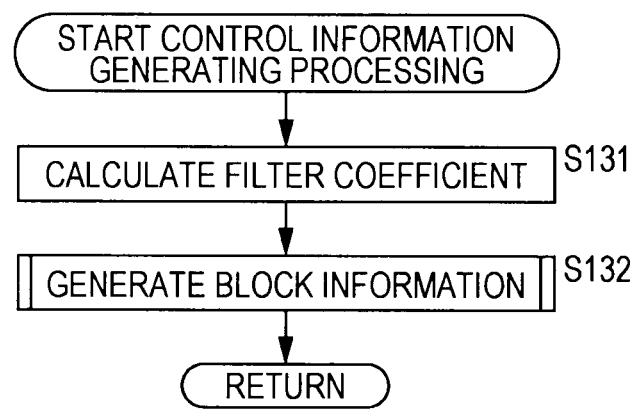
FIG. 14 is a flowchart describing an example of the flow of control information generating processing.

Also, in the case determination is made in step S159 that all of the ALF blocks within the frame have been processed, the block information generating processing is ended, the flow returns to step S132 in FIG. 14, the control information generating processing is ended, the flow returns to step S110 in FIG. 13, and the processing in step S111 and thereafter is performed.

Note that in the above description, in the event that ALF blocks are disposed so as to pave a region of a frame image, the frame upper left is described to be the origin point, but the position of this origin point is optional. For example, this may be the lower left, lower right, upper right, or center of the frame. However, the position of the origin point and the manner of ordering the ALF blocks need to be determined beforehand so as to be common between the encoding processing and decoding processing.

Also, in the above description, the order of selecting the ALF blocks to be processed is described as being in order of raster scan from the upper left, but the selection order and starting position herein is optional.

Figure 16:
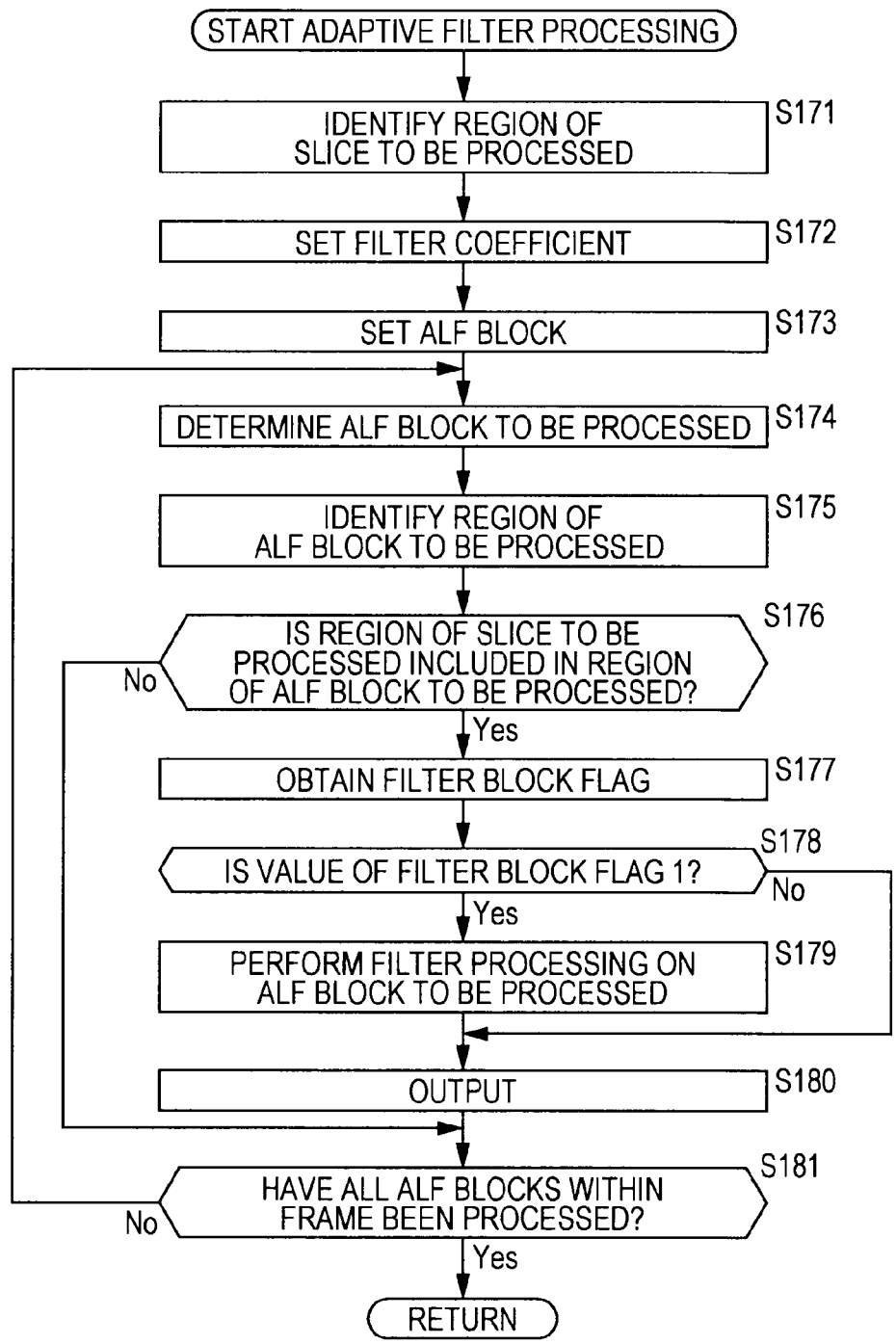
FIG. 16 is a flowchart describing an example of the flow of adaptive filter processing.

Next, an example of flow of the adaptive filter processing executed in step S111 in FIG. 13 will be described with reference to the flowchart in FIG. 16.

Upon the adaptive filter processing being started, a decoded image of the slice to be processed is supplied to the adaptive filter 172 and selecting unit 173. In step S171, the control unit 171 identifies the region of the slice to be processed. As with the case of processing in step S151 in FIG. 15, the control unit 171 obtains a start macroblock address of the relevant slice of the slice header, further detects the flag identifying the last macroblock, and identifies the region from the start macroblock to the last macroblock as the region of the slice to be processed.

In step S172 the control unit 171 obtains the filter coefficient generated by the control information generating unit 112, and sets the filter coefficient in the adaptive filter 172. In step S173 the control unit 171 obtains the ALF block size determined by the control information generating unit 112, and sets (disposes) the ALF blocks in the ALF block size thereof so as to pave the entire region of the frame.

In step S174, the control unit 171 determines one of the unprocessed ALF blocks, from the ALF block group thus set, to be the ALF block to be processed, as with the case of step S154 in FIG. 15. The ALF block selection order is determined beforehand, and is common with the selection order of that of the control information generating unit 112.

In step S175, the control unit 171 identifies the region of the determined ALF block to be processed, as with the case in step S155 in FIG. 15.

In step S176, the control unit 171 determines whether or not the region of the slice to be processed is included within the region of the ALF block to be processed, in the same way as with the case of step S156 in FIG. 15. In the case determination is made that this is included, the flow advances to step S177.

In step S177, the control unit 171 obtains the filter block flag of the ALF block to be processed that has been generated by the control information generating unit 112. The control information generating unit 112 generates the filter block flag as described above, whereby, actually only the filter block flag for the ALF block including the region of the slice to be processed is supplied. The processing order of the ALF block is common with that of the control information generating unit 112, whereby the filter block flags are supplied in the order of ALF block processing. Accordingly, the control unit 171 obtains (uses) the filter block flags in the supplied order thereof, and therefore can obtain (use) the filter block flag of the ALF block to be processed.

Note that the supplying timing of the filter block flag, and the obtaining timing of the filter block flag by the control unit 171, do not have to match. That is to say, the control unit 171 may temporarily hold the filter block flag supplied from the control information generating unit 112 in a built-in buffer or the like, for example, and read out the filter block flag from the buffer during the processing in step S177. In this case also, by setting the order of reading out the filter block flags to be the order supplied from the control information generating unit 112, i.e. the same as the order of storing in the buffer, the control unit 171 can obtain the filter block flag of the ALF block to be processed.

In step S178, the control unit 171 determines whether or not the value of the filter block flag is 1. In the case that the value of the filter block flag is 1, and instructions are given to perform filter processing on the region of the ALF block to be processed, the flow advances to step S179. In step S179, the adaptive filter 172 is controlled by the control unit 171 to perform filter processing on the ALF block to be processed. Upon ending the processing in step S179, the flow advances to step S180. In this case, in step S180, the selecting unit 173 is controlled by the control unit 171 to select the output from the adaptive filter 172, and outputs this in the frame memory 114. That is to say, (a region of a portion of) the decoded image subjected to filter processing is stored in the frame memory 114. Upon the processing in step S180 ending, the flow advances to step S181.

Also, in step S178, in the case that the value of the filter block flag is 0 and that instructions are given for filter processing to not be performed on the region of the ALF block to be processed, the processing in step S179 is omitted, and the flow advances to step S180. In this case, the selecting unit 173 is controlled by the control unit 171 to select the output from the deblocking filter 111, and outputs this to the frame memory 114 instep S180. That is to say, (a region of a portion of) the decoded image not subjected to filter processing is stored in the frame memory 114. Upon the processing in step S180 ending, the flow advances to step S181.

Also, in the case determination is made in step S176 that the region of the slice to be processed is not included in the region of the ALF block to be processed, the ALF block to be processed is an ALF bloc that is not related to the slice to be processed, so the processing in step S177 through step S180 is omitted, and the flow advances to step S181.

In step S181, the control unit 171 determines whether or not all of the ALF blocks within the frame have been processed. In the case determination is made that unprocessed ALF blocks exist, the flow returns to step S174, and the processing thereafter is repeated for a new ALF block to be processed. Each time the loop processing herein is repeated, the control unit 171 selects an ALF block from an ALF block group paved in a frame region as an ALF block to be processed, one at a time from the upper left ALF block in the order of raster scan.

Also, in the case determination is made in step S181 that all of the ALF blocks within the frame have been processed, the adaptive filter processing is ended, the flow returns to step S111 in FIG. 13, and the processing in step S112 and thereafter is performed.

By thus performing adaptive filter processing, the adaptive filter processing unit 113 can appropriately execute the filter processing as to the slice to be processed, based on the filter block flag of the portion of ALF blocks within the frame, necessary for the slice to be processed in the multiple slices formed in the frame. Thus, the adaptive filter processing unit 113 can reduce block noise and noise from quantization of the slice to be processed that could not be removed with the deblocking filter.

Figure 17:
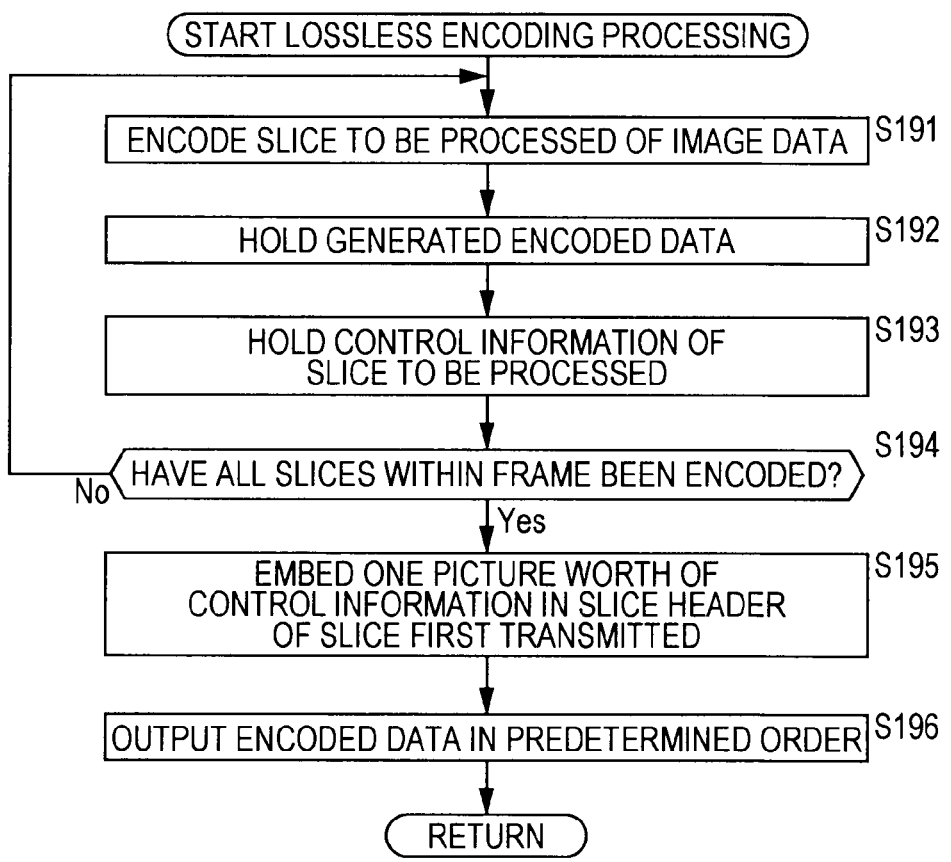
FIG. 17 is a flowchart describing an example of the flow of lossless encoding processing.

Next, an example of flow of lossless encoding processing executed in step S116 in FIG. 13 will be described with reference to the flowchart in FIG. 17.

Upon the lossless encoding processing starting, in step S191 the encoding unit 181 of the lossless encoding unit 106 sequentially encodes the supplied image data (quantized coefficient data), thereby encoding the slice to be processed and generating encoded data.

In step S192, the encoded data holding unit 182 holds the encoded data generated in step S191. In step S193, the control information holding unit 183 holds the control information corresponding to a slice (slice to be processed) to which encoded data belongs, supplied from the control information generating unit 112.

The various processing in step S191 through step S193 as described above is performed for each slice within the frame. Upon processing ending for one slice worth, in step S194 the control information adding unit 184 determines whether or not the encoding unit 181 has encoded image data (quantized coefficient data) for all of the slices within the frame. In the case determination is made that an unprocessed slice exists, the flow returns to step S191, and the processing thereafter is repeated.

In step S194, in the case determination is made that all of the slices within the frame have been encoded by the encoding unit 181, the flow advances to step S195.

In step S195, the control information adding unit 184 embeds the control information held in the control information holding unit 183 into the slice header of the slice first transmitted of the encoded data for one frame worth that is held in the encoded data holding unit 182. At this time, the control information adding unit 184 obtains and compiles the control information held in the control information holding unit 183, and generates control information worth one picture of the frame (picture) to which the encoded data belongs. The control information adding unit 184 embeds the one picture worth of control information thereof into the slice header.

That is to say, into the one frame worth of encoded data made up of multiple slices, one frame (picture) worth of control information (filter coefficient, ALF block size, filter block flag, and the like) is added (embedded) in one of the slice headers thereof.

That is to say, control information of multiple slices is added to one slice header (control information of other slices is also added). In the case of embedding the control information into multiple slice headers by slice, duplicative content can occur in the control information, but the control information adding unit 184 compiles and adds the one frame worth of control information into one slice header, whereby such redundancy can be reduced, and encoding efficiency can be improved.

Now, to "add" means to correlate the control information to the encoded data with an optional form. For example, this may be described as a syntax of the encoded data, or may be described as user data. Also, the block information may be in a state linked with the encoded data as metadata. That is to say, to "add" includes "embedding", "description", "multiplexing", "linking", and so forth.

The control information adding unit 184, which has added the control information to the encoded data, in step S196 outputs the encoded data in a predetermined order. Upon outputting one picture worth of encoded data, the lossless encoding unit 106 ends lossless encoding processing, returns to step S116 in FIG. 13, and advances to the processing in step S117 and thereafter.

By performing such lossless encoding processing, the image encoding device 100 can suppress the reduction in encoding efficiency by local control of the filter processing at the time of encoding or at the time of decoding. For example, in the case of dividing up the various frames of the image into multiple slices and processing, the image encoding device 100 can suppress reduction of the encoding efficiency.

2. Second Embodiment

Configuration of Device

Figure 18:
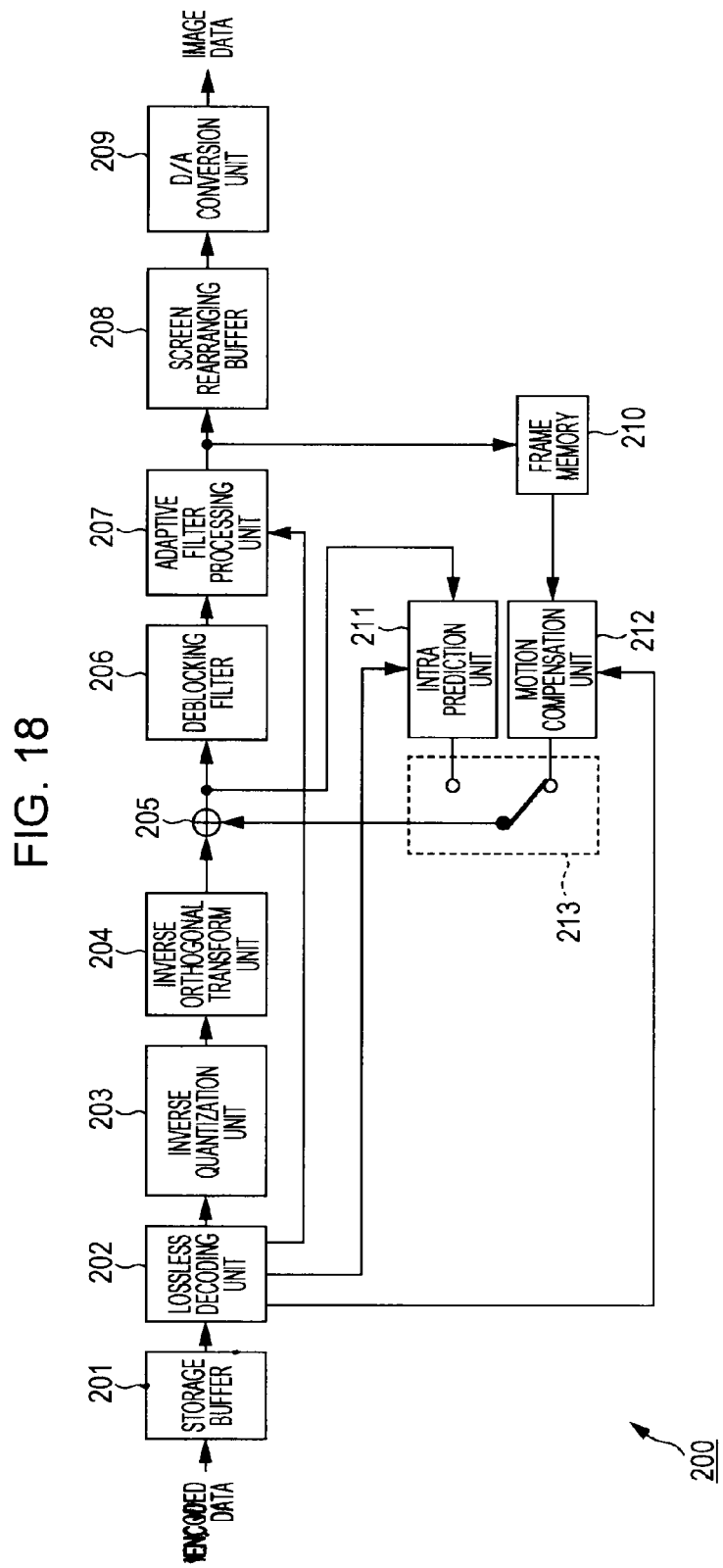
FIG. 18 is a block diagram illustrating a principal configuration example of an image decoding device to which the present invention has been applied.

Next, an image decoding device corresponding to the image encoding device 100 described with the first embodiment will be described. FIG. 18 is a block diagram illustrating the configuration example of an embodiment of an image decoding device serving as an image processing device to which the present invention has been applied.

An image decoding device 200 decodes encoded data output from the image encoding device 100, and generates a decoded image.

An image decoding device 200 is configured of a storing buffer 201, a lossless decoding unit 202, an inverse quantization unit 203, an inverse orthogonal transform unit 204, a computing unit 205, and a deblocking filter 206. the image decoding device 200 also has an adaptive filter processing unit 207. The image decoding device 200 further has a screen rearranging buffer 208 and a D/A (Digital/Analog) conversion unit 209. The image decoding device 200 also has frame memory 210, an intra prediction unit 211, a motion compensation unit 212, and a selecting unit 213.

The storing buffer 201 stores a transmitted compressed image information. The lossless decoding unit 202 decodes information supplied from the storing buffer 201 and encoded by the lossless encoding unit 106 in FIG. 1 using a format corresponding to the encoding format of the lossless encoding unit 106.

In the event that the current macroblock has been intra encoded, the lossless decoding unit 202 extracts the intra prediction mode information stored in the header portion of the encoded data, and transmits this to the intra prediction unit 211. Also, in the event that the current macroblock has been inter encoded, the lossless decoding unit 202 extracts the motion vector information stored in the header portion of the encoded data, and transfers this to the motion compensation unit 212.

Also, the lossless decoding unit 202 extracts one picture worth of control information (control information generated by the control information generating unit 112) for the adaptive filter from the slice header of the slice first supplied within the frame, of the encoded data, and supplies this to the adaptive filter processing unit 207.

The inverse quantization unit 203 subjects the image decoded by the lossless decoding unit 202 to inverse quantization using a format corresponding to the quantization format of the quantization unit 105 in FIG. 1. The inverse orthogonal transform unit 204 subjects the output of the inverse quantization unit 203 to inverse orthogonal transform using a format corresponding to the orthogonal transform format of the orthogonal transform unit 104 in FIG. 1.

The computing unit 205 adds the prediction image supplied from the selecting unit 213 to the difference information subjected to inverse orthogonal transform, and generates a decoded image. The deblocking filter 206 removes the block noise of the decoded image which has been generated by the adding processing.

The adaptive filter processing unit 207 performs filter processing on the image supplied from the deblocking filter 206 based on the information of the filter coefficient, ALF block size, and filter block flag and the like, included in the one picture worth of control information supplied from the lossless decoding unit 202. The adaptive filter processing unit 207 performs adaptive filter processing in the same way as with the adaptive filter processing unit 113 in FIG. 1. Accordingly, the adaptive filter processing unit 207 can reduce block noise and noise due to quantization which could not be completely removed with the deblocking filter 206.

The adaptive filter processing unit 207 supplies the image following filter processing to the frame memory 210 so as to be stored as reference image information, and also outputs to the screen rearranging buffer 208.

The screen rearranging buffer 208 performs rearranging of images. That is to say, the order of frames rearranged for encoding by the screen rearranging buffer 102 in FIG. 1 is rearranged to the original display order. The D/A conversion unit 209 performs D/A conversion of the image supplied from the screen rearranging buffer 208, and outputs. For example, the D/A conversion unit 209 outputs the output signals obtained by performing D/A conversion to an unshown display, and displays an image.

The intra prediction unit 211 generates a prediction image based on the information supplied from the lossless decoding unit 202 in the event that the current frame has been intra encoded, and outputs the generated prediction image to the selecting unit 213.

In the event that the current frame has been inter encoded, the motion compensation unit 212 performs motion compensation processing as to the reference image information stored in the frame memory 210, based on the motion vector information supplied from the lossless decoding unit 202.

In the event that the current macroblock has been intra encoded, the selecting unit 213 connects to the intra prediction unit 211, and supplies the image supplied from the intra prediction unit 211 to the computing unit 205 as a prediction image. Also, in the event that the current macroblock has been inter encoded, the selecting unit 213 connects to the motion compensation unit 212 and supplies the image supplied from the motion compensation unit 212 to the computing unit 205 as a prediction image.

Figure 19:
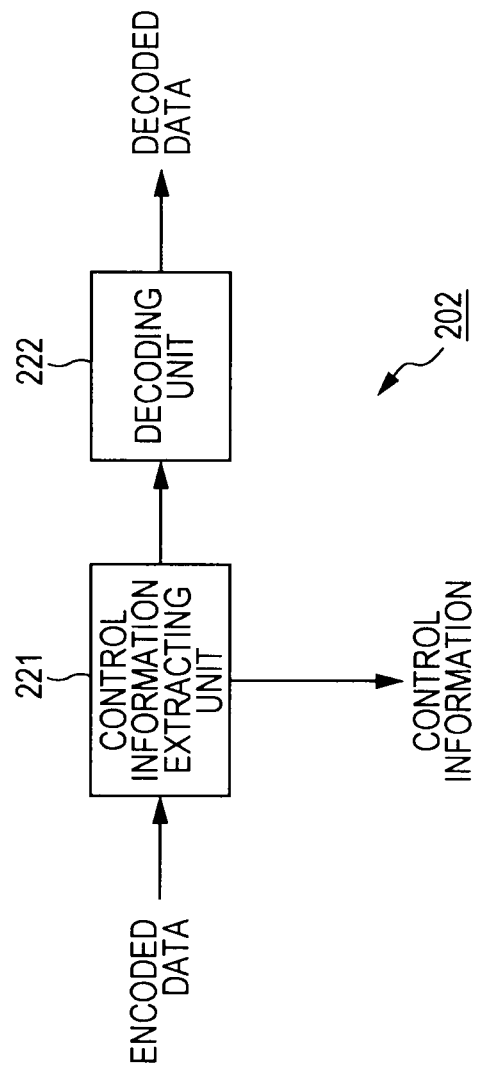
FIG. 19 is a block diagram illustrating a principal configuration example of a lossless decoding unit.

FIG. 19 is a block diagram showing a detailed configuration example of the lossless decoding unit 202 in FIG. 18. Note that description of a configuration relating to extraction of intra-prediction mode information and motion vector information will be omitted, for simplicity of description.

As shown in FIG. 19, the lossless decoding unit 202 has a control information extracting unit 221 and decoding unit 222. The control information extracting unit 221 obtains encoded data from the storing buffer 201, extracts one picture worth of control information from the slice header of the slice supplied first within the frame, and supplies this to the adaptive filter processing unit 207.

The decoding unit 222 decodes the encoded data supplied from the control information extracting unit 221 with a decoding method corresponding to the encoding method of the lossless encoding unit 106, and generates decoded data (quantized coefficient data). The decoding unit 222 supplies the generated decoded data to the inverse quantization unit 203.

Thus, the control information extracting unit 221 extracts the control information embedded in the slice header of the encoded data, and supplies this to the adaptive filter processing unit 207, whereby the adaptive filter processing unit 207 can appropriately perform adaptive filter processing based on the control information thereof. That is to say, the adaptive filter processing unit 207 can perform adaptive filter processing similar to the adaptive filter processing unit 113 of the image encoding device 100.

[Flow of Processing]

Figure 20:
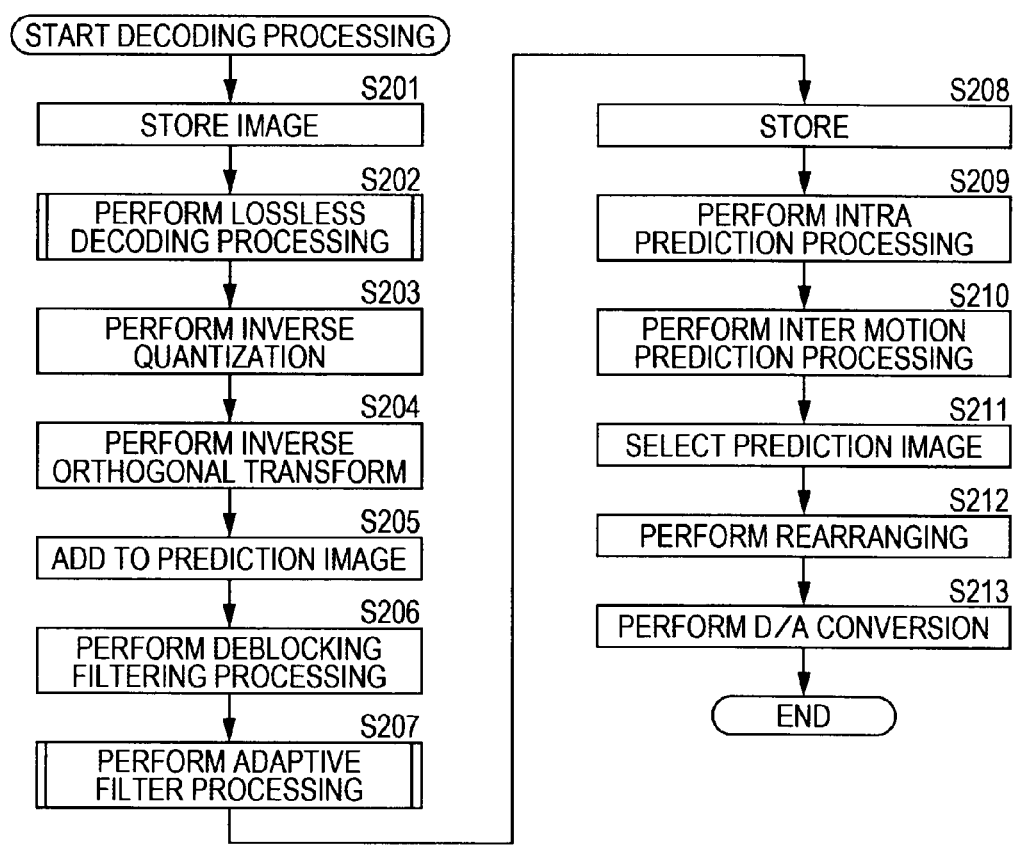
FIG. 20 is a flowchart describing an example of the flow of decoding processing.

An example of the flow of decoding processing which this image decoding device 200 executes will be described with reference to the flowchart in FIG. 20.

In step S201, the storing buffer 201 stores the transmitted image (encoded data). In step S202, the lossless decoding unit 202 performs lossless decoding processing to subject the encoded data supplied from the storing buffer 201 to lossless decoding.

While details will be described later, with the lossless decoding processing herein, the I picture, P picture, and B picture encoded by the lossless encoding unit 106 in FIG. 1 are decoded. Note that at this time, the motion vector information, reference frame information, prediction mode information (information indicating the intra prediction mode or inter prediction mode), and so forth are also extracted.

Specifically, in the event that the prediction mode information is intra prediction mode information, the prediction mode information is supplied to the intra prediction unit 211. In the event that the prediction mode information is inter prediction mode information, motion vector information and reference frame information corresponding to the prediction mode information are supplied to the motion compensation unit 212.

Also, with the lossless decoding processing herein, one picture worth of control information for adaptive filter processing is extracted from the slice header of the encoded data, and is supplied to the adaptive filter processing unit 207.

In step S203, the inverse quantization unit 203 inversely quantizes the transform coefficient decoded in step S202 using a property corresponding to the property of the quantization unit 105 in FIG. 1. In step S204, the inverse orthogonal transform unit 204 subjects the transform coefficient inversely quantized in step S203 to inverse orthogonal transform using a property corresponding to the property of the orthogonal transform unit 104 in FIG. 1. This means that difference information corresponding to the input of the orthogonal transform unit 104 in FIG. 1 (the output of the computing unit 103) has been decoded.

In step S205, the computing unit 205 adds the prediction image selected in the processing in later-described step S211 to the difference information. Thus, the original image is decoded. In step S206, the deblocking filter 206 subjects the image output from the computing unit 205 to filtering. Thus, block noise is removed.

In step S207, the adaptive filter processing unit 207 further performs adaptive filter processing on the image which has been subjected to deblocking filter processing. This adaptive filter processing is the same as the processing which the adaptive filter processing unit 113 in FIG. 1 performs. That is to say, this adaptive filter processing is the same as the case described with reference to the flowchart in FIG. 16, other than using the control information supplied from the lossless decoding unit 202. Note however, the control information supplied from this lossless decoding unit 202 has been generated by the control information generating unit 112 in FIG. 1, and is substantially equivalent to the control information supplied from the control information generating unit 112 which the adaptive filter processing unit 113 in FIG. 1 uses.

Due to this adaptive filter processing, block noise and noise due to quantization which could not be completely removed with the deblocking filter processing can be reduced.

In step S208, the frame memory 210 stores the image subjected to filtering.

In the event that intra prediction mode information has been supplied, in step S209 the intra prediction unit 211 performs intra prediction processing in the intra prediction mode. Also, in the event that inter prediction mode information has been supplied, in step S210 the motion compensation unit 212 performs motion compensation processing in the inter prediction mode.

In step S211, the selecting unit 213 selects a prediction image. That is to say, one of the prediction image generated by the intra prediction unit 211 and the prediction image generated by the motion compensation unit 212 is selected, and the selected prediction image is supplied to the computing unit 205.

For example, in the event of an image which has been intra encoded, the selecting unit 213 selects a prediction image generated by the intra prediction unit 211 and supplies this to the computing unit 205. Also, in the event of an image which has been inter encoded, the selecting unit 213 selects a prediction image generated by the motion compensation unit 212 and supplies this to the computing unit 205.

In step S212, the screen rearranging buffer 208 performs rearranging. Specifically, the sequence of frames rearranged for encoding by the screen rearranging buffer 102 of the image encoding device 100 in FIG. 1 is rearranged to the original display sequence.

In step S213, the D/A conversion unit 209 performs D/A conversion of the image from the screen rearranging buffer 208. This image is output to an unshown display, and the image is displayed.

Thus, with the image decoding unit 200, the lossless decoding unit 202 extracts control information supplied from the image encoding device 100 and decodes, and the adaptive filter processing unit 207 performs adaptive filter processing the same as with the adaptive filter processing unit 113 of the image encoding device 100, using this control information.

Figure 21:
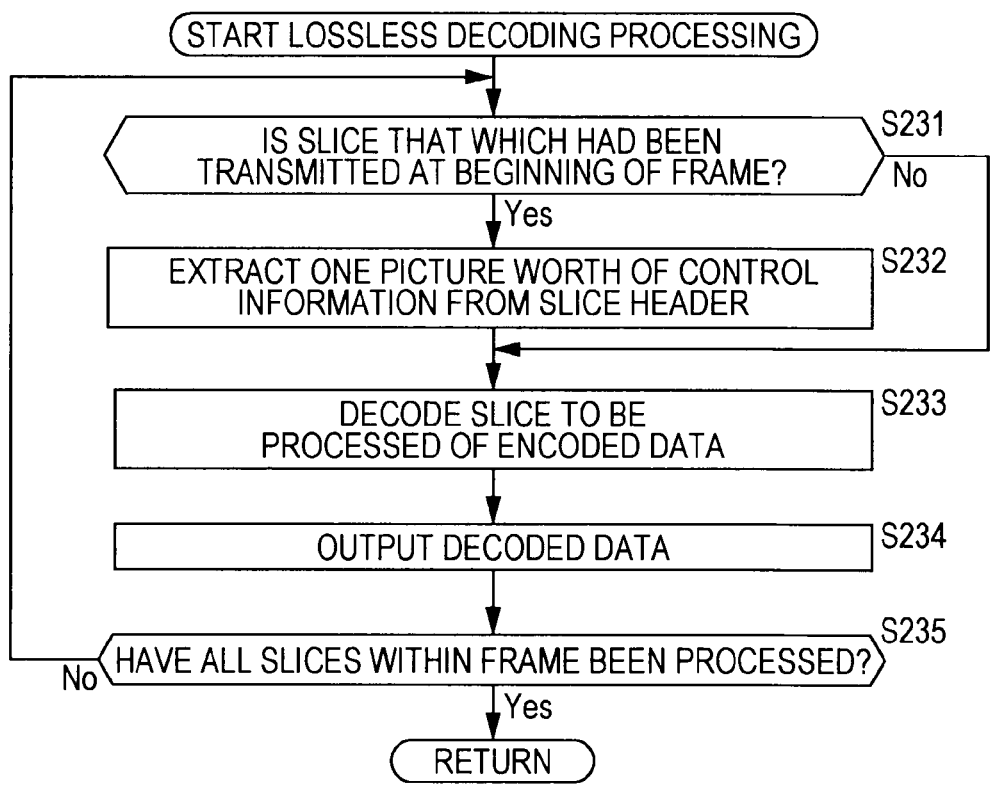
FIG. 21 is a flowchart describing an example of the flow of lossless decoding processing.

Next, an example of flow of lossless decoding processing executed in step S202 in FIG. 20 will be described with reference to the flowchart in FIG. 21.

Upon the lossless decoding processing being started, the control information extracting unit 221 determines in step S231 whether or not the supplied encoded data is the slice first transmitted of the frame (picture).

For example, in the case that the frame number (frame_num) differs from the slices up to now, the slice thereof is the first slice of the relevant picture. Also, for example, in the case that the flag indicating either the frame picture or the field picture (field_pic_flag) differs from the slices up to now, the slice thereof is the first slice of the relevant picture. Further, for example, in the case that the flag indicating either a top field or bottom field (bottom_field_flag) differs from the slices up to now, the slice thereof is the first slice of the relevant picture. Also, for example, in the case that the frame number (frame_num) is the same and the value of the picture order count POC differs from the slices up to now, the slice thereof is the first slice of the relevant picture. Further, for example, in the case that nal_ref_idc information differs from the slices to up now, the slice thereof is the first slice of the relevant picture. Also, in the case of an IDR picture, wherein idr_pic_idc information differs from the slices to up now, the slice thereof is the first slice of the relevant picture.

Accordingly, the control information extracting unit 221 references the values herein, and in the case that one of the values differs from the slices up to now, determines that the slice thereof is the first slice of the relevant picture.

It goes without saying that the control information extracting unit 221 may determine whether or not the slice is that which had been transmitted first, based on information other than this.

In step S231, in the case determination is made that the slice had been first transmitted of the frame, the flow advances to step S232. In step S232, the control information extracting unit 221 extracts one picture worth of control information from the slice header thereof, and supplies this to the adaptive filter processing unit 207.

Upon the control information being extracted, the flow advances to step S233. Also, in step S231, in the case determination is made that the supplied encoded data is not the slice first transmitted of the frame (picture), the flow advances to step S233.

In step S233, the decoding unit 222 decodes the slice to be processed of the encoded data. In step S234, the decoding unit 222 outputs the decoded and obtained decoded data (quantized coefficient data) to the inverse quantization unit 203. In step S235, the decoding unit 222 determines whether or not all of the slices within the frame have been processed. In the case determination is made that an unprocessed slice exists, the flow returns to step S231, and the processing thereafter is repeated. Also, in the case determination is made in step S235 that all of the slices within the frame have been processed, the lossless decoding processing is ended, the flow returns to step S207 in FIG. 20, and the processing in step S208 and thereafter is executed.

By performing lossless decoding processing in this manner, the lossless decoding unit 202 can extract the control information added to the encoded data, and supply this to the adaptive filter processing unit 207. Thus, the adaptive filter processing unit 207 can appropriately execute adaptive filter processing. Accordingly, the adaptive filter processing unit 207 can reduce block noise and noise due to quantization of the slice to be processed, which could not be completely removed with the deblocking filter.

Also, at this time, as described above, the control information is embedded in the slice header of the first slice of the relevant picture, and the control information extracting unit 221 appropriately detects the first slice of the relevant picture and extracts one picture worth of control information from the slice header thereof.

By doing so, the adaptive filter processing unit 207 can prepare the control information of the relevant picture at the point of processing the first slice, and can perform adaptive filter processing without undue delay. That is to say, in the event of performing adaptive filter processing on each slice, there is no need to provide unnecessary waiting time for preparation of the control information, whereby the adaptive filter processing unit 207 can perform adaptive filter processing in a similar processing time as the case of embedding the control information into each slice header.

Accordingly, the image decoding device 200 can suppress reduction of encoding efficiency by local control of the filter processing. For example, reduction of encoding efficiency can be suppressed even in the case of dividing each frame of the image into multiple slices and processing.

3. Third Embodiment

Brief Description of Example of Including Control Information in Header of Start Slice Note that while description has been made above that one picture worth of control information is added to the slice header of the slice first output (transmitted), but the control information may be added to the slice header of another slice. For example, control information may be added to the slice header of the start slice.

The start slice is the slice situated at the top in a frame (picture), for example. Also, the start slice is the slice with the smallest slice identification No., for example. Further, the start slice is the slice is a slice including a macroblock of which the MB address is "0", for example. Generally, these slices are all the same slice, but do not need to agree. In this case, the start slice is determined based on any one of the conditions.

That is to say, while the slice transmitted first as described with the first embodiment and second embodiment, is the slice identified by the processing order thereof, this start slice is a slice identified by the positional relation (e.g., identification No. or coordinates).

Figure 22:
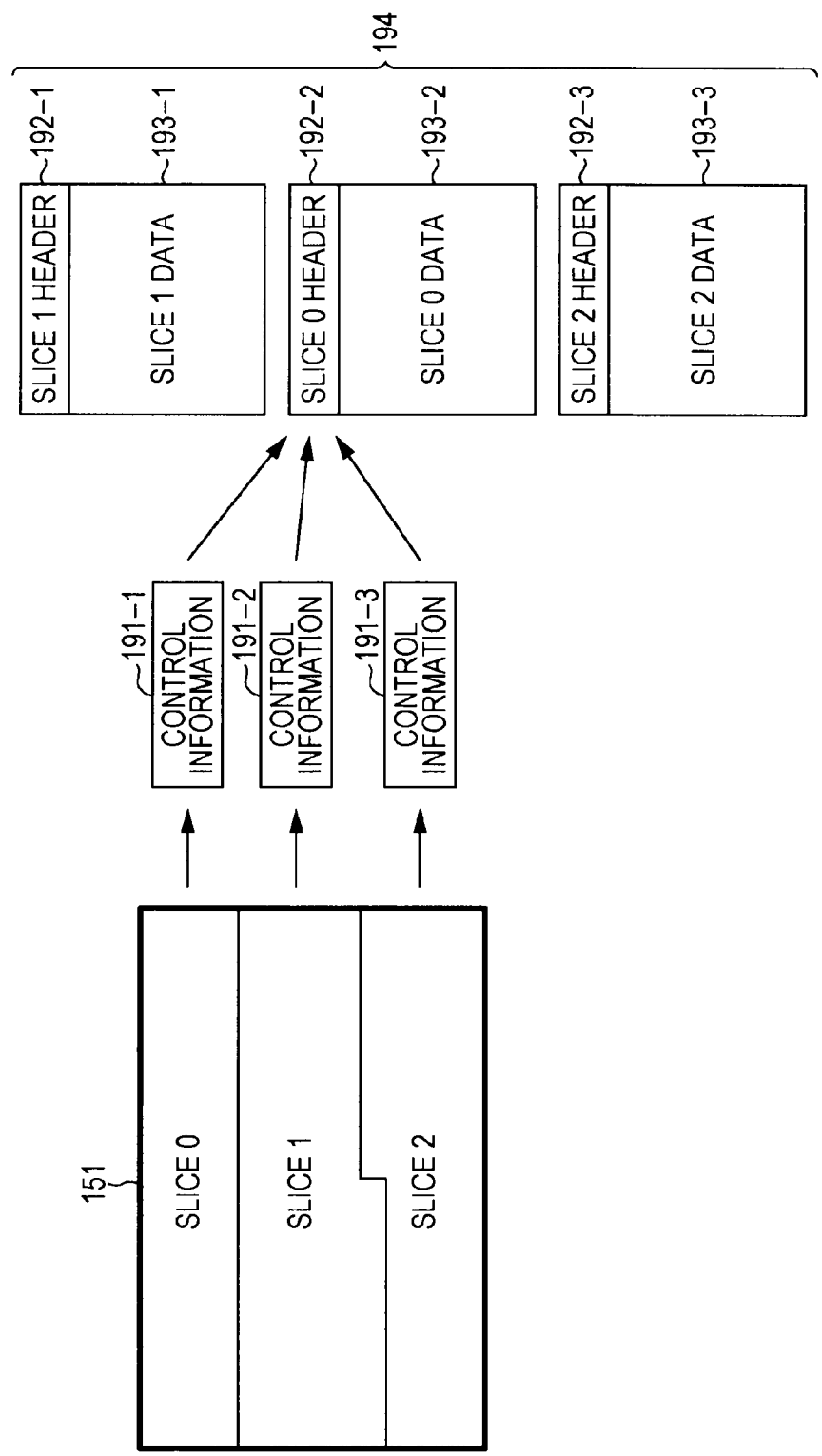
FIG. 22 is a diagram describing a situation including control information in the header of the start slice.

For example, let us say that as shown in FIG. 22, in a frame 151 configured of three slices (slice 0, slice 1, and slice 2), the slice 0 is set as the start slice.

In this case, control information 191-1 through control information 191-3 generated for the slices is all added to the slice 0 header 192-2 which is the slice header of the start slice, regardless of the order in which the slices are processed. The initial MB address of this slice 0 is 0. Accordingly, in this case, the control information extracting unit 221 references the value of first_mb_in_slice (information stipulating the first MB address in the slice) in the slice header, and if the value thereof is "0", it can be known that control information is included thereinafter. Accordingly, the control information extracting unit 221 can easily confirm the existence of control information without boundary inspection, and extract it.

However, as shown in FIG. 22 as well, the start slice is not necessarily transmitted first. In the case of the example in FIG. 22, the encoded data 194 is transmitted in the order of slice 1, slice 0, and slice 2.

Accordingly, in this case, the adaptive filter processing unit 207 cannot perform adaptive filter processing for slices transmitted before the start slice (slice 0 in the case of the example in FIG. 22) until the control information is extracted from the start slice.

[Encoding Side]

The configuration of the lossless encoding unit 106 of the image encoding device 100 in this case is the same as with the case of the first embodiment described with reference to FIG. 10.

Figure 23:
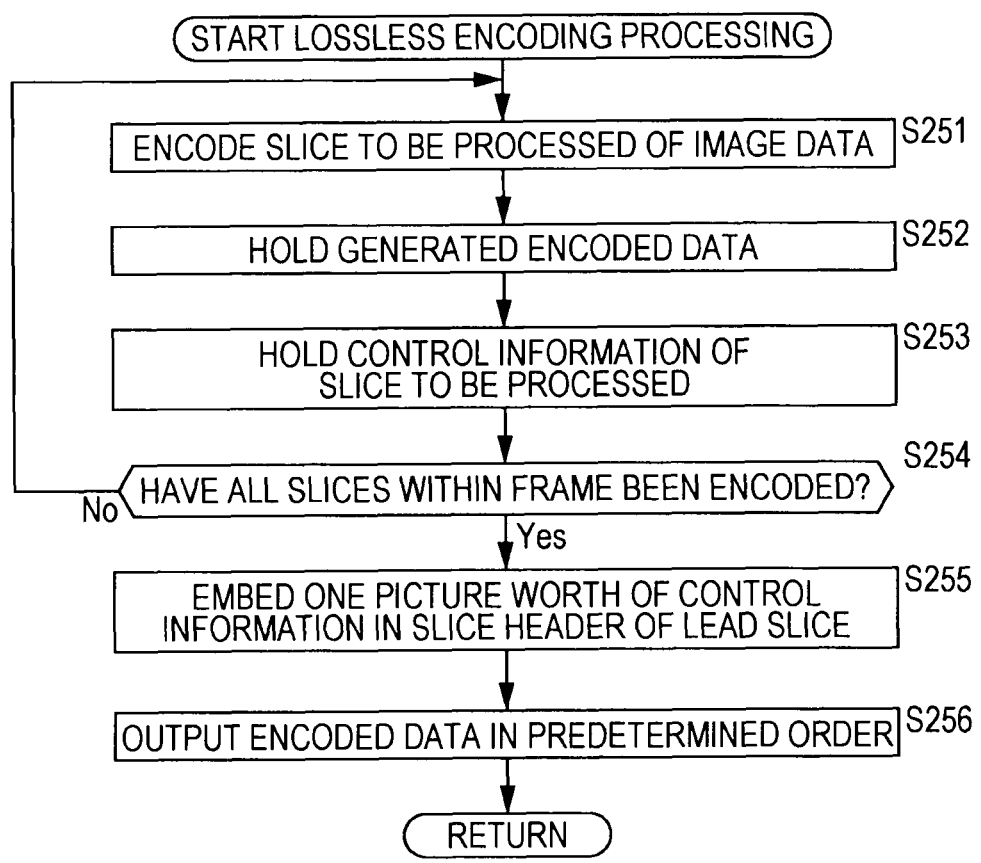
FIG. 23 is a flowchart describing another example of the flow of lossless encoding processing.

The flow of the lossless encoding processing in this case will be described with reference to the flowchart in FIG. 23. The flowchart in this FIG. 23 corresponds to the flowchart shown in FIG. 17.

In this case, as well, basically the same processing as with the case of the first embodiment is performed. That is to say, upon lossless encoding processing being started in step S116 of FIG. 13, each processing of step S251 through S254 is performed in the same way with each processing of step S191 through step S194 in FIG. 17, and quantized coefficient data is encoded for each slice.

In step S255, the control information adding unit 184 embeds the control information held at the control information holding unit 183 in the slice header of the start slice in the one frame worth of encoded data held in the encoded data holding unit 182. At this time, the control information adding unit 184 obtains and assembles control information held in the control information holding unit 183, and generates one picture worth of control information of the frame (picture) to which the encoded data belongs. The control information adding unit 184 embeds this one picture worth of control information in the slice header of the start slice.

In step S256, the control information adding unit 184 which has added the control information to the encoded data outputs the encoded data in a predetermined order. Upon outputting the one picture worth of encoded data, the lossless encoding unit 106 ends the lossless encoding processing, returns to step S116 in FIG. 13, and advances to the processing from step S117 on.

By performing such lossless encoding processing, the image encoding device 100 can suppress deterioration in encoding efficiency due to local control of filter processing, in the same way as with the first embodiment. Also, extracting of control information at the time of decoding can be facilitated.

[Decoding Side]

Figure 24:
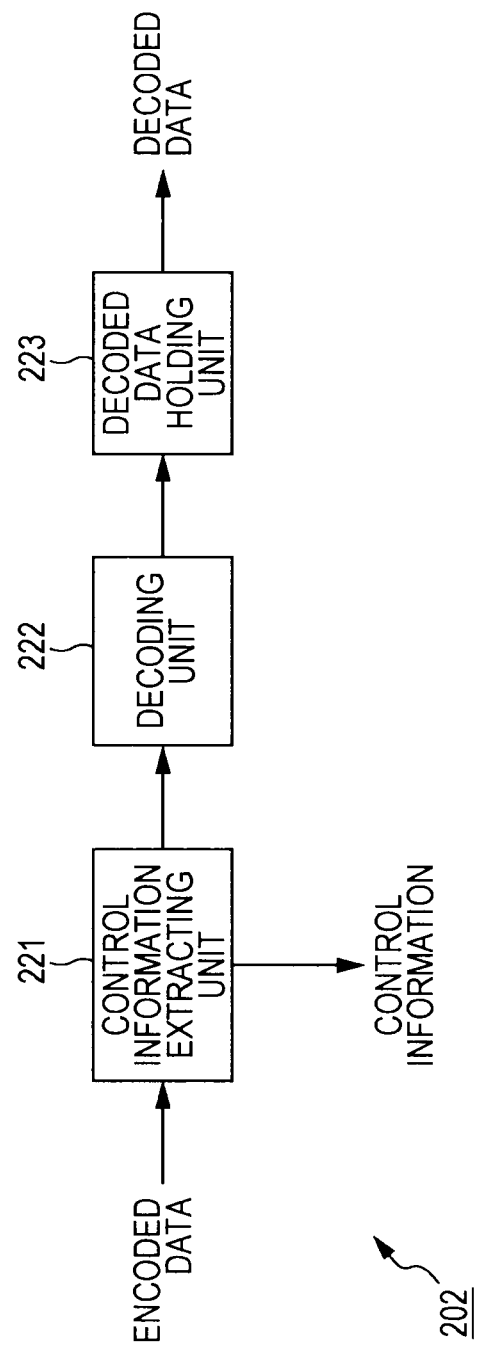
FIG. 24 is a block diagram illustrating another configuration example of a lossless decoding unit.

Next, description will be made regarding the image decoding device 200 according to the present embodiment. FIG. 24 is a block diagram illustrating a configuration example of the lossless decoding unit 202 of the image decoding device 200 in this case. As shown in FIG. 24, the lossless decoding unit 202 in this case has basically the same configuration as the lossless decoding unit 202 in the case of the second embodiment described with reference to FIG. 19.

However, in this case, the lossless decoding unit 202 further includes a decoded data holding unit 223. The decoded data holding unit 223 holds the decoded data decoded and generated at the decoding unit 222.

In the case of including the control information in the slice header of the start slice, control information is not obtained until the start slice is transmitted, as described above. Accordingly, the decoded data holding unit 223 holds the decoded data of the slice transmitted before the start slice, until the control information is obtained.

Figure 25:
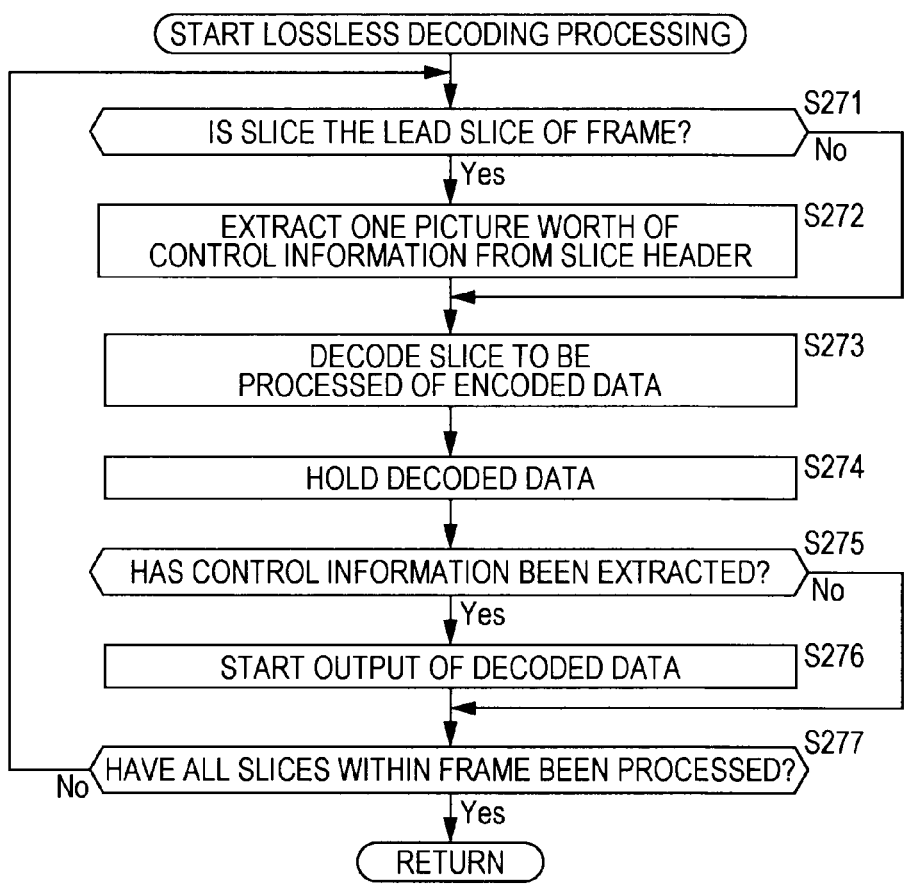
FIG. 25 is a flowchart describing another example of the flow of lossless decoding processing.

Next, an example of the flow of lossless decoding processing in this case which is executed in step S202 of FIG. 20 will be described with reference to the flowchart in FIG. 25. The flowchart in this FIG. 25 corresponds to the flowchart shown in FIG. 21.

In this case as well, processing is performed basically in the same way as with the case of the second embodiment. That is to say, upon the lossless decoding processing starting, in step S271 the control information extracting unit 221 determines whether or not the supplied encoded data is the start slice of the frame (picture).

For example, in the event that determination is made that the value of first_mb_in_slice in the slice header is "0" and accordingly is the start slice, the flow advances to step S272. In step S272, the control information extracting unit 221 extracts the one picture worth of control information from the slice header thereof, and supplies this to the adaptive filter processing unit 207.

Upon the control information having been extracted, the flow advances to step S273. Also, in the event that determination is made in step. S271 that the supplied encoded data is not the start slice, the flow advances to step S273.

In step S273, upon the encoded data being decoded by the decoding unit 222, in step S274 the decoded data holding unit 223 holds the decoded data which has been decoded and obtained.

In step S275, the decoded data holding unit 223 determines whether or not control information has been extracted by the control information extracting unit 221. In the event that determination has been made that this has been extracted, the decoded data holding unit 223 advances to step S276, and starts output of the encoded data that is held to the inverse quantization unit 203.

Upon output of decoded data starting, the flow advances to step S277. Also, in the event that determination is made in step S275 that control information has not been extracted for the current frame currently being processed, the flow advances to step S277.

In step S277, the control information extracting unit 221 determines whether or not all slices within the frame have been processed. Upon determination being made that there is an unprocessed slice existing, the flow returns to step S271, and the subsequent processing is repeated for the unprocessed slice. Also, in the event that determination is made in step S277 that all slices within the frame have been processed, the lossless decoding processing ends, the flow returns to step S207 in FIG. 20, and the processing of step S208 on is executed.

By thus performing lossless decoding processing, the lossless decoding unit 202 can extract control information added to encoded data, and supply to the adaptive filter processing unit 207. Accordingly, the adaptive filter processing unit 207 can appropriately execute adaptive filter processing. Accordingly, the adaptive filter processing unit 207 can reduce block noise and noise due to quantization in the slice to be processed which could not be completely removed by the deblocking filter.

Also, at this time, as described above, the control information is embodied in the slice header of the start slice of the current picture, and the control information extracting unit 221 can easily detect the start slice of the current picture and extract one picture worth of control information from the slice header.

4. Fourth Embodiment

Brief Description of Example of Including Control Information in Header of Predetermined Slice Note that control information may be added to the slice header of a slice other than the above-described slice first transmitted to start slice.

Figure 26:
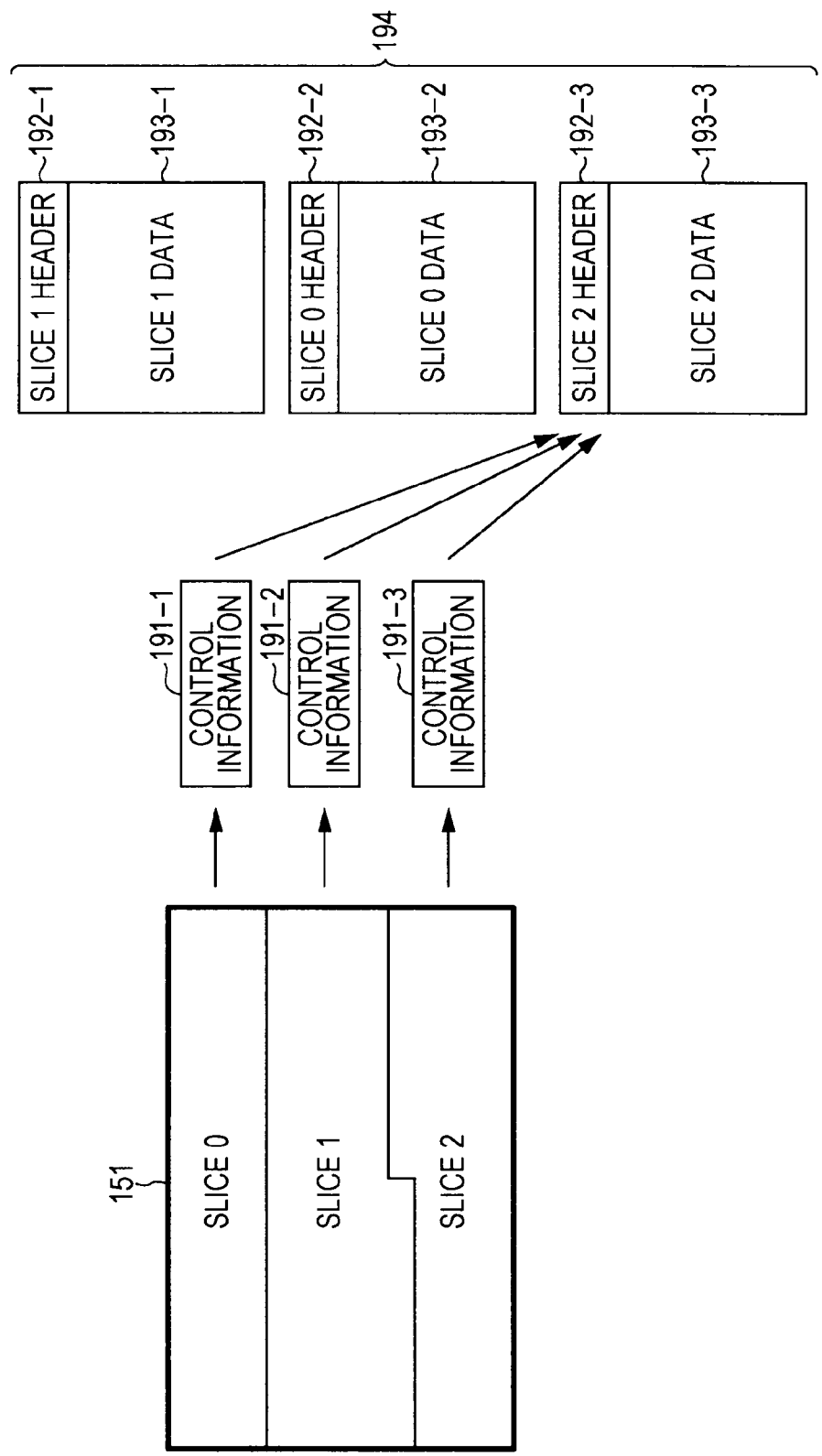
FIG. 26 is a diagram describing a situation including control information in the header of an optional slice.

For example, let us say that as shown in FIG. 26, in a frame 151 configured of three slices (slice 0, slice 1, and slice 2), the slice 0 is set as the start slice.

At this time, control information 191-1 through control information 191-3 generated for the slices may be all added to the slice 2 header 192-3 which is the slice header of slice 2 which has been set beforehand as the predetermined slice, regardless of the order in which the slices are to be processed.

The identification method of this slice 2 (slice 2 header 192-3) is optional. Also, in this case, the control information detection method for the control information extracting unit 221 of the image decoding device 200 is also optional.

As with the case of the third embodiment, with this case as well, the slice in which the control information has been embedded is not necessarily transmitted first. In the case of the example in FIG. 26, the encoded data 194 is transmitted in the order of slice 1, slice 0, and slice 2. That is to say, slice 0 and slice 1 are transmitted before slice 2 which includes the control information.

Accordingly, in this case as well, the adaptive filter processing unit 207 cannot perform adaptive filter processing for slices transmitted before slice 2 (slice 0 and slice 1 in the case of the example in FIG. 26) until the control information is extracted from slice 2.

[Encoding Side]

The configuration of the lossless encoding unit 106 of the image encoding device 100 in this case is the same as with the case of the first embodiment described with reference to FIG. 10.

Figure 27:
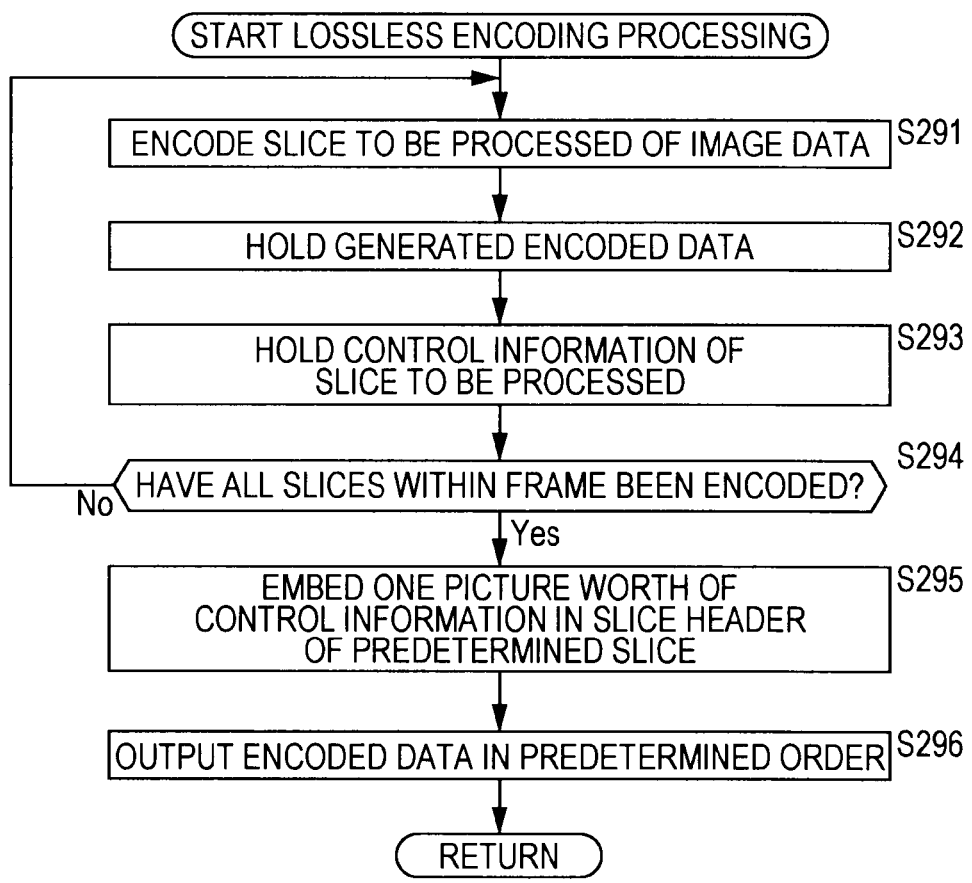
FIG. 27 is a flowchart describing yet another example of the flow of lossless encoding processing.

The flow of the lossless encoding processing in this case will be described with reference to the flowchart in FIG. 27. The flowchart in this FIG. 27 corresponds to the flowchart shown in FIG. 17.

In this case, as well, basically the same processing as with the case of the first embodiment is performed. That is to say, upon lossless encoding processing being started in step S116 of FIG. 13, each processing of step S291 through S294 is performed in the same way with each processing of step S191 through step S194 in FIG. 17, and quantized coefficient data is encoded for each slice.

In step S295, the control information adding unit 184 embeds the control information held at the control information holding unit 183 in the slice header of the predetermined slice set beforehand in the one frame worth of encoded data held in the encoded data holding unit 182. At this time, the control information adding unit 184 obtains and assembles control information held in the control information holding unit 183, and generates one picture worth of control information of the frame (picture) to which the encoded data belongs. The control information adding unit 184 embeds this one picture worth of control information in the slice header of the predetermined slice.

In step S296, the control information adding unit 184 which has added the control information to the encoded data outputs the encoded data in a predetermined order. Upon outputting the one picture worth of encoded data, the lossless encoding unit 106 ends the lossless encoding processing, returns to step S116 in FIG. 13, and advances to the processing from step S117 on.

By performing such lossless encoding processing, the image encoding device 100 can suppress deterioration in encoding efficiency due to local control of filter processing, in the same way as with the first embodiment.

[Decoding Side]

Next, description will be made regarding the image decoding device 200 according to the present embodiment. The configuration of the lossless decoding unit 202 of the image decoding device 200 is the same as the case of the third embodiment described with reference to FIG. 24.

Figure 28:
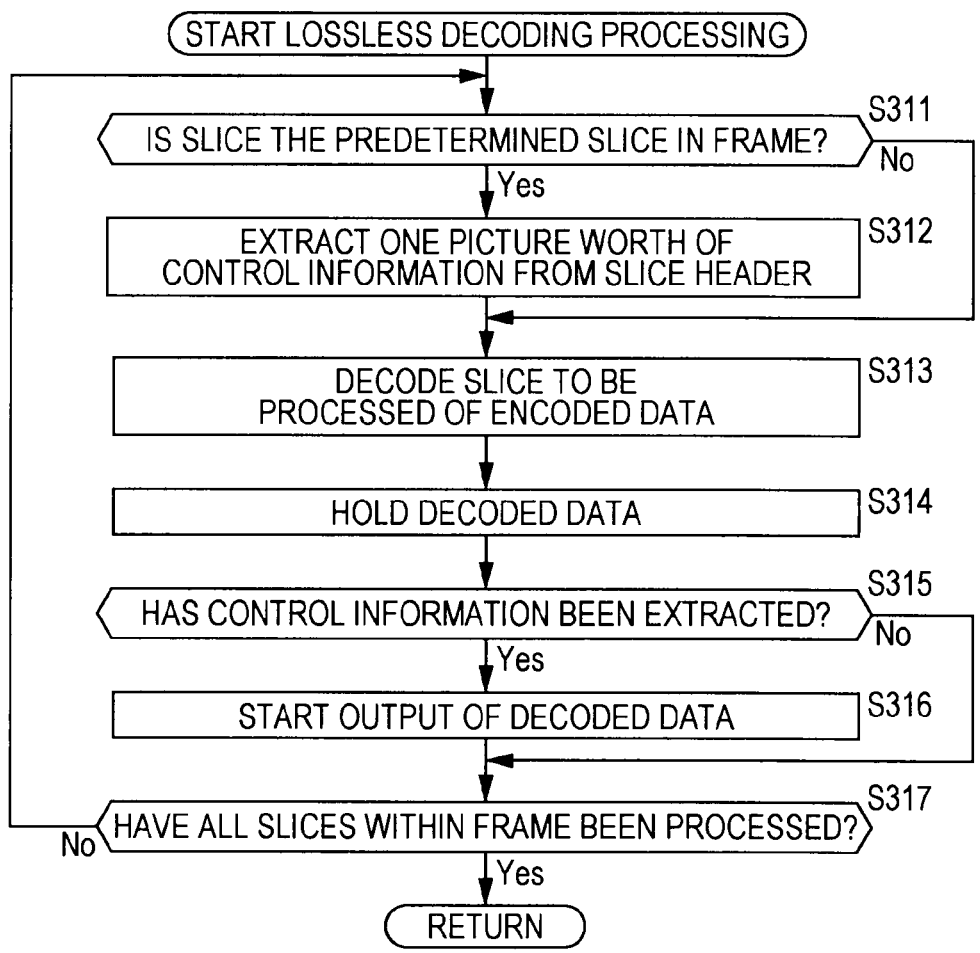
FIG. 28 is a flowchart describing yet another example of the flow of lossless decoding processing.

An example of the flow of lossless decoding processing in this case which is executed in step S202 of FIG. 20 will be described with reference to the flowchart in FIG. 28. The flowchart in this FIG. 28 corresponds to the flowchart shown in FIG. 25.

In this case as well, processing is performed basically in the same way as with the case of the third embodiment. That is to say, upon the lossless decoding processing starting, in step S311 the control information extracting unit 221 determines whether or not the supplied encoded data is the predetermined slice (slice including the control information in the slice header) of the frame (picture).

In the event that determination is made this is the predetermined slice, the flow advances to step S312. In step S312, the control information extracting unit 221 extracts the one picture worth of control information from the slice header thereof, and supplies this to the adaptive filter processing unit 207.

Upon the control information having been extracted, the flow advances to step S313. Also, in the event that determination is made in step S311 that the supplied encoded data is not the predetermined slice to which the control information has been added, the flow advances to step S313.

Thereafter, each processing of step S313 through S317 is executed in the same way as with each processing of step S273 through S277 in step S25.

By thus performing lossless decoding processing, the lossless decoding unit 202 can extract control information added to encoded data, and supply to the adaptive filter processing unit 207. Accordingly, the adaptive filter processing unit 207 can appropriately execute adaptive filter processing. Accordingly, the adaptive filter processing unit 207 can reduce block noise and noise due to quantization in the slice to be processed which could not be completely removed by the deblocking filter.

5. Fifth Embodiment

Brief Description of Example of Using Pointer

Note that, besides adding control information itself to the slice header as described above, a pointer indicating the location where the control information has been added, may be included in the slice header, for example.

Figure 29:
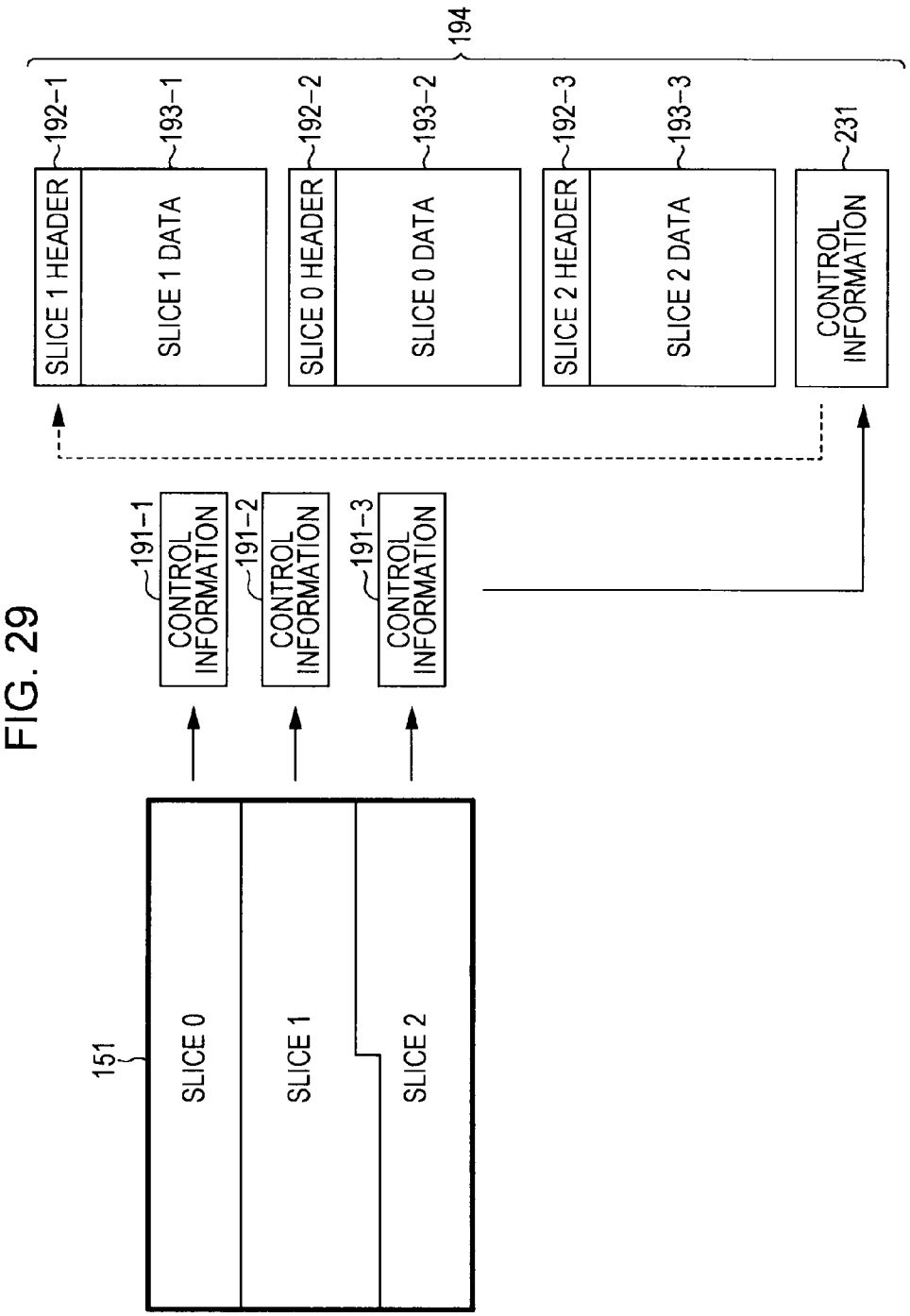
FIG. 29 is a diagram describing a situation including a pointer in the header of a slice.

For example, let us say that as shown in FIG. 29, control information 191-1 through control information 191-3 corresponding to slice 0 through slice 2 of frame 151 are assembled and added behind the slice 2 data 193-3 of the encoded data 194, as one picture worth of control information 231. A pointer indicating the position of the control information 231 is added to the slice 1 header 192-1 which is transmitted first.

Thus, the control information extracting unit 221 of the image decoding device 200 can reference the slice 1 header 192-1 and obtain the control information 231 from the pointer added thereto. That is to say, the control information extracting unit 231 can extract control information from the encoded data generally in the same way as with the case of the second embodiment.

However, in this case, the control information extracting unit 221 cannot actually extract the control information 231 until the control information 231 is supplied.

The location to which the control information 231 is added is optional, as a matter of course. For example, the control information may be added at a position which is to be transmitted before the slice 1 header 192-1. In this case, the control information extracting unit 221 can extract the control information at the point of having referenced the pointer of the slice 1 header 192-1.

[Encoding Side]

In this case as well, the configuration of the lossless encoding unit 106 of the image encoding device 100 is the same as with the case of the first embodiment described with reference to FIG. 10.

Figure 30:
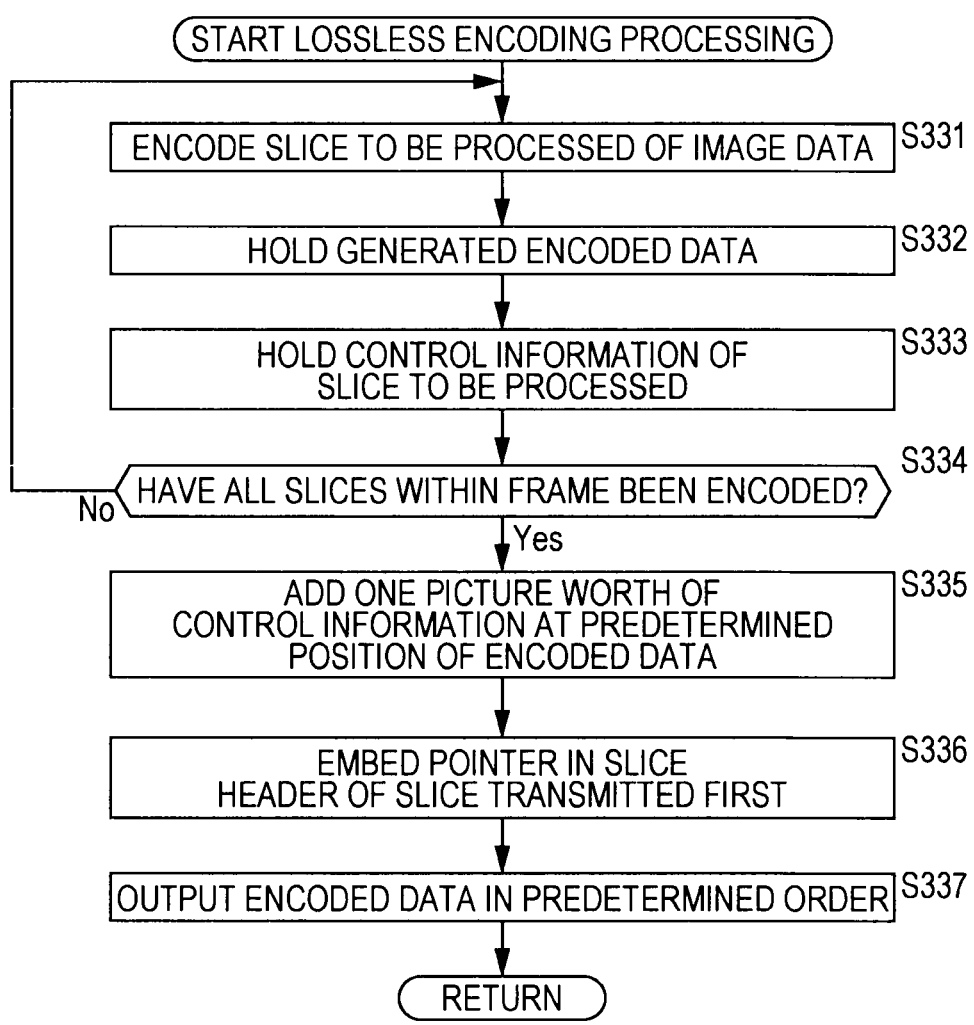
FIG. 30 is a flowchart describing yet another example of the flow of lossless encoding processing.

The flow of the lossless encoding processing in this case will be described with reference to the flowchart in FIG. 30. The flowchart in this FIG. 30 corresponds to the flowchart shown in FIG. 17.

In this case, as well, basically the same processing as with the case of the first embodiment is performed. That is to say, upon lossless encoding processing being started in step S116 of FIG. 13, each processing of step S331 through S334 is performed in the same way with each processing of step S191 through step S194 in FIG. 17, and quantized coefficient data is encoded for each slice.

In step S335, the control information adding unit 184 adds the control information, held at the control information holding unit 183, to the predetermined position of the encoded data. At this time, the control information adding unit 184 obtains and assembles control information held in the control information holding unit 183, and generates one picture worth of control information of the frame (picture) to which the encoded data belongs. The control information adding unit 184 adds this one picture worth of control information in the predetermined location of the encoded data.

In step S336, the control information adding unit 184 embeds a pointer, indicating the position where the control information has been added, to the slice header to be first transmitted in the one frame worth of encoded data held in the encoded data holding unit 182.

In step S337, the control information adding unit 184 which has added the control information to the encoded data outputs the encoded data in a predetermined order. Upon outputting the one picture worth of encoded data, the lossless encoding unit 106 ends the lossless encoding processing, returns to step S116 in FIG. 13, and advances to the processing from step S117 on.

By performing such lossless encoding processing, the image encoding device 100 can suppress deterioration in encoding efficiency due to local control of filter processing, in the same way as with the first embodiment.

[Decoding Side]

Next, description will be made regarding the image decoding device 200 according to the present embodiment. The configuration of the lossless decoding unit 202 of the image decoding device 200 is the same as the case of the third embodiment described with reference to FIG. 24.

An example of the flow of lossless decoding processing in this case which is executed in step S202 of FIG. 20 will be described with reference to the flowchart in FIG. 28. The flowchart in this FIG. 28 corresponds to the flowchart shown in FIG. 25.

Figure 31:
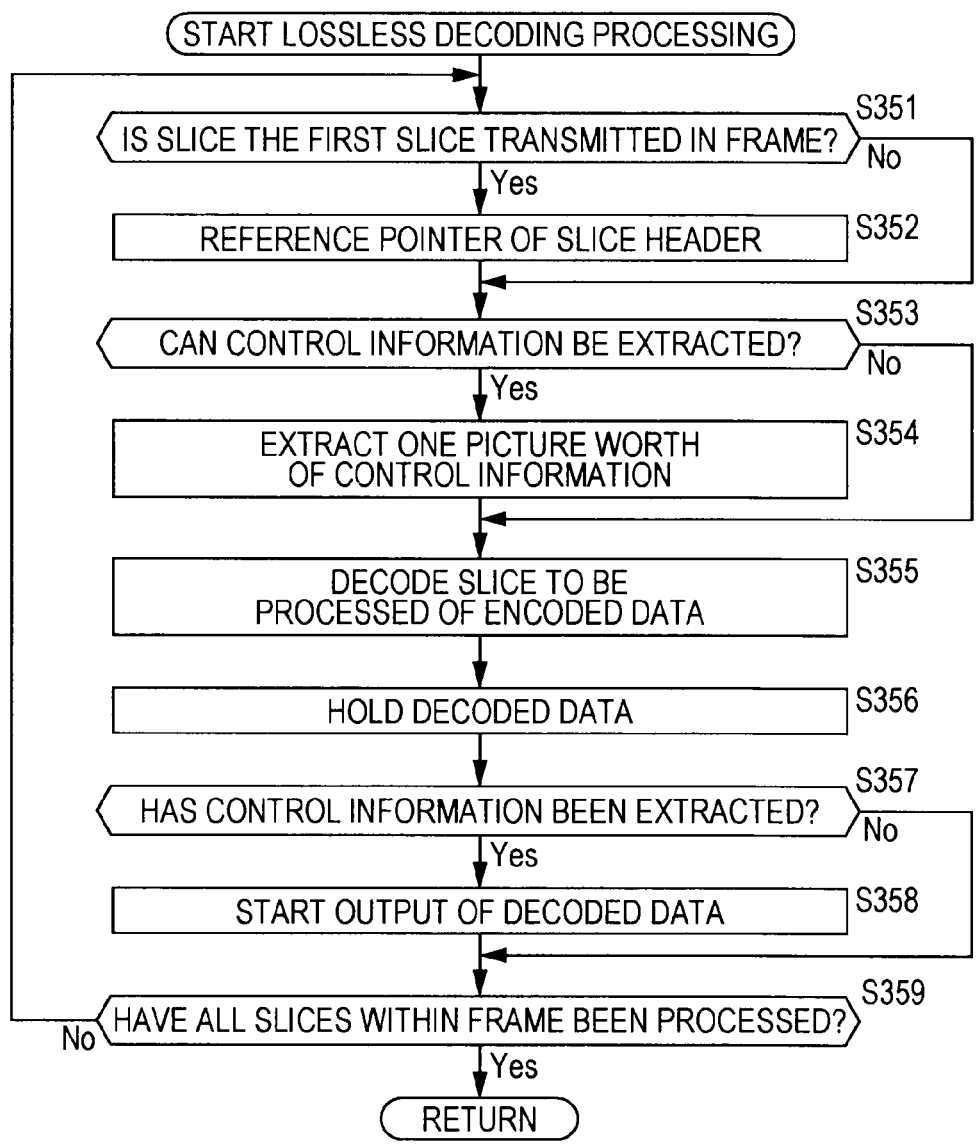
FIG. 31 is a flowchart describing yet another example of flow of lossless decoding processing.

Next, an example of the flow of lossless decoding processing in this case which is executed in step S202 of FIG. 20 will be described with reference to the flowchart in FIG. 31. The flowchart in this FIG. 31 corresponds to the flowchart shown in FIG. 25.

In this case as well, processing is performed basically in the same way as with the case of the third embodiment. That is to say, upon the lossless decoding processing starting, in step S351 the control information extracting unit 221 determines whether or not the supplied encoded data is the first-transmitted slice of the frame (picture).

In the event that determination is made this is the first-transmitted slice, as the result of determination the same as with the case of the second embodiment, the flow advances to step S352. In step S352, the control information extracting unit 221 references the pointer added to that slice header.

Upon having referenced the pointer, the flow advances to step S353. Also, in the event that determination is made in step S351 that the supplied encoded data is not the slice first transmitted in the frame, the flow advances to step S353.

In step S353, the control information extracting unit 221 determines whether or not the control information is extractable at the current point in time. In the event that determination is made that the one picture worth of control information added to the encoded data has already been supplied and is extractable, the flow advances to step S354, and the control information extracting unit 221 extracts the one picture worth of control information, and supplies this to the adaptive filter processing unit 207.

Upon the control information having been extracted, the flow advances to step S355. Also, in the event that determination is made in step S353 that the control information has not been supplied yet and is not extractable, the flow advances to step S355.

Upon the slice to be processed in the encoded data having been decoded by the decoding unit 222 in step S355, in step S356 the decoded data holding unit 223 holds the decoded data that has been decoded and obtained.

In step S357, the decoded data holding unit 223 determines whether or not the control information has been extracted by the control information extracting unit 221. In the event that determination is made that this has been extracted, the decoded data holding unit 223 advances to step S358, and starts output of the decoded data that is held to the inverse quantization unit 203.

Upon output of decoded data starting, the flow advances to step S359. Also, in the event that determination is made in step S357 that control information has not been extracted regarding the relevant frame currently being processed, the flow advances to step S359.

In step S359, the control information extracting unit 221 determines whether or not all slices within the frame have been processed. In the event that determination is made that there is an unprocessed slice existing, the flow returns to step S351, and the subsequent processing is repeated for the unprocessed slice. Also, in the event that determination is made in step S359 that all slices within the frame have been processed, the lossless decoding processing ends, the flow returns to step S207 in FIG. 20, and the processing of step S208 on is executed.

By thus performing lossless decoding processing, the lossless decoding unit 202 can extract control information based on the pointer added to the encoded data, and supply to the adaptive filter processing unit 207. Thus, the adaptive filter processing unit 207 can appropriately execute adaptive filter processing. Thus, the adaptive filter processing unit 207 can reduce block noise and noise due to quantization in the slice to be processed which could not be completely removed by the deblocking filter.

Accordingly, the image decoding device 200 can suppress deterioration in encoding efficiency due to local control of filter processing, in the same way as with the second embodiment. Also, deterioration in encoding efficiency can be suppressed in cases of dividing the frames of an image into multiple slices for processing as well.

Other Examples

Note that while description has been made above of a pointer indicating the position where the control information has been added is added to the slice header of the first-transmitted slice of the frame, the position where the pointer is embedded is optional. For example, the control information may be added to the start slice as with the third embodiment, or the control information may be added to the slice header of a predetermined slice set beforehand as with the fourth embodiment.

Also, the above-described pointer may be information of any form.

6. Sixth Embodiment

Brief Description of Example of Assembling Control Information into Multiple Groups While description has been made above with one picture worth of control information being assembled as one, unrestricted to this, slices of one frame may be divided into multiple groups with control information for each group being assembled, for example.

Figure 32:
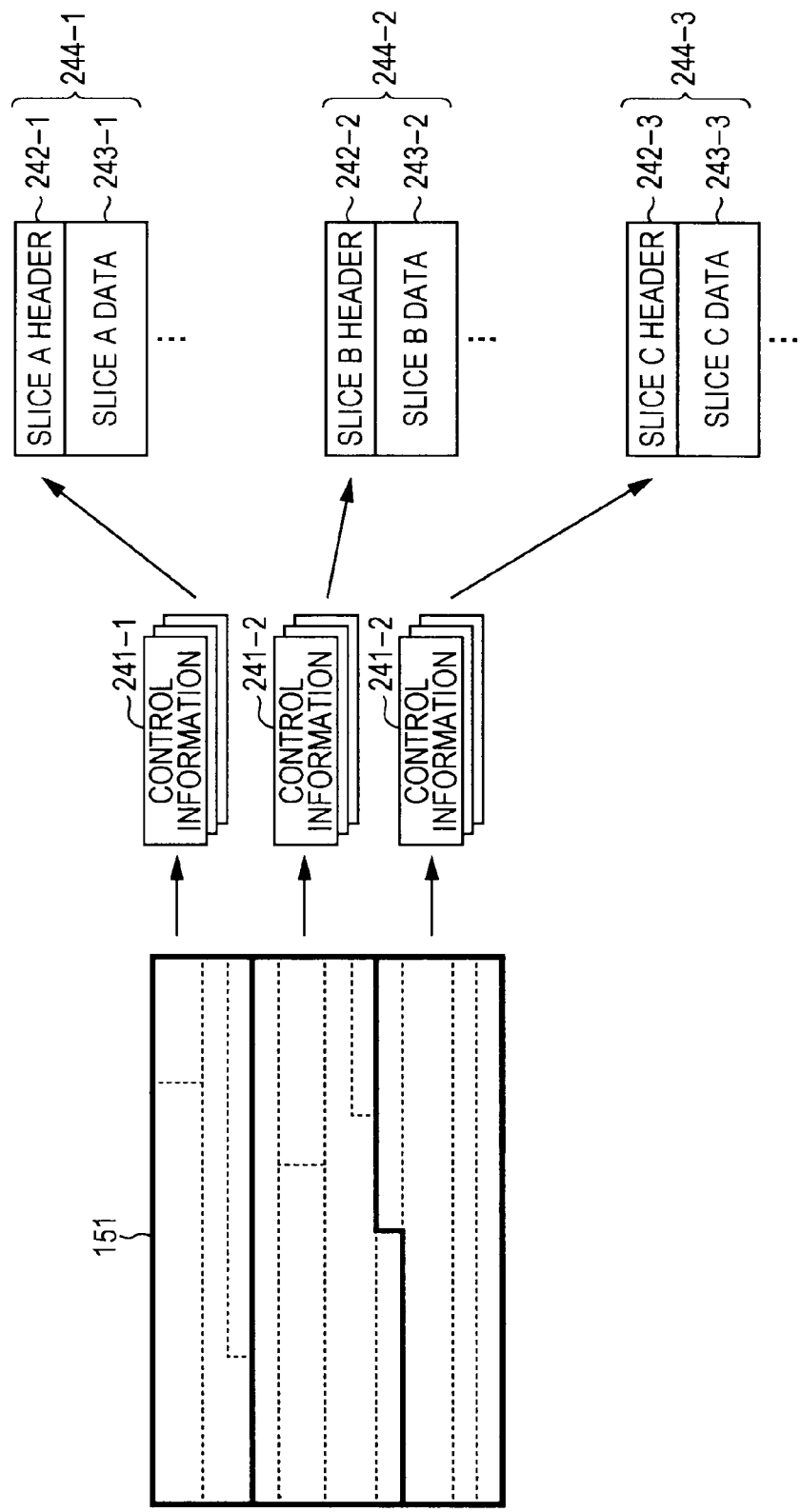
FIG. 32 is a diagram describing a situation including control information in a slice header assembled by group.

For example, in FIG. 32, the dotted lines indicate the boundary of slices within the frame 151, and the slid lines indicate groups in which multiple slices are assembled. The control information for each slice is assembled by group.

In FIG. 32, control information 241-1 is an assembly of control information if slices belonging to the first group from the top in frame 151. Control information 241-2 is an assembly of control information if slices belonging to the second group from the top in frame 151. Control information 241-3 is an assembly of control information if slices belonging to the third group from the top in frame 151.

These control information are embedded in the slice headers of the slices first transmitted out of their respective groups.

In FIG. 32, the control information 241-1 is embedded in a slice A header 242-1 which is the slice header of slice A which is transmitted first, in encoded data 244-1 of the group first from the top in frame 151.

In the same way, the control information 241-2 is embedded in a slice B header 242-2 which is the slice header of slice B which is transmitted first, in encoded data 244-2 of the group second from the top in frame 151.

In the same way, the control information 241-3 is embedded in a slice C header 242-3 which is the slice header of slice C which is transmitted first, in encoded data 244-3 of the group third from the top in frame 151.

That is to say, in this case, multiple control information is added to the one frame of encoded data, but due to being assembled in increments of groups, redundancy is reduces as compared to a case of adding control information to each slice, and encoding efficiency is improved. Also, the control information is added divided into a plurality, so resistance to dropped packets and so forth at the time of transmission is strengthened as compared to the above-described embodiments.

Note that the groups made up of multiple slices are set beforehand. That is to say, how many groups the slices within the frame will be divided into, and which group which slice will belong to, is set beforehand.

[Encoding Side]

The image encoding device 100 in this case will be described. The configuration of the lossless encoding unit 106 of the image encoding device 100 in this case is the same as with the case of the first embodiment described with reference to FIG. 10.

Figure 33:
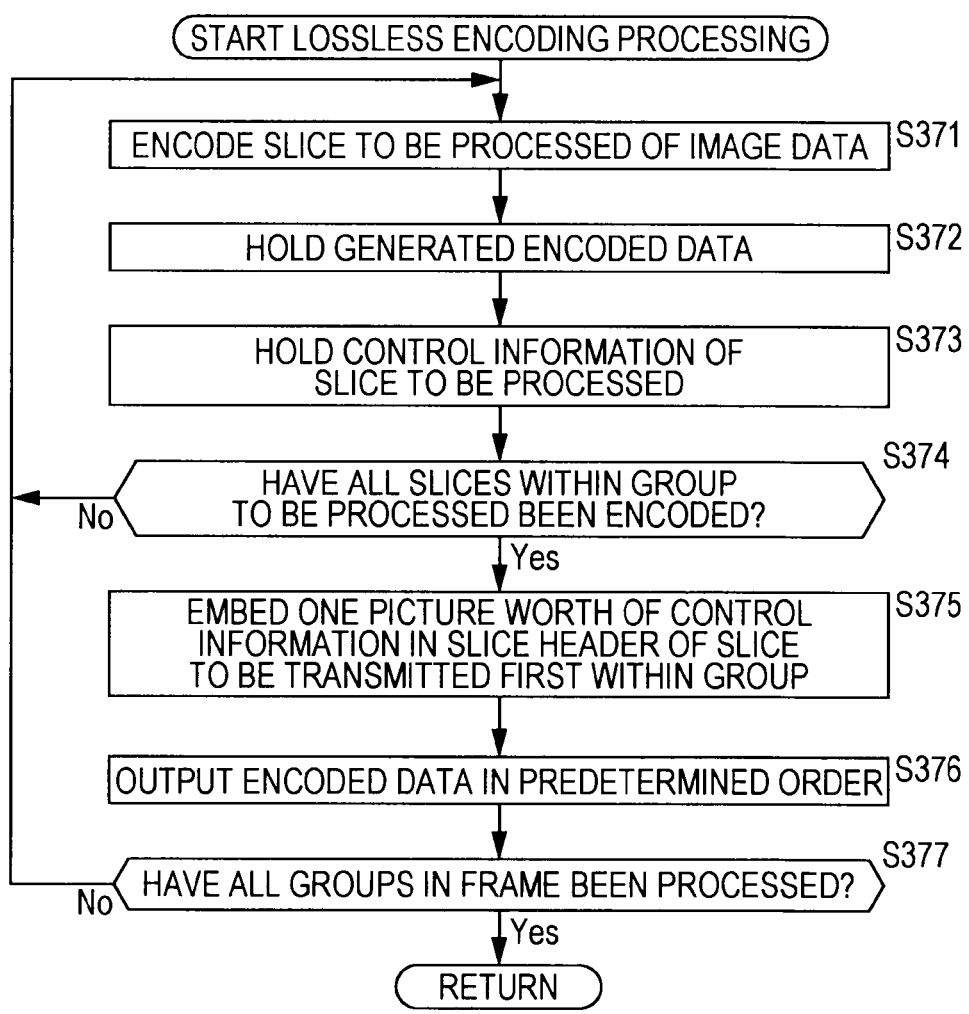
FIG. 33 is a flowchart describing yet another example of the flow of lossless encoding processing.

The flow of the lossless encoding processing in this case will be described with reference to the flowchart in FIG. 33. The flowchart in this FIG. 33 corresponds to the flowchart shown in FIG. 17.

In this case, as well, basically the same processing as with the case of the first embodiment is performed. That is to say, upon lossless encoding processing being started in step S116 of FIG. 13, each processing of step S371 through S374 is performed in the same way with each processing of step S191 through step S194 in FIG. 17, and quantized coefficient data is encoded for each slice.

However, in this case, in step S374 the control information adding unit 184 determines whether or not all slices have been encoded, not for the frame, but in increments of groups. That is to say, in step S374, the control information adding unit 184 determines whether or not the encoding unit 181 has encoded all slices belonging to the group to be processed.

In the event that determination has been made that there is an unprocessed slice existing which belongs to the group to be processed, the flow returns to step S371, and the subsequent processing is repeated for the unprocessed slice. Also, in the event that determination is made in step S374 that the encoding unit 181 has encoded all slices belonging to the group to be processed, the flow advances to step S375.

In step S375, the control information adding unit 184 embeds the control information held at the control information holding unit 183 in the slice header of the start slice in the one group worth of encoded data held in the encoded data holding unit 182. At this time, the control information adding unit 184 obtains and assembles control information held in the control information holding unit 183, and generates control information of the group to which the encoded data belongs (one group worth of control information). The control information adding unit 184 embeds this one group worth of control information in the slice header of the first-transmitted slice of the group.

In step S376, the control information adding unit 184 which has added the control information to the encoded data outputs the one group worth of encoded data in a predetermined order. Upon outputting the one group worth of encoded data, in step S377 the lossless encoding unit 106 determines whether or not all groups within the frame have been processed.

In the event that determination is made that there is an unprocessed group existing, the flow returns to step S371, and the subsequent processing is repeated for the unprocessed group. Also, in the event that determination is made in step S377 that all groups within the frame have been processed, the lossless encoding unit 106 ends the lossless encoding processing, returns to step S116 in FIG. 13, and advances to the processing from step S117 on.

By performing such lossless encoding processing, the image encoding device 100 can suppress deterioration in encoding efficiency due to local control of filter processing. Also, resistance to dropped packets and so forth is strengthened.

[Decoding Side]

Next, description will be made regarding the image decoding device 200 according to the present embodiment. In this case, it is sufficient for the lossless decoding unit 202 of the image decoding device 200 to extract control information in increments of groups, rather than in increments of frames (pictures). Accordingly, the lossless decoding unit 202 has the same configuration as the lossless decoding unit 202 in the case of the second embodiment described with reference to FIG. 19.

Also, the lossless decoding processing by the lossless decoding unit 202 can be executed in the same way as with the example described with reference to the flowchart in FIG. 21, except that increments of frames (pictures) is increments of frames instead.

Thus, the lossless decoding unit 202 can extract control information added to the encoded data, and supply to the adaptive filter processing unit 207. Accordingly, the adaptive filter processing unit 207 can appropriately execute adaptive filter processing.

Other Examples

Note that while description has been made above of adding control information to the slice header of the first-transmitted slice of the group, the position where this control information is embedded is optional. For example, the control information may be added to the slice header of the start slice of each group as with the third embodiment, or the control information may be added to a predetermined slice set beforehand for each group as with the fourth embodiment.

7. Seventh Embodiment

Brief Description of Example of Controlling the Number of Groups

While description has been made in the sixth embodiment regarding a group made up of multiple slices as an increment for assembling control information, the image encoding device 100 may define groups by predetermined increments, such as by frame, by GOP, or the like, for example. That is to say, in this case, the image encoding device 100 defines, for example, which slice belongs to which groups, and now many groups are to be formed in one frame (how many the control information is to be aggregated into per one frame), for each frame.

[Encoding Side]

Figure 34:
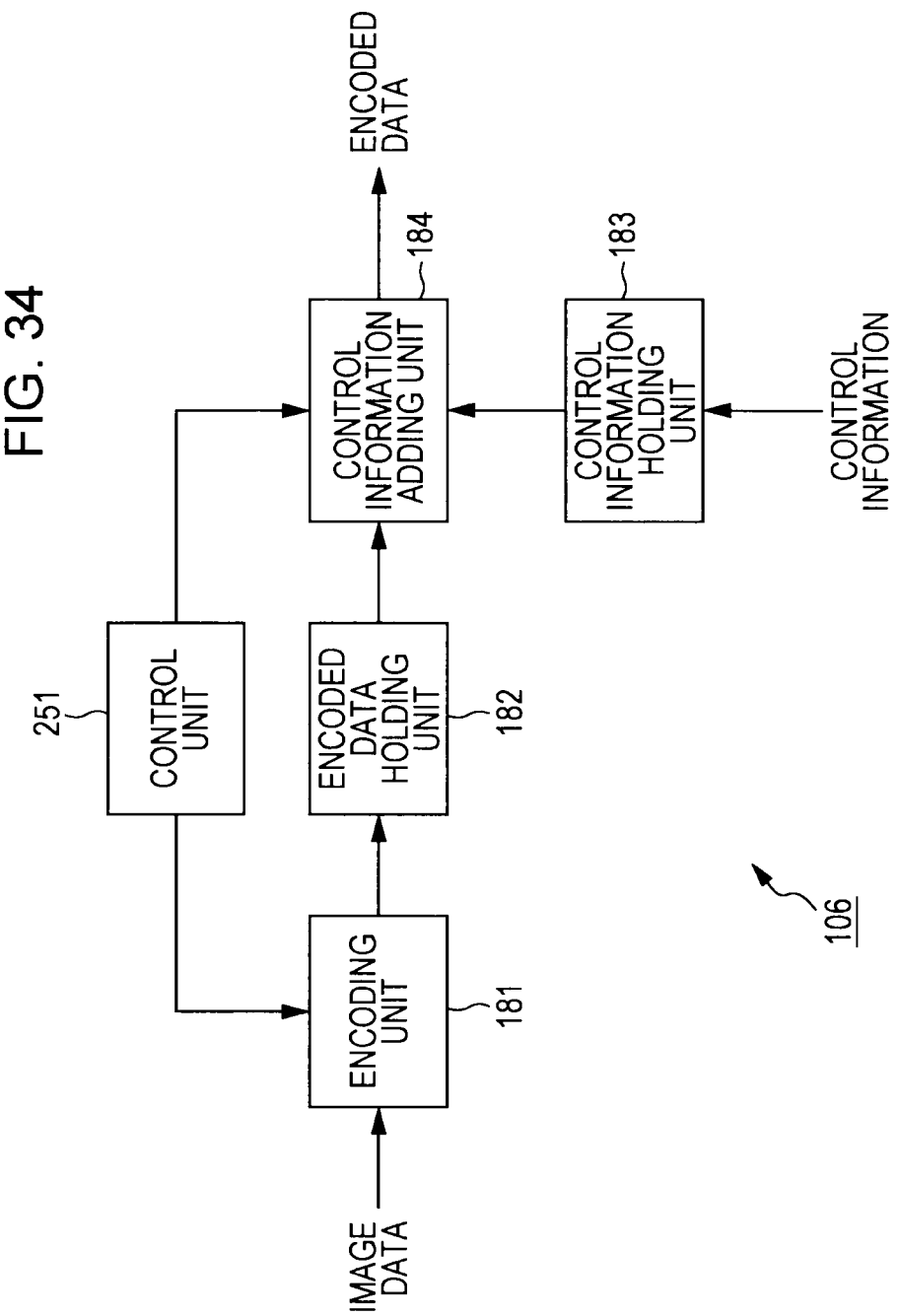
FIG. 34 is a block diagram describing another configuration example of the lossless encoding unit.

The image encoding device 100 in this case will be described. FIG. 34 is a block diagram illustrating a configuration example of the lossless encoding unit 106 of the image encoding device 100 in this case.

As shown in FIG. 34, the lossless encoding unit 106 in this case, has the encoding unit 181 through control information adding unit 184 in the same way as with the first embodiment. However, the lossless encoding unit 106 in this case further has a control unit 251.

The control unit 251 defines groups, and determines the number of groups within the frame to be processed. In other words, the control unit 251 determines the range of data to which each control information embedded in the encoded data corresponds.

The control unit 251 controls the encoding unit 181 through control information adding unit 184 to embed control information corresponding to the group in the slice header of the slice transmitted first in each group.

Figure 35:
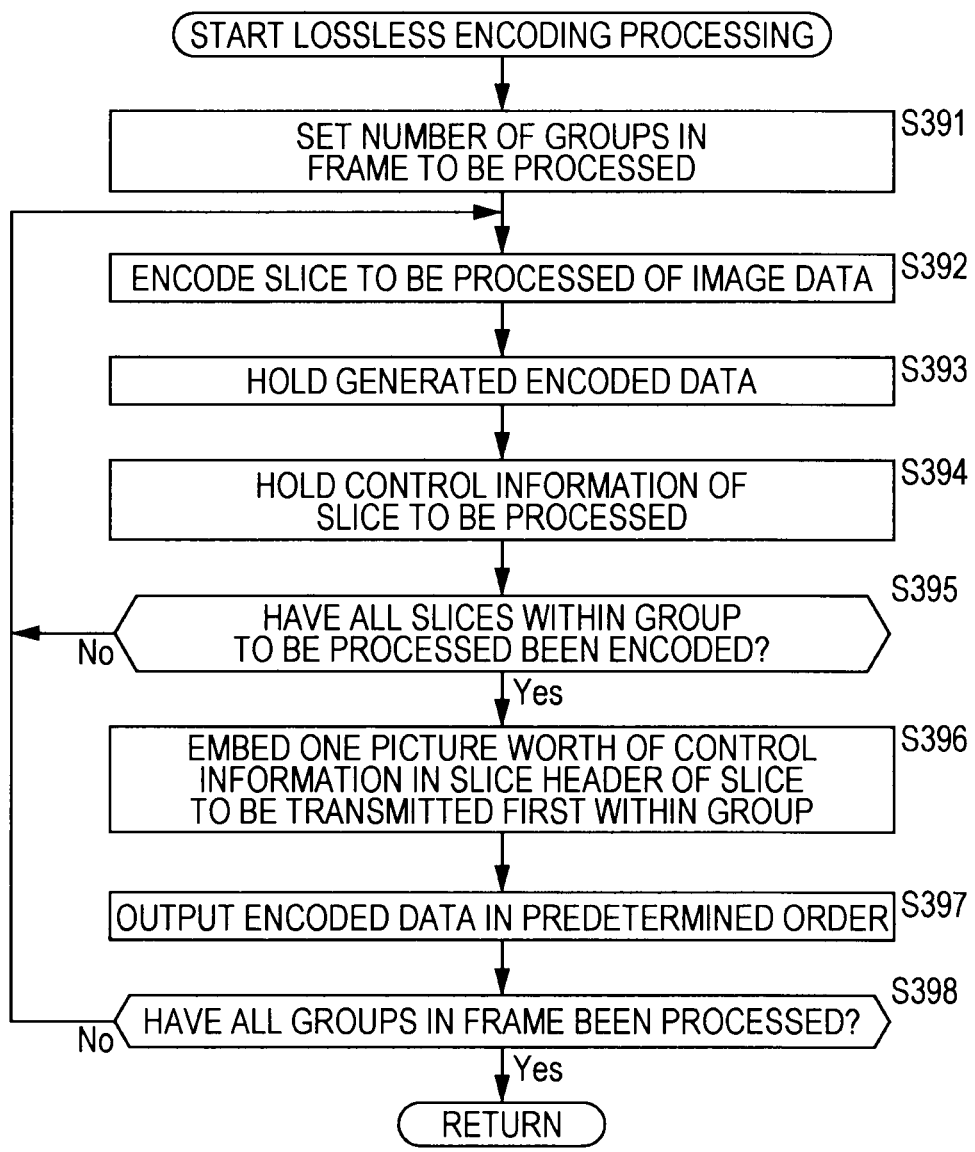
FIG. 35 is a flowchart illustrating yet another example of the flow of lossless encoding processing.

An example of the flow of lossless encoding processing in this case will be described with reference to the flowchart in FIG. 35. The flowchart in this FIG. 35 corresponds to the flowchart shown in FIG. 33.

In this case as well, processing is performed basically in the same way as with the case of the sixth embodiment. Upon the lossless encoding processing being started in step S116 of FIG. 13, in step S391 the control unit 251 defines the groups for the frame to be processed, and sets the number of groups. The control unit 251 controls the encoding unit 181 through control information adding unit 184 based on the settings relating to the groups.

Following the settings for groups performed in step S391, each processing of step S392 through S398 is performed. That is to say, each processing of step S392 through S398 after the groups have been set is performed in the same way with each processing of step S371 through step S377 in FIG. 33.

By performing such lossless encoding processing, the image encoding device 100 can suppress deterioration in encoding efficiency due to local control of filter processing. Also, resistance to dropped packets and so forth is strengthened.

[Decoding Side]

Figure 36:
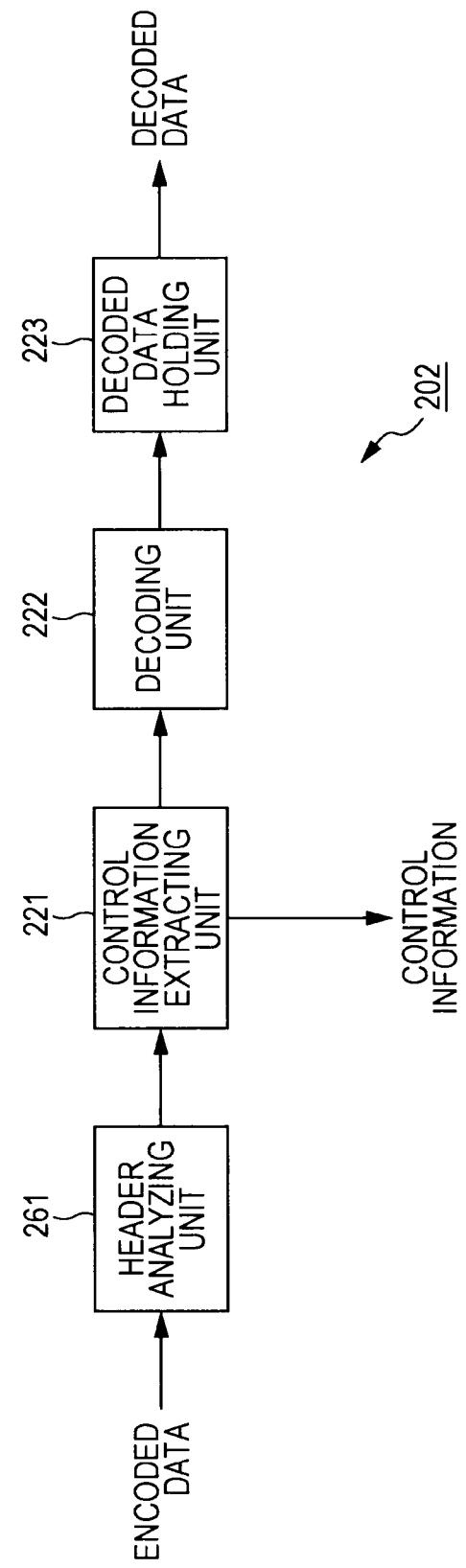
FIG. 36 is a block diagram illustrating yet another configuration example of the lossless decoding unit.

Next, description will be made regarding the image decoding device 200 according to the present embodiment. FIG. 36 is a block diagram illustrating a configuration example of the lossless decoding unit 202 of the image decoding device 200 in this case.

In this case, the lossless decoding unit 202 of the image decoding device 200 extracts control information in group increments, rather than frame (picture) increments. Accordingly, the lossless decoding unit 202 in this case has the control information extracting unit 221 through decoded data holding unit 223, in the same way as the lossless decoding unit 202 in the case of the third embodiment described with reference to FIG. 24, for example. However, in this case, the image decoding device 200 has not comprehended the number of groups within the frame to be processed, and accordingly analyzes each slice header and searches the control information. Accordingly, in this case, the lossless decoding unit 202 further has, as shown in FIG. 36, a header analyzing unit 261.

The header analyzing unit 261 references each slice header of the encoded data supplied thereto, and searches the control information. The control information extracting unit 221 extracts the control information based on the results of the analysis. Also, each part performs processing for each group in the same way as with the case of the sixth embodiment.

Figure 37:
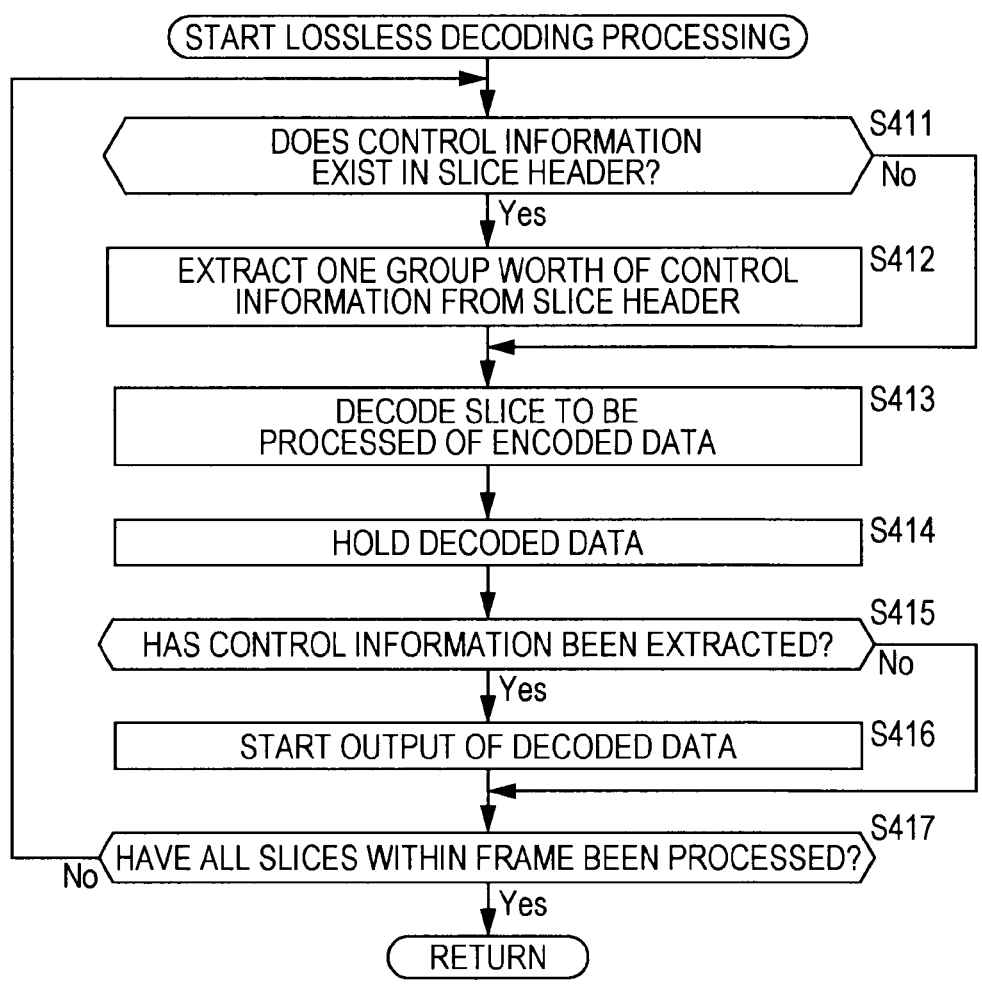
FIG. 37 is a flowchart describing yet another example of the flow of lossless decoding processing.

Next, an example of the flow of lossless decoding processing in this case which is executed in step S202 of FIG. 20 will be described with reference to the flowchart in FIG. 37. The flowchart in this FIG. 37 corresponds to the flowchart shown in FIG. 25.

In this case as well, processing is performed basically in the same way as with the case of the third embodiment. That is to say, upon the lossless decoding processing starting, in step S411 the header analyzing unit 261 references the slice header of the slice to be processed in the encoded data that has been supplied, and determines whether or not control information exists in that slice header. In the event that determination is made that the slice to be processed is the first-transmitted slice of the group, and the slice header includes control information of the group, the flow advances to step S412.

In step S412, the control information extracting unit 221 extracts the one group worth of control information from the slice header thereof. Upon the control information having been extracted, the flow advances to step S413. Also, in the event that determination is made in step S411 that no control information exists in the slice header, the flow advances to step S413.

Each processing of step S413 through step S417 is executed in the same way as with each processing of step S273 through S277 in step S25.

Thus, the lossless decoding unit 202 can extract control information added to encoded data, and supply to the adaptive filter processing unit 207. Accordingly, the adaptive filter processing unit 207 can appropriately execute adaptive filter processing.

[Control of Number of Groups]

Next, control of the number of groups will be described.

Generally, increasing the number of groups (increasing the number of control information per frame) increases redundancy of control information, and encoding efficiency of the encoded data deteriorates. Accordingly, the amount of information which the image decoding device 200 has to process increases. Also, the number of times of extracting the control information increases. Accordingly, there is a possibility that the load on the image decoding device 200 will increase. However, the amount of information of each control information is smaller, so the mount of memory necessary is reduced.

On the other hand, by increasing the number of groups, the image encoding device 100 can output encoded data in smaller increments. That is to say, the delay time for encoding processing can be reduced. Also, in this case, the encoded data is output with high frequency, so the amount of memory necessary is reduced.

Conversely, reducing the number of groups (reducing the number of control information per frame) reduces redundancy of control information, and encoding efficiency of the encoded data improves. Accordingly, the amount of information which the image decoding device 200 has to process decreases. Also, the number of times of extracting the control information decreases. Accordingly, there is a possibility that the load on the image decoding device 200 will be lower. However, the amount of information of each control information is greater, so the mount of memory necessary is increased.

On the other hand, by reducing the number of groups, the image encoding device 100 will output encoded data in larger increments. That is to say, the delay time for encoding processing increases. Also, in this case, the encoded data is output with low frequency, so the amount of memory necessary is increased.

In this way, various types of parameters change in accordance with increase/decrease in the number of groups. Accordingly, the optimal number of groups is determined by system specifications such as hardware resources, usage purpose, and so forth.

For example, in the case of a system where encoded data which the image encoding device 100 has generated is saved in a server or the like, and this encoded data is provided based on a request from the image decoding device 200 for example, increase in delay time at the image encoding device 100 has almost no influence on providing of the encoded data. With such a system, suppressing alleviating of the load of decoding processing should be given priority over reducing delay time in encoding processing.

Also, in the case of a system where, for example, image data generated by shooting or the like is instantaneously (in real-time) encoded by the image encoding device 100, the encoded data is transmitted, the encoded data is decoded by the image decoding device 200, and the decoded image is displayed, suppressing delay time in each processing is of greatest importance.

Also, in the event that the processing capability of the image decoding device 200 is low, suppressing the load on decoding processing is preferably given priority. On the other hand, in the event that the processing capability of the image encoding device 100 is low, suppressing the load on encoding processing is preferably given priority. Also, there can be conceived cases where improving encoding efficiency should be given priority depending on the bit rate of the image data, available bandwidth of the transmission path, and so forth.

Thus, optimal values for various parameters such as delay time, encoding efficiency, processing load, and memory capacity and so forth, differ depending on system specifications. Accordingly, the control unit 251 sets groups so that the various types of parameters are optimal with regard to the system specifications. Accordingly, application can be made to a wider variety of systems.

Note that the image encoding device 100 or image decoding device 200 may collect information relating to hardware resources of other devices within the system or the transmission path, or exchange various types of information with other devices, in order to set these groups.

Also, the number of groups in one frame may be any number as long as it is one or greater. Further, control of the number of groups may be in other than in increments of frames. For example, this may be in increments of GOPs or the like.

Also, while description has been made above with the control information being added to the slider header of the first-transmitted slice of each group, the position for embedding this control information is optional. For example, the control information may be added to the slice header of the start slice as with the third embodiment, or the control information may be added to a predetermined slice set beforehand as with the fourth embodiment.

Further, the image encoding device 100 may set the slice (slice header) for the control information to be embedded. Such settings may be made in optional increments, such as in increments of frames or in increments of GOPs, for example. Also, this may be performed irregularly.

While description has been made in the above embodiments with control information within a frame being assembled into one or a plurality, in increments of slices, the increments of assembling this control information is optional. For example, this may be performed in increments smaller than slices, e.g., in increments of macroblocks. That is to say, a plurality of control information for each macroblock may be assembled to generate control information for each group.

8. Eighth Embodiment

Brief Description of Example of Grouping Each Element Independently

While description has been made above with the elements of filter coefficient, block size, and filter block flag, configuring the control information, being assembled in mutually same increments, these elements may be assembled in increments independent one from another. That is to say, the elements of filter coefficient, block size, and filter block flag may be grouped independently from each other.

In this case, the range (slice) of the image to which corresponds a group of filter coefficients, the range (slice) of the image to which corresponds a group of block sizes, and the range (slice) of the image to which corresponds a group of filter block flags, are set mutually independent, so the slice headers where these information are stored may also be different one from another.

Accordingly, in this case, the image encoding device 100 and image decoding device 200 need to perform the same processing as with the above-described control information for the elements of filter coefficient, block size, and filter block flag.

[Encoding Side]

Figure 38:
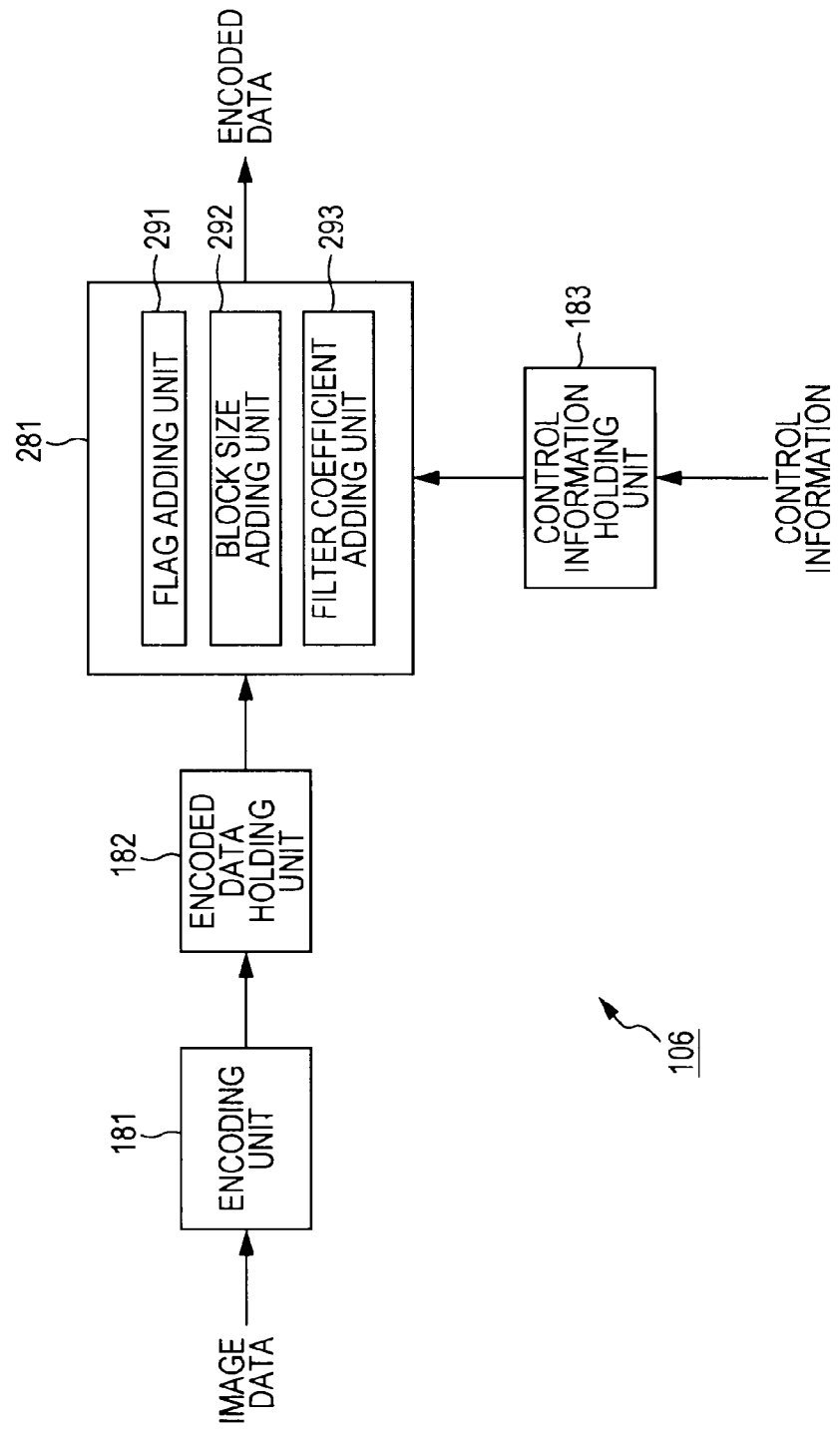
FIG. 38 is a block diagram illustrating yet another configuration example of the lossless encoding unit.

The image encoding device 100 in this case will be described. FIG. 38 is a block diagram illustrating a configuration example of the lossless encoding unit 106 of the image encoding device 100 in this case.

As shown in FIG. 38, the lossless encoding unit 106 in this case, has, in the same way as with the case of the first embodiment, the encoding unit 181 through control information holding unit 183. Also, the encoding unit 106 in this case also has a control information adding unit 281 instead of the control information adding unit 184.

The control information adding unit 281 embeds the elements of filter coefficient, block size, and filter block flag, in the slice header of the encoded data, by each mutually independently set group. The control information adding unit 281 has a flag adding unit 291, a block size adding unit 292, and a filter coefficient adding unit 293.

The flag adding unit 291 adds a filter block flag for the flag group to be processed to the slice header of the first-transmitted slice of the flag group to be processed. A flag group is a group of slices to which one set of filter block flags embedded in the same slice header with each other corresponds.

The block size adding unit 292 adds a block size for the block size group to be processed to the slice header of the first-transmitted slice of the block size group to be processed. A block size group is a group of slices to which one set of block sizes embedded in the same slice header with each other corresponds.

The filter coefficient adding unit 293 adds a filter coefficient for the filter coefficient group to be processed to the slice header of the first-transmitted slice of the filter coefficient group to be processed. A filter coefficient group is a group of slices to which one set of filter coefficients embedded in the same slice header with each other corresponds.

Figure 39:
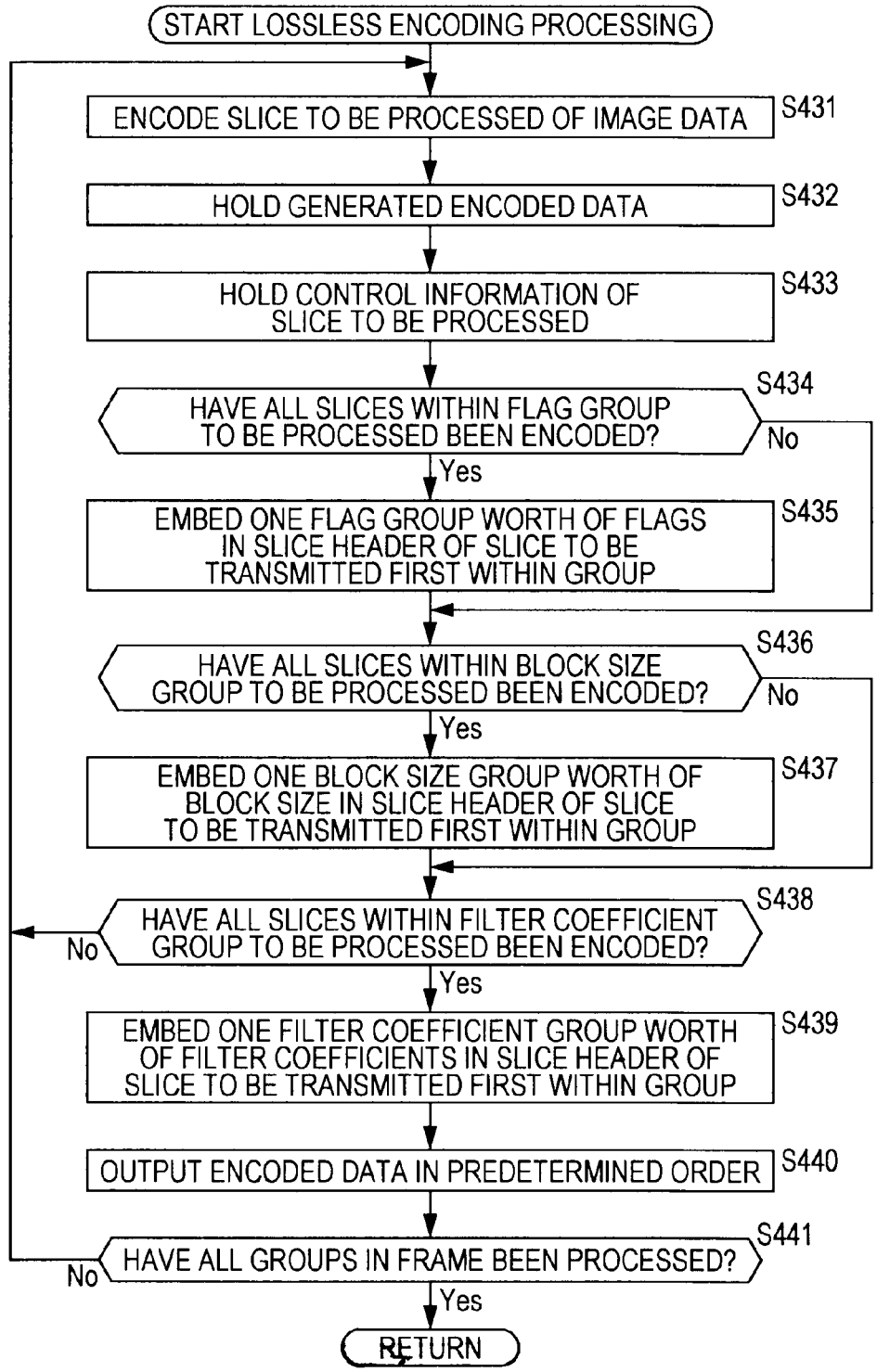
FIG. 39 is a flowchart describing yet another example of the flow of lossless encoding processing.

An example of the flow of the lossless encoding processing in this case will be described with reference to the flowchart in FIG. 39. The flowchart in this FIG. 39 corresponds to the flowchart shown in FIG. 33.

In this case as well, basically the same processing as with the case of the sixth embodiment is performed. That is to say, upon lossless encoding processing being started in step S116 of FIG. 13, each processing of step S431 through S433 is performed in the same way with each processing of step S371 through step S373 in FIG. 33.

In step S434, the flag adding unit 291 of the control information adding unit 281 determines whether or not the encoding unit 181 has encoded all slices of the flag group to be processed. In the event that determination is made that all slices have been encoded, the flow advances to step S435.

In step S435, the flag adding unit 291 embeds one flag group worth of filter block flags in the slice header of the first-transmitted slice within that flag group to be processed.

Upon embedding of filter block flags ending, the flow advances to step S436. Also, in the event that determination has been made in step S434 that there is an unprocessed slice in the flag group to be processed, the flow advances to step S436.

In step S436, the block size adding unit 292 of the control information adding unit 281 determines whether or not the encoding unit 181 has encoded all slices of the flag group to be processed. In the event that determination is made that all slices have been encoded, the flow advances to step S437.

In step S437, the block size adding unit 292 embeds one block size group worth of block sizes in the slice header of the first-transmitted slice within that block size group to be processed.

Upon embedding of block sizes ending, the flow advances to step S438. Also, in the event that determination has been made in step S438 that there is an unprocessed slice in the block size group to be processed, the flow advances to step S438.

In step S438, the filter coefficient adding unit 293 of the control information adding unit 281 determines whether or not the encoding unit 181 has encoded all slices of the filter coefficient group to be processed. In the event that determination is made that an unprocessed slice exists, the flow returns to step S431, and the subsequent processing is repeated.

Also, in step S438, in the event that determination is made that all slices have been encoded, the flow advances to step S439. In step S439, the filter coefficient adding unit 293 embeds one filter coefficient group worth of filter coefficients in the slice header of the first-transmitted slice within that filter coefficient group to be processed.

Upon embedding of filter coefficients ending, the flow advances to step S440. In step S440, the control information adding unit 281 outputs the encoded data in the predetermined order. In step S441, the lossless encoding unit 106 determines whether or not all groups within the frame has been processed. In the event that determination is made that an unprocessed group remains, the flow returns to step S431, and the subsequent processing is repeated.

Also, in the event that determination is made in step S441 that all groups within the frame have been processed, the lossless encoding unit 106 ends the lossless encoding processing, and the flow returns to step S116 in FIG. 13 and advances to the processing of step S117 and on.

By thus performing lossless encoding processing, the lossless encoding unit 106 can add the elements of control information in increments appropriate for each. Accordingly, the image encoding device 100 can control various types of elements, such as encoding efficiency, delay time, load amount, and so forth, for example, more appropriately.

[Decoding Side]

Next, the image decoding device 200 according to the present embodiment will be described. In this case, the lossless decoding unit 202 of the image decoding device 200 extracts the elements of filter coefficient, block size, and filter block flag, in the increments of groups of each, rather than in increments of frames (pictures).

Figure 40:
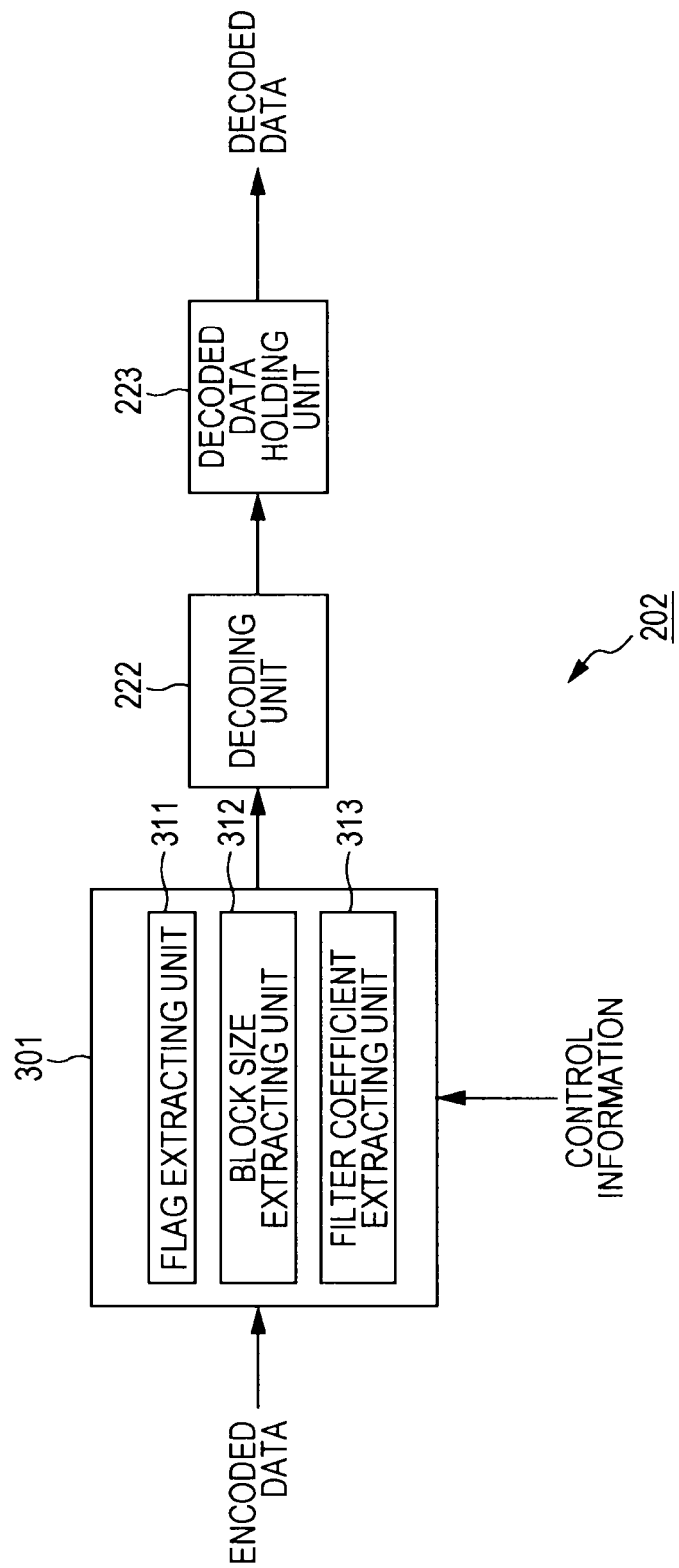
FIG. 40 is a block diagram illustrating yet another configuration example of the lossless decoding unit.

FIG. 40 is a block diagram illustrating a configuration example of the lossless decoding unit 202 of the image decoding device 200 in this case. As shown in FIG. 40, in the same way as with the case of the third embodiment, the lossless decoding unit 202 in this case has a decoding unit 222 and decoded data holding unit 223. Also, this decoding unit 222 has a control information extracting unit 301 instead of the control information extracting unit 221.

The control information extracting unit 301 extracts the elements of filter coefficient, block size, and filter block flag, from the slice header of the encoded data. The control information extracting unit 301 has a flag extracting unit 311, a block size extracting unit 312, and a filter coefficient extracting unit 313.

The flag extracting unit 311 extracts, from the slice header of the first-transmitted slice of the flag group to be processed, the filter block flags of that flag group to be processed.

The block size extracting unit 312 extracts, from the slice header of the first-transmitted slice of the block size group to be processed, the block sizes of that block size group to be processed.

The filter coefficient extracting unit 313 extracts, from the slice header of the first-transmitted slice of the filter coefficient group to be processed, the filter coefficients of that filter coefficient group to be processed.

Figure 41:
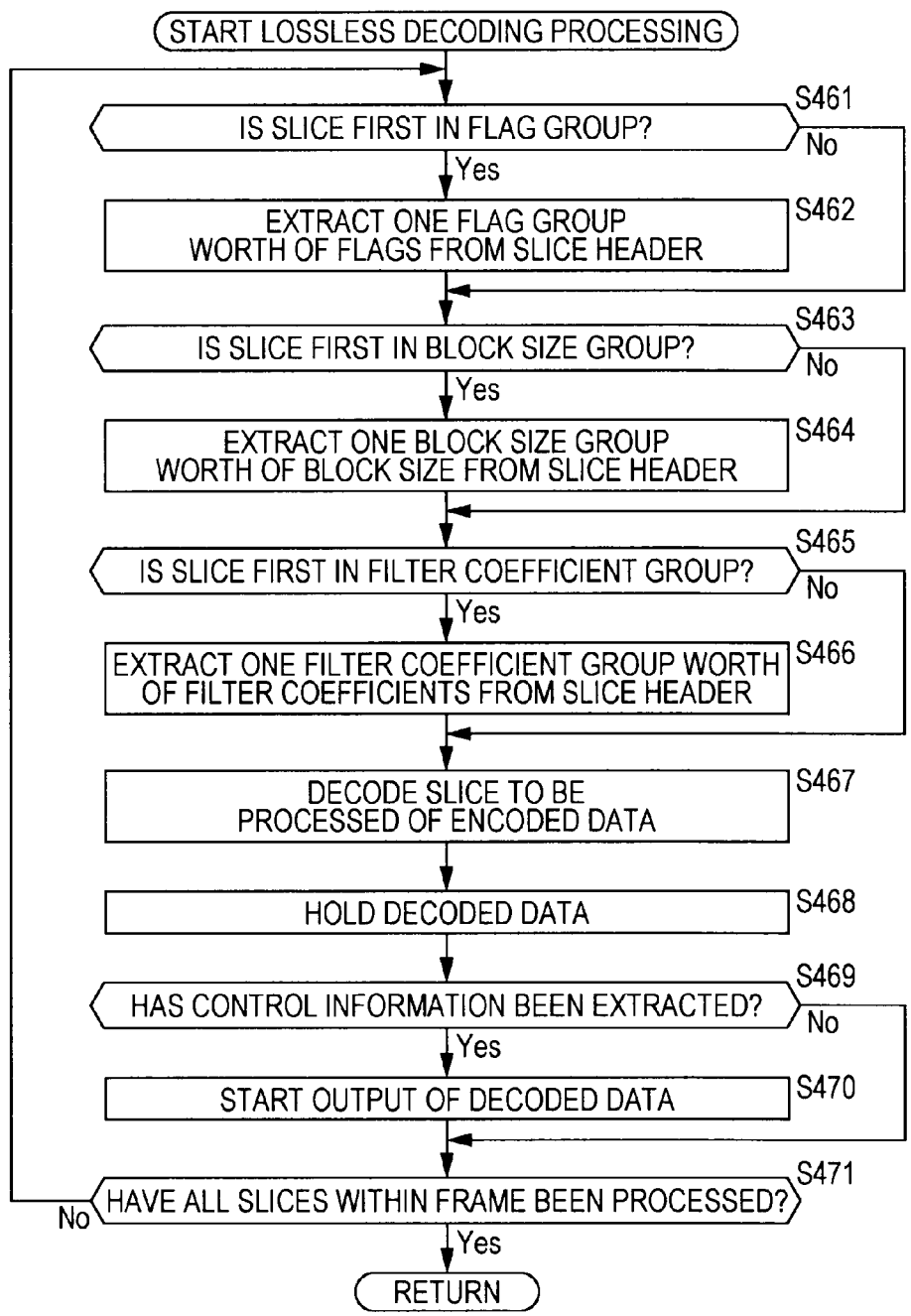
FIG. 41 is a flowchart describing yet another example of the flow of lossless decoding processing.

Next, an example of the flow of lossless decoding processing in this case which is executed in step S202 of FIG. 20 will be described with reference to the flowchart in FIG. 41. The flowchart in this FIG. 41 corresponds to the flowchart shown in FIG. 25.

In this case as well, processing is performed basically in the same way as with the case of the second embodiment. That is to say, upon the lossless decoding processing starting, in step S461, the flag extracting unit 311 of the control information extracting unit 301 determines whether or not the encoded data that has been supplied is the first-transmitted slice of the flag group to be processed. In the event that determination is made that this is the first-transmitted slice of the flag group to be processed, the flow advances to step S462.

In step S462, the flag extracting unit 311 extracts one flag group worth of block flags from the slice header of the slice to be processed.

Upon the filter block flags being extracted, the flow advances to step S463. Also, in the event that determination is made in step S461 that the this is not the first-transmitted slice of the flag group to be processed, the flow advances to step S463.

In step S463, the block size extracting unit 312 of the control information extracting unit 301 determines whether or not the encoded data that has been supplied is the first-transmitted slice of the block size group to be processed. In the event that determination is made that this is the first-transmitted slice of the block size group to be processed, the flow advances to step S464.

In step S464, the block size extracting unit 312 extracts one block size group worth of block sizes from the slice header of the slice to be processed.

Upon the block sizes being extracted, the flow advances to step S465. Also, in the event that determination is made in step S463 that the this is not the first-transmitted slice of the block size group to be processed, the flow advances to step S465.

In step S465, the filter coefficient extracting unit 313 of the control information extracting unit 301 determines whether or not the encoded data that has been supplied is the first-transmitted slice of the filter coefficient group to be processed. In the event that determination is made that this is the first-transmitted slice of the filter coefficient group to be processed, the flow advances to step S466.

In step S466, the filter coefficient extracting unit 313 extracts one filter coefficient group worth of filter coefficients from the slice header of the slice to be processed.

Upon the filter coefficients being extracted, the flow advances to step S467. Also, in the event that determination is made in step S465 that the this is not the first-transmitted slice of the filter coefficient group to be processed, the flow advances to step S467.

In step S467, the decoding unit 222 decodes the slice to be processed of the encoded data. In step S468, the decoded data holding unit 223 holds the decoded data that has been decoded and obtained.

In step S469, the decoded data holding unit 223 determines whether or not there exists a slice regarding which all elements of the control information (filter block flag, block size, and filter coefficient) have been extracted by the control information extracting unit 301. In the event that determination is made that extraction has been performed, the decoded data holding unit 223 advances to step S470, and starts output to the inverse quantization unit 203 of, out of the decoded data held therein, the slice regarding which all elements of the control information have been extracted.

Upon output of decoded data starting, the flow advances to step S471. Also, in the event that determination is made in step S469 that there does not exist a slice regarding which all elements of the control information have been extracted, the flow advances to step S471.

In step S471, the control information extracting unit 301 determines whether or not all slices within the frame have been processed. In the event that determination is made that there exists an unprocessed slice, the flow returns to step S461, and the subsequent processing is repeated in the unprocessed slice. Also, in the event that determination is made in step S471 that all slices within the frame have been processed, the lossless decoding processing ends, the flow returns to step S207 in FIG. 20, and the processing from step S208 on is executed.

By thus performing lossless decoding processing, the lossless decoding unit 202 can extract control information added to the encoded data independently from each other, and supply to the adaptive filter processing unit 207. Thus, the adaptive filter processing unit 207 can appropriately execute adaptive filter processing. Thus, the adaptive filter processing unit 207 can reduce block noise and noise due to quantization in the slice to be processed which could not be completely removed by the deblocking filter.

Other Examples

Of course, in this case as well, the elements of filter coefficient, block size, and filter block flag may be embedded in the slice header of the start slice of each element group, or may be embedded in the slice header of another predetermined slice.

Also, each element group may be set for each GOP or frame for example, with the number of groups of each element being changeable in the temporal direction.

9. Ninth Embodiment

Description of QALF

ALF blocks may have a quad tree structure, as described with NPL 3. This technique is called QALF (Quad tree-based Adaptive Loop Filter). A quad tree structure is a hierarchical structure where, at a lower hierarchical level, the region of one ALF block one hierarchical level above is divided into four.

Figure 42:
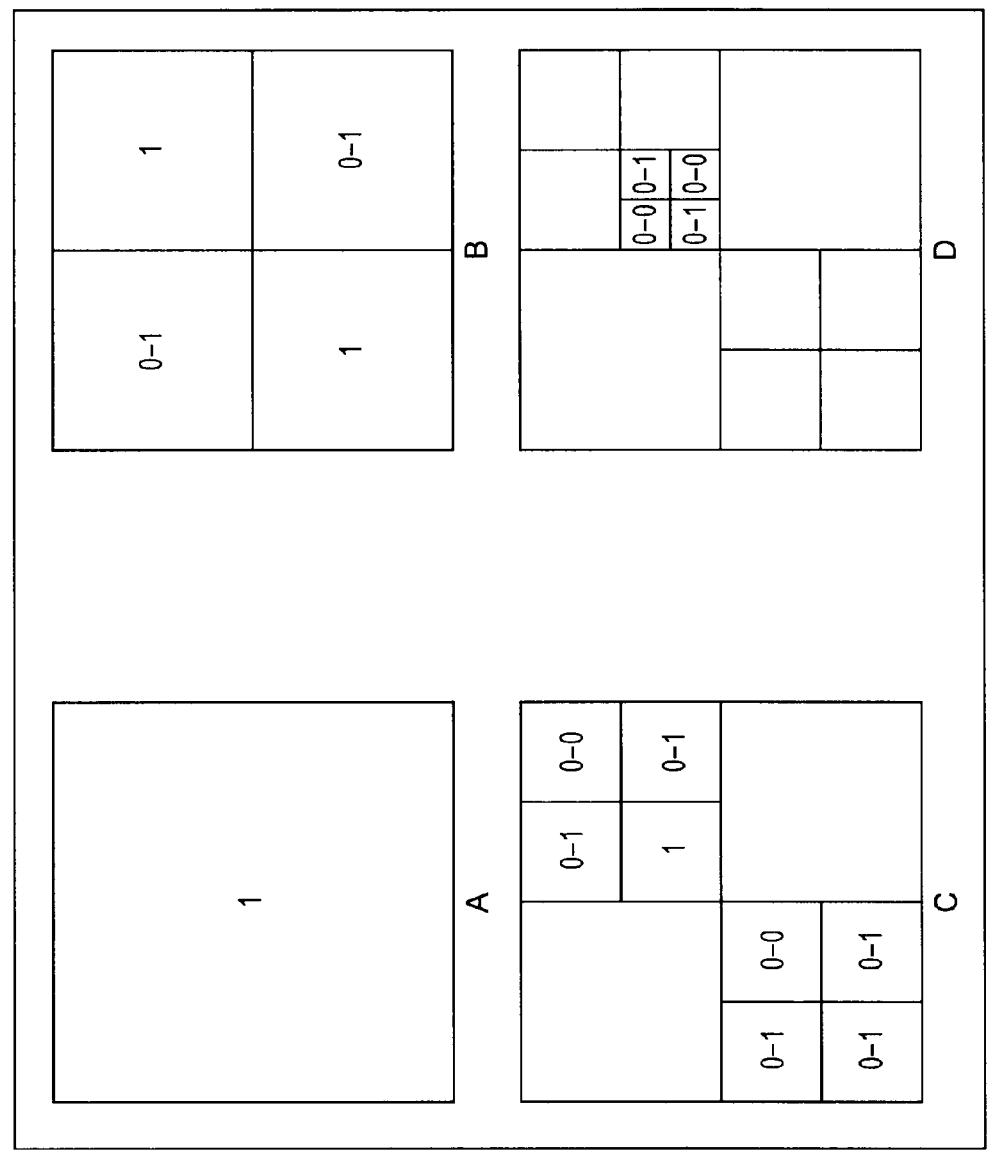
FIG. 42 is a diagram describing another example of ALF blocks and filter block flags.

FIG. 42 illustrates an example where ALF block division is expressed by a quad tree structure where the maximum number of layers is three, with a filter block flag being specified for each ALF block.

A in FIG. 42 indicates a layer 0 which is an ALF block serving as the root of the quad tree structure. In the quad tree structure, each ALF block has a block partitioning flag indicating whether or not it is divided into four at the lower hierarchical level. The value of the block partitioning flag of the ALF block shown in A in FIG. 42 is "1". That is to say, this ALF block is divided into four in the lower hierarchical level (layer 1). B in FIG. 42 shows the layer 1. That is to say, four ALF blocks are formed in the layer 1.

In the event that the block partitioning flag is "0", a further lower hierarchical level is not divided into four. That is to say, there is no further division, and a filter block flag is generated as to that ALF block. That is to say, an ALF block of which the block partitioning flag is "0" also has a filter block flag. The "0" to the left of the "0-1" shown in B in FIG. 42 indicates the block partitioning flag of that ALF block, and the "1" to the right shows the filter block flag of that ALF block.

The two ALF blocks of which the block partitioning flag in layer 1 is "1" are divided into four in the lower hierarchical level (layer 2). C in FIG. 42 illustrates the layer 2. That is to say, ten ALF blocks are formed in layer 2.

In the same way, ALF blocks with the block partitioning flag of "0" in layer 2 are also assigned a filter block flag. In C in FIG. 42, the block partitioning flag of one ALF block is "1". That is to say, that ALF block is divided into four in the further lower hierarchical level (layer 3). D in FIG. 42 show the layer 3. That is to say, 13 ALF blocks are formed in the layer 3.

Figure 43:
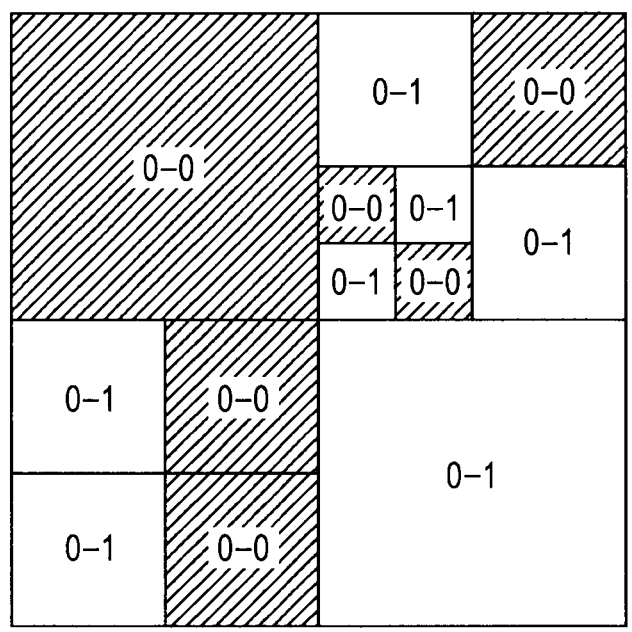
FIG. 43 is a diagram describing another example of ALF blocks and filter block flags.

By forming a quad tree as shown in FIG. 42, the structure of the ALF block ultimately becomes as shown in FIG. 43. Thus, with a quad tree structure, the size of ALF blocks differs with each hierarchical level. That is to say, by using a quad tree structure, the sizes of the ALF blocks can be made to be different one from another within the frame.

Control of the filter block flag in each ALF block is the same as with the first embodiment. That is to say, filter processing is not performed in regions where the value of the filter block flag is "0" (the hatched portions in FIG. 43).

The problem that there is concern that the encoding efficiency may deteriorate in the case of multi-slice is occurs as the same problem with QALF where the expression of ALF blocks has been improved.

Figure 44:
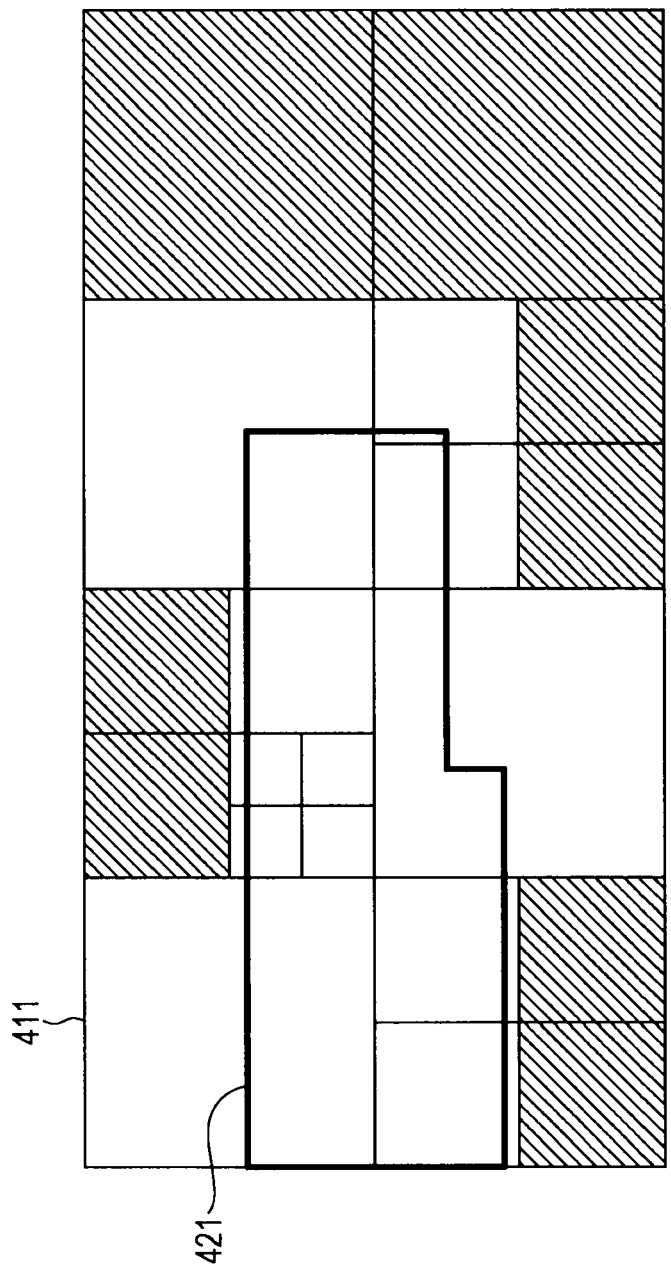
FIG. 44 is a diagram describing the way of processing is performed in the case of multi-slice.

FIG. 44 illustrates an example of encoding the region of slice 1 in FIG. 5 using the QALF technique.

Here, the region of the heavy line 421 represents the region of slice 1. If the control information of the entire QALF 411 is divided into slices as indicated by the heavy line 421 to serve as a plurality of control information, and adding these to encoded data, redundant information occurs among the control information.

Accordingly, with the case of QALF as well, the image encoding device 100 includes the control information of multiple slices in one slice header of the encoded data, by the same method as with the case of BALF described in the first embodiment. The image decoding device 200 also extracts the control information and performs adaptive filter processing in the same way as with the case of BALF.

Thus, redundancy of control information added to the encoded data is suppressed, so the encoding efficiency can be improved over the case of embedding control information in each slice.

10. Tenth Embodiment

Personal Computer

The above-described series of processing may be executed by hardware, and may be executed by software. In this case, a configuration may be made as a personal computer such as shown in FIG. 45, for example.

Figure 45:
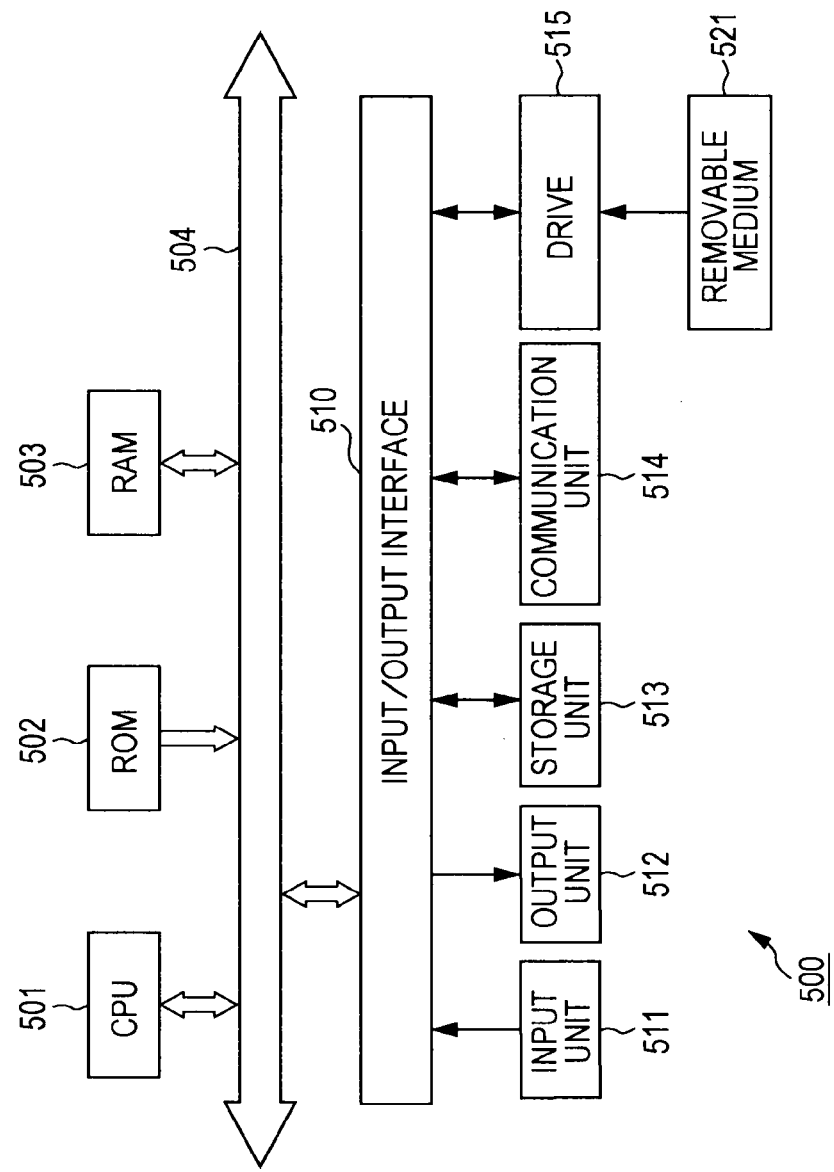
FIG. 45 is a block diagram illustrating a principal configuration example of a personal computer to which the present invention has been applied.

In FIG. 45, a CPU 501 of a personal computer 500 executes various types of processing following programs stored in ROM (Read Only Memory) 502 or programs loaded to RAM (Random Access Memory) 503 from a storage unit 513. The RAM 503 also stores data and so forth necessary for the CPU 501 to execute various types of processing, as appropriate.

The CPU 501, ROM 502, and RAM 503 are mutually connected by a bus 504. This bus 504 is also connected to an input/output interface 510.

Connected to the input/output interface 510 is an input unit 511 made up of a keyboard, a mouse, and so forth, an output unit 512 made up of a display such as a CRT (Cathode Ray Tube) or LCD (Liquid Crystal Display) or the like, a speaker, and so forth, a storage unit 513 made up of a hard disk and so forth, and a communication unit 514 made up of a modem and so forth. The communication unit 514 performs communication processing via networks including the Internet.

Also connected to the input/output interface 510 is a drive 515 as necessary, to which a removable medium 521 such as a magnetic disk, an optical disc, a magneto-optical disk, semiconductor memory, or the like, is mounted as appropriate, and computer programs read out therefrom are installed in the storage unit 513 as necessary.

In the event of executing the above-described series of processing by software, a program configuring the software is installed from a network or recording medium.

As shown in FIG. 45, for example, this recording medium is not only configured of a removable medium 521 made up of a magnetic disk (including flexible disk), optical disc (including CD-ROM (Compact Disc-Read Only Memory), DVD (Digital Versatile Disc), magneto-optical disc (MD (Mini Disc)), or semiconductor memory or the like, in which programs are recorded and distributed so as to distribute programs to users separately from the device main unit, but also is configured of ROM 502, a hard disk included in the storage unit 513, and so forth, in which programs are recorded, distributed to users in a state of having been built into the device main unit beforehand.

Note that a program which the computer executes may be a program in which processing is performed in time sequence following the order described in the present Specification, or may be a program in which processing is performed in parallel, or at a necessary timing, such as when a call-up has been performed.

Also, with the present Specification, steps describing programs recorded in the recording medium includes processing performed in time sequence following the described order as a matter of course, and also processing executed in parallel or individually, without necessarily being processed in time sequence.

Also, with the present specification, the term system represents the entirety of devices configured of multiple devices (devices).

Also, a configuration which has been described above as one device (or processing unit) may be divided and configured as multiple devices (or processing units). Conversely, configurations which have been described above as multiple devices (or processing units) may be integrated and configured as a single device (or processing unit). Also, configurations other than those described above may be added to the devices (or processing units), as a matter of course. Further, part of a configuration of a certain device (or processing unit) may be included in a configuration of another device (or another processing unit), as long as the configuration and operations of the overall system is substantially the same. That is to say, the embodiments of the present invention are not restricted to the above-described embodiments, and that various modifications may be made without departing from the essence of the present invention.

For example, the above-described image encoding device 100 and image decoding device 200 may be applied to image various electronic devices. The following is a description of examples thereof.

11. Eleventh Embodiment

Television Receiver

Figure 46:
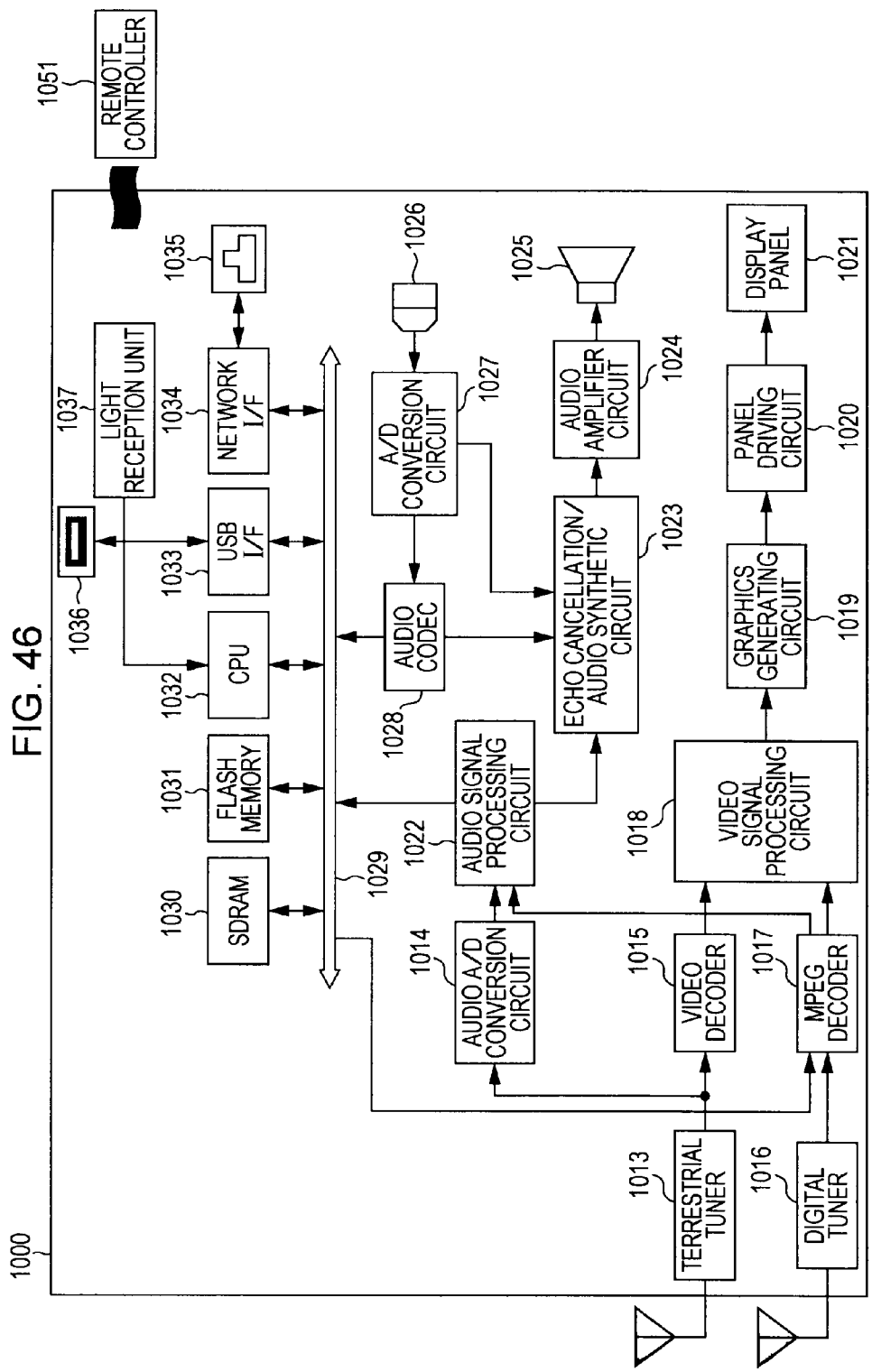
FIG. 46 is a block diagram illustrating a principal configuration example of a television receiver to which the present invention has been applied.
Figure 47:
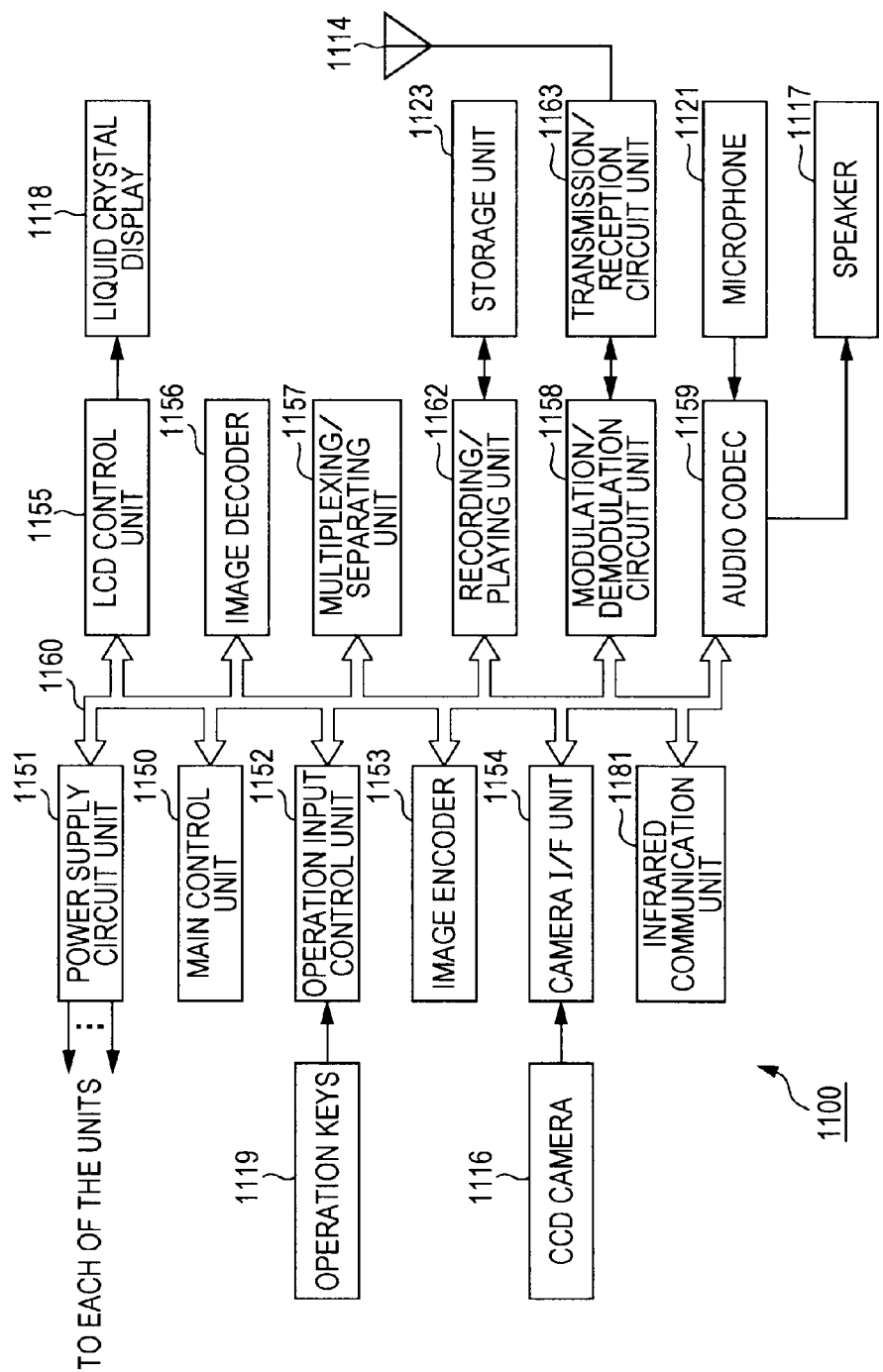
FIG. 47 is a block diagram illustrating a principal configuration example of a cellular telephone to which the present invention has been applied.

FIG. 46 is a block diagram illustrating a principal configuration example of a television receiver using the image decoding device 200 to which the present invention has been applied.

A television receiver 1000 shown in FIG. 46 includes a terrestrial tuner 1013, a video decoder 1015, a video signal processing circuit 1018, a graphics generating circuit 1019, a panel driving circuit 1020, and a display panel 1021.

The terrestrial tuner 1013 receives the broadcast wave signals of a terrestrial analog broadcast via an antenna, demodulates, obtains video signals, and supplies these to the video decoder 1015. The video decoder 1015 subjects the video signals supplied from the terrestrial tuner 1013 to decoding processing, and supplies the obtained digital component signals to the video signal processing circuit 1018.

The video signal processing circuit 1018 subjects the video data supplied from the video decoder 1015 to predetermined processing such as noise removal or the like, and supplies the obtained video data to the graphics generating circuit 1019.

The graphics generating circuit 1019 generates the video data of a program to be displayed on a display panel 1021, or image data due to processing based on an application to be supplied via a network, or the like, and supplies the generated video data or image data to the panel driving circuit 1020. Also, the graphics generating circuit 1019 also performs processing such as supplying video data obtained by generating video data (graphics) for the user displaying a screen used for selection of an item or the like, and superimposing this on the video data of a program, to the panel driving circuit 1020 as appropriate.

The panel driving circuit 1020 drives the display panel 1021 based on the data supplied from the graphics generating circuit 1019 to display the video of a program, or the above-mentioned various screens on the display panel 1021.

The display panel 1021 is made up of an LCD (Liquid Crystal Display) and so forth, and displays the video of a program or the like in accordance with the control by the panel driving circuit 1020.

Also, the television receiver 1000 also includes an audio A/D (Analog/Digital) conversion circuit 1014, an audio signal processing circuit 1022, an echo cancellation/audio synthesizing circuit 1023, an audio amplifier circuit 1024, and a speaker 1025.

The terrestrial tuner 1013 demodulates the received broadcast wave signal, thereby obtaining not only a video signal but also an audio signal. The terrestrial tuner 1013 supplies the obtained audio signal to the audio A/D conversion circuit 1014.

The audio A/D conversion circuit 1014 subjects the audio signal supplied from the terrestrial tuner 1013 to A/D conversion processing, and supplies the obtained digital audio signal to the audio signal processing circuit 1022.

The audio signal processing circuit 1022 subjects the audio data supplied from the audio A/D conversion circuit 1014 to predetermined processing such as noise removal or the like, and supplies the obtained audio data to the echo cancellation/audio synthesizing circuit 1023.

The echo cancellation/audio synthesizing circuit 1023 supplies the audio data supplied from the audio signal processing circuit 1022 to the audio amplifier circuit 1024.

The audio amplifier circuit 1024 subjects the audio data supplied from the echo cancellation/audio synthesizing circuit 1023 to D/A conversion processing, subjects to amplifier processing to adjust to predetermined volume, and then outputs the audio from the speaker 1025.

Further, the television receiver 1000 also includes a digital tuner 1016, and an MPEG decoder 1017.

The digital tuner 1016 receives the broadcast wave signals of a digital broadcast (terrestrial digital broadcast, BS (Broadcasting Satellite)/CS (Communications Satellite) digital broadcast) via the antenna, demodulates to obtain MPEG-TS (Moving Picture Experts Group-Transport Stream), and supplies this to the MPEG decoder 1017.

The MPEG decoder 1017 descrambles the scrambling given to the MPEG-TS supplied from the digital tuner 1016, and extracts a stream including the data of a program serving as a playback object (viewing object). The MPEG decoder 1017 decodes an audio packet making up the extracted stream, supplies the obtained audio data to the audio signal processing circuit 1022, and also decodes a video packet making up the stream, and supplies the obtained video data to the video signal processing circuit 1018. Also, the MPEG decoder 1017 supplies EPG (Electronic Program Guide) data extracted from the MPEG-TS to a CPU 1032 via an unshown path.

The television receiver 1000 uses the above-mentioned image decoding device 200 as the MPEG decoder 1017 for decoding video packets in this way. Note that the MPEG-TS transmitted from the broadcasting station or the like has been encoded by the image encoding device 100.

The MPEG decoder 1017 extracts multiple slices worth of control information embedded in one slice header, from the encoded data supplied from the image encoding device 100, in the same way as with the image decoding device 200, and performs adaptive filter control processing using this control information, whereby deterioration in encoding efficiency due to local control of filter processing can be suppressed.

The video data supplied from the MPEG decoder 1017 is, in the same way as with the case of the video data supplied from the video decoder 1015, subjected to predetermined processing at the video signal processing circuit 1018, superimposed on the generated video data and so forth at the graphics generating circuit 1019 as appropriate, supplied to the display panel 1021 via the panel driving circuit 1020, and the image thereof is displayed thereon.

The audio data supplied from the MPEG decoder 1017 is, in the same way as with the case of the audio data supplied from the audio A/D conversion circuit 1014, subjected to predetermined processing at the audio signal processing circuit 1022, supplied to the audio amplifier circuit 1024 via the echo cancellation/audio synthesizing circuit 1023, and subjected to D/A conversion processing and amplifier processing. As a result thereof, the audio adjusted in predetermined volume is output from the speaker 1025.

Also, the television receiver 1000 also includes a microphone 1026, and an A/D conversion circuit 1027.

The A/D conversion circuit 1027 receives the user's audio signals collected by the microphone 1026 provided to the television receiver 1000 serving as for audio conversation, subjects the received audio signal to A/D conversion processing, and supplies the obtained digital audio data to the echo cancellation/audio synthesizing circuit 1023.

In the event that the user (user A)'s audio data of the television receiver 1000 has been supplied from the A/D conversion circuit 1027, the echo cancellation/audio synthesizing circuit 1023 perform echo cancellation with the user (user A)'s audio data taken as a object, and outputs audio data obtained by synthesizing the user A's audio data and other audio data, or the like from the speaker 1025 via the audio amplifier circuit 1024.

Further, the television receiver 1000 also includes an audio codec 1028, an internal bus 1029, SDRAM (Synchronous Dynamic Random Access Memory) 1030, flash memory 1031, a CPU 1032, a USB (Universal Serial Bus) I/F 1033, and a network I/F 1034.

The A/D conversion circuit 1027 receives the user's audio signal collected by the microphone 1026 provided to the television receiver 1000 serving as for audio conversation, subjects the received audio signal to A/D conversion processing, and supplies the obtained digital audio data to the audio codec 1028.

The audio codec 1028 converts the audio data supplied from the A/D conversion circuit 1027 into the data of a predetermined format for transmission via a network, and supplies to the network I/F 1034 via the internal bus 1029.

The network I/F 1034 is connected to the network via a cable mounted on a network terminal 1035. The network I/F 1034 transmits the audio data supplied from the audio codec 1028 to another device connected to the network thereof, for example. Also, the network I/F 1034 receives, via the network terminal 1035, the audio data transmitted from another device connected thereto via the network, and supplies this to the audio codec 1028 via the internal bus 1029, for example.

The audio codec 1028 converts the audio data supplied from the network I/F 1034 into the data of a predetermined format, and supplies this to the echo cancellation/audio synthesizing circuit 1023.

The echo cancellation/audio synthesizing circuit 1023 performs echo cancellation with the audio data supplied from the audio codec 1028 taken as a object, and outputs the data of audio obtained by synthesizing the audio data and other audio data, or the like, from the speaker 1025 via the audio amplifier circuit 1024.

The SDRAM 1030 stores various types of data necessary for the CPU 1032 performing processing.

The flash memory 1031 stores a program to be executed by the CPU 1032. The program stored in the flash memory 1031 is read out by the CPU 1032 at predetermined timing such as when activating the television receiver 1000, or the like. EPG data obtained via a digital broadcast, data obtained from a predetermined server via the network, and so forth are also stored in the flash memory 1031.

For example, MPEG-TS including the content data obtained from a predetermined server via the network by the control of the CPU 1032 is stored in the flash memory 1031. The flash memory 1031 supplies the MPEG-TS thereof to the MPEG decoder 1017 via the internal bus 1029 by the control of the CPU 1032, for example.

The MPEG decoder 1017 processes the MPEG-TS thereof in the same way as with the case of the MPEG-TS supplied from the digital tuner 1016. In this way, the television receiver 1000 receives the content data made up of video, audio, and so forth via the network, decodes using the MPEG decoder 1017, whereby video thereof can be displayed, and audio thereof can be output.

Also, the television receiver 1000 also includes a light reception unit 1037 for receiving the infrared signal transmitted from a remote controller 1051.

The light reception unit 1037 receives infrared rays from the remote controller 1051, and outputs a control code representing the content of the user's operation obtained by demodulation, to the CPU 1032.

The CPU 1032 executes the program stored in the flash memory 1031 to control the entire operation of the television receiver 1000 according to the control code supplied from the light reception unit 1037, and so forth. The CPU 1032, and the units of the television receiver 1000 are connected via an unshown path.

The USB I/F 1033 performs transmission/reception of data as to an external device of the television receiver 1000 which is connected via a USB cable mounted on a USB terminal 1036. The network I/F 1034 connects to the network via a cable mounted on the network terminal 1035, also performs transmission/reception of data other than audio data as to various devices connected to the network.

The television receiver 1000 uses the image decoding device 200 as the MPEG decoder 1017, whereby multiple slices worth of control information added to one slice header of encoded data can be extracted, and further, this control information can be used to execute appropriate adaptive filter processing. As a result, the television receiver 1000 can realize suppression in deterioration of encoding efficiency due to local control of filter processing as to broadcast signals received via an antenna or content data obtained via a network.

12. Twelfth Embodiment

Cellular Telephone

Figure 48:
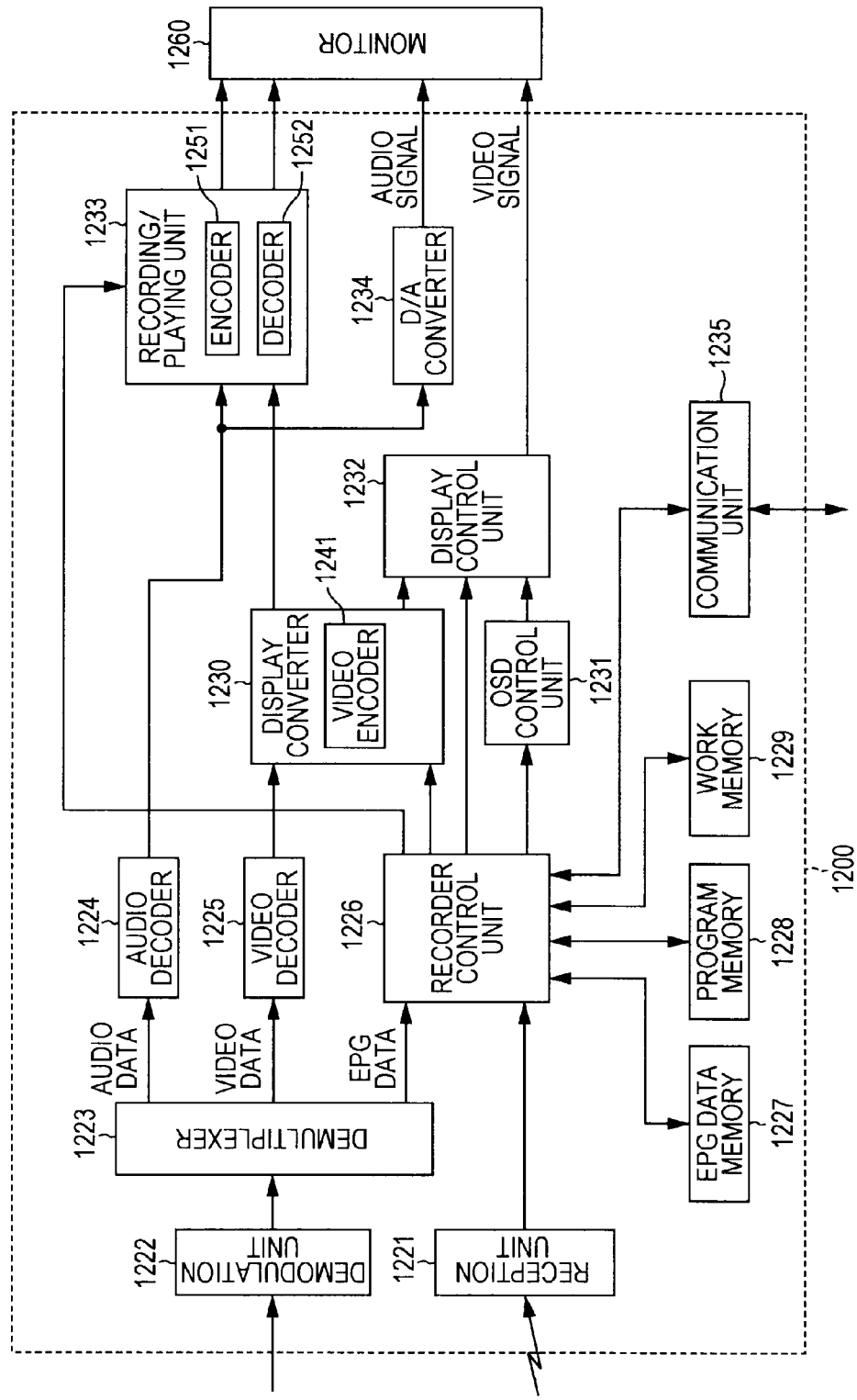
FIG. 48 is a block diagram illustrating a principal configuration example of a hard disk recorder to which the present invention has been applied.

FIG. 48 is a block diagram illustrating a principal configuration example of a cellular telephone using the image encoding device and image decoding device to which the present invention has been applied.

A cellular telephone 1100 shown in FIG. 48 includes a main control unit 1150 configured so as to integrally control the units, a power supply circuit unit 1151, an operation input control unit 1152, an image encoder 1153, a camera I/F unit 1154, an LCD control unit 1155, an image decoder 1156, a multiplexing/separating unit 1157, a recording/playback unit 1162, a modulation/demodulation circuit unit 1158, and an audio codec 1159. These are mutually connected via a bus 1160.

Also, the cellular telephone 1100 includes operation keys 1119, a CCD (Charge Coupled Devices) camera 1116, a liquid crystal display 1118, a storage unit 1123, a transmission/reception circuit unit 1163, an antenna 1114, a microphone (MIC) 1121, and a speaker 1117.

Upon a call end and power key being turned on by the user's operation, the power supply circuit unit 1151 activates the cellular telephone 1100 in an operational state by supplying power to the units from a battery pack.

The cellular telephone 1100 performs various operations, such as transmission/reception of an audio signal, transmission/reception of an e-mail and image data, image shooting, data recoding, and so forth, in various modes such as a voice call mode, a data communication mode, and so forth, based on the control of the main control unit 1150 made up of a CPU, ROM, RAM, and so forth.

For example, in the voice call mode, the cellular telephone 1100 converts the audio signal collected by the microphone (mike) 1121 into digital audio data by the audio codec 1159, subjects this to spectrum spread processing at the modulation/demodulation circuit unit 1158, and subjects this to digital/analog conversion processing and frequency conversion processing at the transmission/reception circuit unit 1163. The cellular telephone 1100 transmits the signal for transmission obtained by the conversion processing thereof to an unshown base station via the antenna 1114. The signal for transmission (audio signal) transmitted to the base station is supplied to the cellular telephone of the other party via the public telephone network.

Also, for example, in the voice call mode, the cellular telephone 1100 amplifies the reception signal received at the antenna 1114, at the transmission/reception circuit unit 1163, further subjects to frequency conversion processing and analog/digital conversion processing, subjects to spectrum inverse spread processing at the modulation/demodulation circuit unit 1158, and converts into an analog audio signal by the audio codec 1159. The cellular telephone 1100 outputs the converted and obtained analog audio signal thereof from the speaker 1117.

Further, for example, in the event of transmitting an e-mail in the data communication mode, the cellular telephone 1100 accepts the text data of the e-mail input by the operation of the operation keys 1119 at the operation input control unit 1152. The cellular telephone 1100 processes the text data thereof at the main control unit 1150, and displays on the liquid crystal display 1118 via the LCD control unit 1155 as an image.

Also, the cellular telephone 1100 generates e-mail data at the main control unit 1150 based on the text data accepted by the operation input control unit 1152, the user's instructions, and so forth. The cellular telephone 1100 subjects the e-mail data thereof to spectrum spread processing at the modulation/demodulation circuit unit 1158, and subjects to digital/analog conversion processing and frequency conversion processing at the transmission/reception circuit unit 1163. The cellular telephone 1100 transmits the signal for transmission obtained by the conversion processing thereof to an unshown base station via the antenna 1114. The signal for transmission (e-mail) transmitted to the base station is supplied to a predetermined destination via the network, mail server, and so forth.

Also, for example, in the event of receiving an e-mail in the data communication mode, the cellular telephone 1100 receives the signal transmitted from the base station via the antenna 1114 with the transmission/reception circuit unit 1163, amplifies, and further subjects to frequency conversion processing and analog/digital conversion processing. The cellular telephone 1100 subjects the reception signal thereof to spectrum inverse spread processing at the modulation/demodulation circuit unit 1158 to restore the original e-mail data. The cellular telephone 1100 displays the restored e-mail data on the liquid crystal display 1118 via the LCD control unit 1155.

Note that the cellular telephone 1100 may record (store) the received e-mail data in the storage unit 1123 via the recording/playback unit 1162.

This storage unit 1123 is an optional rewritable recording medium. The storage unit 1123 may be semiconductor memory such as RAM, built-in flash memory, or the like, may be a hard disk, or may be a removable medium such as a magnetic disk, a magneto-optical disk, an optical disc, USB memory, a memory card, or the like. It goes without saying that the storage unit 1123 may be other than these.

Further, for example, in the event of transmitting image data in the data communication mode, the cellular telephone 1100 generates image data by imaging at the CCD camera 1116. The CCD camera 1116 includes a CCD serving as an optical device such as a lens, diaphragm, and so forth, and serving as a photoelectric conversion device, which images a subject, converts the intensity of received light into an electrical signal, and generates the image data of an image of the subject. The CCD camera 1116 performs compression encoding of the image data at the image encoder 1153 via the camera I/F unit 1154, and converts into encoded image data.

The cellular telephone 1100 employs the above-mentioned image encoding device 100 as the image encoder 1153 for performing such processing. Accordingly, in the same way as with the image encoding device 100, the image encoder 1053 can suppress deterioration of encoding efficiency due to local control of filter processing. For example, the image encoder 1053 can improve encoding efficiency over a case of embedding control information in each slice, by adding multiple slices with of control information added to one slice header of encoded data.

Note that, at this time simultaneously, the cellular telephone 1100 converts the audio collected at the microphone (mike) 1121, while shooting with the CCD camera 1116, from analog to digital at the audio codec 1159, and further encodes this.

The cellular telephone 1100 multiplexes the encoded image data supplied from the image encoder 1153, and the digital audio data supplied from the audio codec 1159 at the multiplexing/separating unit 1157 using a predetermined method. The cellular telephone 1100 subjects the multiplexed data obtained as a result thereof to spectrum spread processing at the modulation/demodulation circuit unit 1158, and subjects to digital/analog conversion processing and frequency conversion processing at the transmission/reception circuit unit 1163. The cellular telephone 1100 transmits the signal for transmission obtained by the conversion processing thereof to an unshown base station via the antenna 1114. The signal for transmission (image data) transmitted to the base station is supplied to the other party via the network or the like.

Note that in the event that image data is not transmitted, the cellular telephone 1100 may also display the image data generated at the CCD camera 1116 on the liquid crystal display 1118 via the LCD control unit 1155 instead of the image encoder 1153.

Also, for example, in the event of receiving the data of a moving image file linked to a simple website or the like in the data communication mode, the cellular telephone 1100 receives the signal transmitted from the base station at the transmission/reception circuit unit 1163 via the antenna 1114, amplifies, and further subjects to frequency conversion processing and analog/digital conversion processing. The cellular telephone 1100 subjects the received signal to spectrum inverse spread processing at the modulation/demodulation circuit unit 1158 to restore the original multiplexed data. The cellular telephone 1100 separates the multiplexed data thereof at the multiplexing/separating unit 1157 into encoded image data and audio data.

The cellular telephone 1100 decodes the encoded image data at the image decoder 1156 using the decoding format corresponding to a predetermined encoding format such as MPEG2, MPEG4, or the like, thereby generating playback moving image data, and displays this on the liquid crystal display 1118 via the LCD control unit 1155. Thus, moving image data included in a moving image file linked to a simple website is displayed on the liquid crystal display 1118, for example.

The cellular telephone 1100 employs the above-mentioned image decoding device 200 as the image decoder 1156 for performing such processing. Accordingly, in the same way as with the image decoding device 200, the image decoder 1156 an extract multiple slices worth of control information added to one slice header of encoded data, and further, this control header can be used to appropriately execute adaptive filter processing. As a result, suppression of deterioration in encoding efficiency due to local control of filter processing can be realized.

At this time, simultaneously, the cellular telephone 1100 converts the digital audio data into an analog audio signal at the audio codec 1159, and outputs this from the speaker 1117. Thus, audio data included in a moving image file linked to a simple website is played, for example.

Note that, in the same way as with the case of e-mail, the cellular telephone 1100 may record (store) the received data linked to a simple website or the like in the storage unit 1123 via the recording/playback unit 1162.

Also, the cellular telephone 1100 analyzes the imaged two-dimensional code obtained by the CCD camera 1116 at the main control unit 1150, whereby information recorded in the two-dimensional code can be obtained.

Further, the cellular telephone 1100 can communicate with an external device at the infrared communication unit 1181 using infrared rays.

The cellular telephone 1100 employs the image encoding device 100 as the image encoder 1153, whereby suppression can be realized of deterioration of encoding efficiency due to local control of filter processing regarding encoded data generated by encoding image data generated at the CCD camera 1116, for example. As a result, the cellular telephone 1100 can provide encoded data (image data), with better encoding efficiency that a case of embedding control information in each slice, to other device.

Also, the cellular telephone 1100 employs the image decoding device 200 as the image decoder 1156, whereby multiple slices with of control information added to one slice header of encoded data can be extracted, and further, the control information can be used to appropriately execute adaptive filter processing. As a result thereof, the cellular telephone 1100 can realize suppression of deterioration of encoding efficiency due to local control of filter processing regarding data of a moving image file linked to at a simple website or the like, for example.

Note that description has been made so far wherein the cellular telephone 1100 employs the CCD camera 1116, but the cellular telephone 1100 may employ an image sensor (CMOS image sensor) using CMOS (Complementary Metal Oxide Semiconductor) instead of this CCD camera 1116. In this case as well, the cellular telephone 1100 can image a subject and generate the image data of an image of the subject in the same way as with the case of employing the CCD camera 1116.

Also, description has been made so far regarding the cellular telephone 1100, but the image encoding device 100 and the image decoding device 200 may be applied to any kind of device in the same way as with the case of the cellular telephone 1100 as long as it is a device having the same imaging function and communication function as those of the cellular telephone 1100, for example, such as a PDA (Personal Digital Assistants), smart phone, UMPC (Ultra Mobile Personal Computer), net book, notebook-sized personal computer, or the like.

13. Thirteenth Embodiment

Hard Disk Recorder

FIG. 48 is a block diagram illustrating a principal configuration example of a hard disk recorder which employs the image encoding device and image decoding device to which the present invention has been applied.

A hard disk recorder (HDD recorder) 1200 shown in FIG. 48 is a device which stores, in a built-in hard disk, audio data and video data of a broadcast program included in broadcast wave signals (television signals) received by a tuner and transmitted from a satellite or a terrestrial antenna or the like, and provides the stored data to the user at timing according to the user's instructions.

The hard disk recorder 1200 can extract audio data and video data from broadcast wave signals, decode these as appropriate, and store in the built-in hard disk, for example. Also, the hard disk recorder 1200 can also obtain audio data and video data from another device via the network, decode these as appropriate, and store in the built-in hard disk, for example.

Further, the hard disk recorder 1200 can decode audio data and video data recorded in the built-in hard disk, supply this to a monitor 1260, display an image thereof on the screen of the monitor 1260, and output audio thereof from the speaker of the monitor 1260, for example. Also, the hard disk recorder 1200 can decode audio data and video data extracted from broadcast signals obtained via a tuner, or audio data and video data obtained from another device via a network, supply this to the monitor 1260, display an image thereof on the screen of the monitor 1260, and output audio thereof from the speaker of the monitor 1260, for example.

Of course, operations other than these may be performed.

As shown in FIG. 48, the hard disk recorder 1200 includes a reception unit 1221, a demodulation unit 1222, a demultiplexer 1223, an audio decoder 1224, a video decoder 1225, and a recorder control unit 1226. The hard disk recorder 1200 further includes EPG data memory 1227, program memory 1228, work memory 1229, a display converter 1230, an OSD (On Screen Display) control unit 1231, a display control unit 1232, a recording/playback unit 1233, a D/A converter 1234, and a communication unit 1235.

Also, the display converter 1230 includes a video encoder 1241. The recording/playback unit 1233 includes an encoder 1251 and a decoder 1252.

The reception unit 1221 receives the infrared signal from the remote controller (not shown), converts into an electrical signal, and outputs to the recorder control unit 1226. The recorder control unit 1226 is configured of, for example, a microprocessor and so forth, and executes various types of processing in accordance with the program stored in the program memory 1228. At this time, the recorder control unit 1226 uses the work memory 1229 according to need.

The communication unit 1235, which is connected to the network, performs communication processing with another device via the network. For example, the communication unit 1235 is controlled by the recorder control unit 1226 to communicate with a tuner (not shown), and to principally output a channel selection control signal to the tuner.

The demodulation unit 1222 demodulates the signal supplied from the tuner, and outputs to the demultiplexer 1223. The demultiplexer 1223 separates the data supplied from the demodulation unit 1222 into audio data, video data, and EPG data, and outputs to the audio decoder 1224, video decoder 1225, and recorder control unit 1226, respectively.

The audio decoder 1224 decodes the input audio data, and outputs to the recording/playback unit 1233. The video decoder 1225 decodes the input video data, and outputs to the display converter 1230. The recorder control unit 1226 supplies the input EPG data to the EPG data memory 1227 for storing.

The display converter 1230 encodes the video data supplied from the video decoder 1225 or recorder control unit 1226 into, for example, the video data conforming to the NTSC (National Television Standards Committee) format using the video encoder 1241, and outputs to the recording/playback unit 1233. Also, the display converter 1230 converts the size of the screen of the video data supplied from the video decoder 1225 or recorder control unit 1226 into the size corresponding to the size of the monitor 1260, converts the video data of which the screen size has been converted into the video data conforming to the NTSC format using the video encoder 1241, converts into an analog signal, and outputs to the display control unit 1232.

The display control unit 1232 superimposes, under the control of the recorder control unit 1226, the OSD signal output from the OSD (On Screen Display) control unit 1231 on the video signal input from the display converter 1230, and outputs to the display of the monitor 1260 for display.

Also, the audio data output from the audio decoder 1224 has been converted into an analog signal using the D/A converter 1234, and supplied to the monitor 1260. The monitor 1260 outputs this audio signal from a built-in speaker.

The recording/playback unit 1233 includes a hard disk as a recording medium in which video data, audio data, and so forth are recorded.

The recording/playback unit 1233 encodes the audio data supplied from the audio decoder 1224 by the encoder 1251. Also, the recording/playback unit 1233 encodes the video data supplied from the video encoder 1241 of the display converter 1230 by the encoder 1251. The recording/playback unit 1233 synthesizes the encoded data of the audio data thereof, and the encoded data of the video data thereof using the multiplexer. The recording/playback unit 1233 amplifies the synthesized data by channel coding, and writes the data thereof in the hard disk via a recording head.

The recording/playback unit 1233 plays the data recorded in the hard disk via a playback head, amplifies, and separates into audio data and video data using the demultiplexer. The recording/playback unit 1233 decodes the audio data and video data by the decoder 1252 using the MPEG format. The recording/playback unit 1233 converts the decoded audio data from digital to analog, and outputs to the speaker of the monitor 1260. Also, the recording/playback unit 1233 converts the decoded video data from digital to analog, and outputs to the display of the monitor 1260.

The recorder control unit 1226 reads out the latest EPG data from the EPG data memory 1227 based on the user's instructions indicated by the infrared signal from the remote controller which is received via the reception unit 1221, and supplies to the OSD control unit 1231. The OSD control unit 1231 generates image data corresponding to the input EPG data, and outputs to the display control unit 1232. The display control unit 1232 outputs the video data input from the OSD control unit 1231 to the display of the monitor 1260 for display. Thus, EPG (Electronic Program Guide) is displayed on the display of the monitor 1260.

Also, the hard disk recorder 1200 can obtain various types of data such as video data, audio data, EPG data, and so forth supplied from another device via the network such as the Internet or the like.

The communication unit 1235 is controlled by the recorder control unit 1226 to obtain encoded data such as video data, audio data, EPG data, and so forth transmitted from another device via the network, and to supply this to the recorder control unit 1226. The recorder control unit 1226 supplies the encoded data of the obtained video data and audio data to the recording/playback unit 1233, and stores in the hard disk, for example. At this time, the recorder control unit 1226 and recording/playback unit 1233 may perform processing such as re-encoding or the like according to need.

Also, the recorder control unit 1226 decodes the encoded data of the obtained video data and audio data, and supplies the obtained video data to the display converter 1230. The display converter 1230 processes, in the same way as the video data supplied from the video decoder 1225, the video data supplied from the recorder control unit 1226, supplies to the monitor 1260 via the display control unit 1232 for displaying an image thereof.

Alternatively, an arrangement may be made wherein in accordance with this image display, the recorder control unit 1226 supplies the decoded audio data to the monitor 1260 via the D/A converter 1234, and outputs audio thereof from the speaker.

Further, the recorder control unit 1226 decodes the encoded data of the obtained EPG data, and supplies the decoded EPG data to the EPG data memory 1227.

The hard disk recorder 1200 thus configured employs the image decoding device 200 as the video decoder 1225, decoder 1252, and decoder housed in the recorder control unit 1226. Accordingly, in the same way as with the image decoding device 200, the video decoder 1225, decoder 1252, and decoder housed in the recorder control unit 1226 extract and decode multiple slices worth of control information added to one slice of encoded data, and further perform appropriate adaptive filter control processing using the control information. As a result, suppression of deterioration of encoding efficiency due to local control of filter processing can be realized.

Accordingly, the hard disk recorder 1200 can extract multiple slices worth of control information added to one slice header of the encoded data, and further can appropriately execute adaptive filter processing using that control information. As a result, the hard disk recorder 1200 can realize suppression of deterioration of encoding efficiency due to local control of filter processing regarding video data received via the tuner or communication unit 1235, and video data recorded in the hard disk of the recording/playback unit 1233, for example.

Also, the hard disk recorder 1200 employs the image encoding device 100 as the encoder 1251. Accordingly, in the same way as with the case of the image encoding device 100, the encoder 1251 can realize suppression of deterioration of encoding efficiency due to local control of filter processing. For example, the encoder 1251 adds multiple slices worth of control information added to one slice header of the encoded data, so encoding efficiency can be improved as compared to a case of embedding control information in each slice.

Accordingly, the hard disk recorder 1200 employs the image encoding device 100 as the encoder 1251, and accordingly can suppress deterioration of encoding efficiency due to local control of filter processing regarding encoded data recorded in the hard disk, for example. As a result, the hard disk recorder 1200 can use the storage region of the hard disk more efficiently as compared to a case of embedding control information in each slice.

Note that description has been made so far regarding the hard disk recorder 1200 for recording video data and audio data in the hard disk, but it goes without saying that any kind of recording medium may be employed. For example, even with a recorder to which a recording medium other than a hard disk, such as flash memory, optical disc, video tape, or the like, is applied, the image encoding device 100 and image decoding device 200 can be applied thereto in the same way as with the case of the above hard disk recorder 1200.

14. Fourteenth Embodiment

Camera

Figure 49:
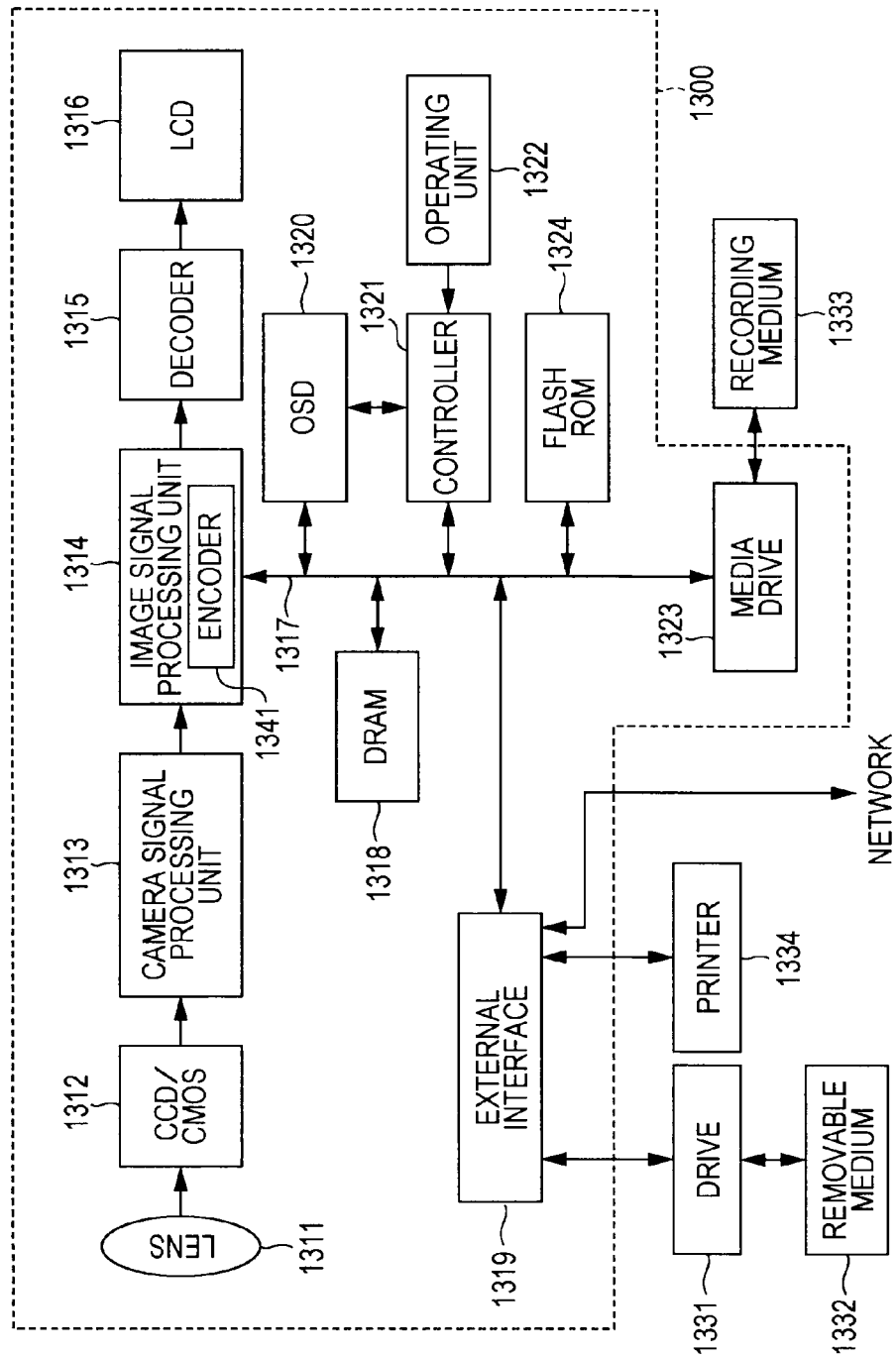
FIG. 49 is a block diagram illustrating a principal configuration example of a camera to which the present invention has been applied.
Figure 50:
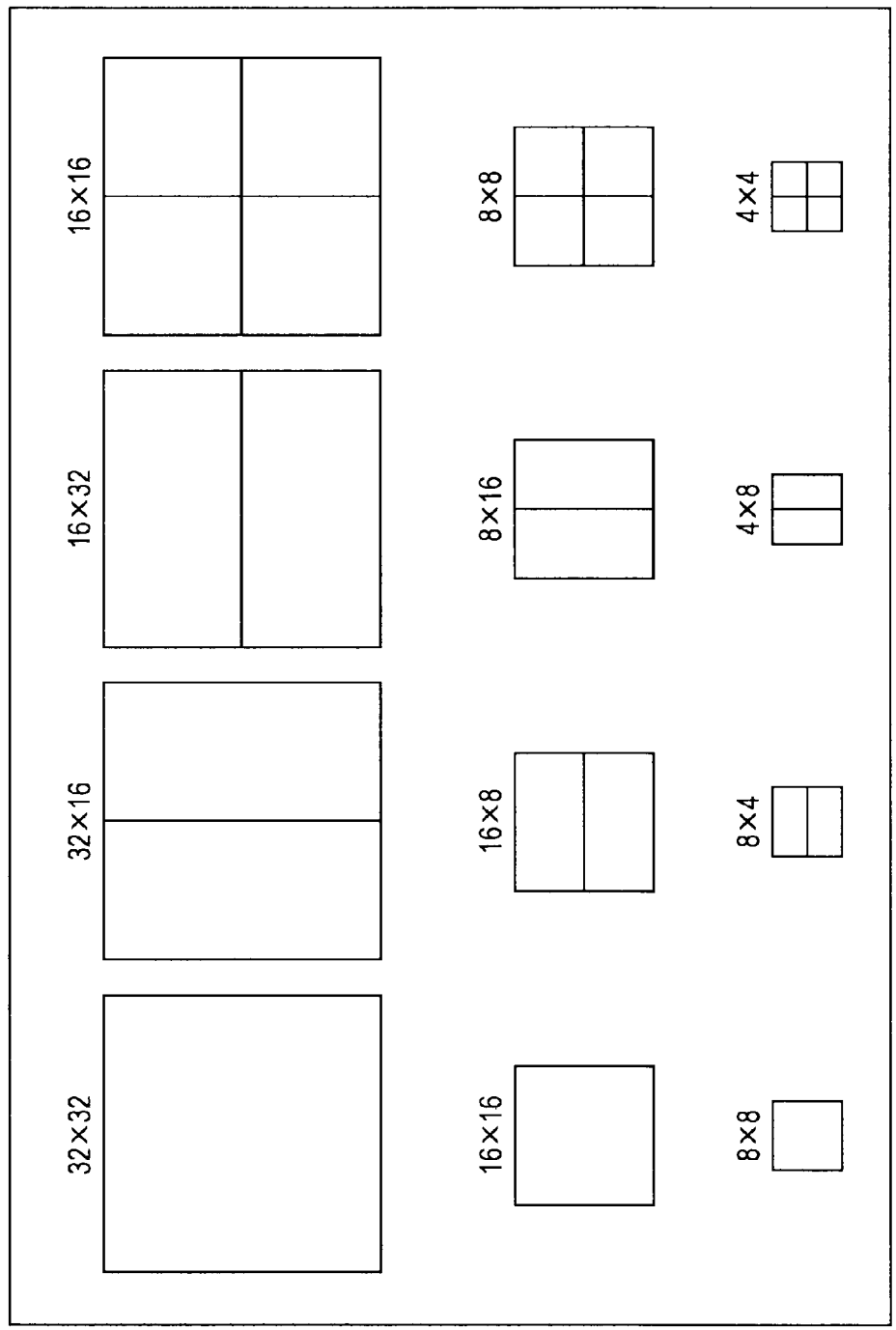
FIG. 50 is a diagram illustrating an example of macroblocks.

FIG. 49 is a block diagram illustrating a principal configuration example of a camera employing the image encoding device and image decoding device to which the present invention has been applied.

A camera 1300 shown in FIG. 49 images a subject, displays an image of the subject on an LCD 1316, and records this in a recording medium 1333 as image data.

A lens block 1311 inputs light (i.e., picture of a subject) to a CCD/CMOS 1312. The CCD/CMOS 1312 is an image sensor employing a CCD or CMOS, which converts the intensity of received light into an electrical signal, and supplies to a camera signal processing unit 1313.

The camera signal processing unit 1313 converts the electrical signal supplied from the CCD/CMOS 1312 into color difference signals of Y, Cr, and Cb, and supplies to an image signal processing unit 1314. The image signal processing unit 1314 subjects, under the control of a controller 1321, the image signal supplied from the camera signal processing unit 1313 to predetermined image processing, or encodes the image signal thereof by an encoder 1341 using the MPEG format for example. The image signal processing unit 1314 supplies encoded data generated by encoding an image signal, to a decoder 1315. Further, the image signal processing unit 1314 obtains data for display generated at an on-screen display (OSD) 1320, and supplies this to the decoder 1315.

With the above-mentioned processing, the camera signal processing unit 1313 appropriately takes advantage of DRAM (Dynamic Random Access Memory) 1318 connected via a bus 1317 to hold image data, encoded data encoded from the image data thereof, and so forth in the DRAM 1318 thereof according to need.

The decoder 1315 decodes the encoded data supplied from the image signal processing unit 1314, and supplies obtained image data (decoded image data) to the LCD 1316. Also, the decoder 1315 supplies the data for display supplied from the image signal processing unit 1314 to the LCD 1316. The LCD 1316 synthesizes the image of the decoded image data, and the image of the data for display, supplied from the decoder 1315 as appropriate, and displays a synthesizing image thereof.

The on-screen display 1320 outputs, under the control of the controller 1321, data for display such as a menu screen or icon or the like made up of a symbol, characters, or a figure to the image signal processing unit 1314 via the bus 1317.

Based on a signal indicating the content commanded by the user using an operating unit 1322, the controller 1321 executes various types of processing, and also controls the image signal processing unit 1314, DRAM 1318, external interface 1319, on-screen display 1320, media drive 1323, and so forth via the bus 1317. A program, data, and so forth necessary for the controller 1321 executing various types of processing are stored in FLASH ROM 1324.

For example, the controller 1321 can encode image data stored in the DRAM 1318, or decode encoded data stored in the DRAM 1318 instead of the image signal processing unit 1314 and decoder 1315. At this time, the controller 1321 may perform encoding and decoding processing using the same format as the encoding and decoding format of the image signal processing unit 1314 and decoder 1315, or may perform encoding and decoding processing using a format that neither the image signal processing unit 1314 nor the decoder 1315 can handle.

Also, for example, in the event that start of image printing has been instructed from the operating unit 1322, the controller 1321 reads out image data from the DRAM 1318, and supplies this to a printer 1334 connected to the external interface 1319 via the bus 1317 for printing.

Further, for example, in the event that image recording has been instructed from the operating unit 1322, the controller 1321 reads out encoded data from the DRAM 1318, and supplies this to a recording medium 1333 mounted on the media drive 1323 via the bus 1317 for storing.

The recording medium 1333 is an optional readable/writable removable medium, for example, such as a magnetic disk, a magneto-optical disk, an optical disc, semiconductor memory, or the like. It goes without saying that the recording medium 1333 is also optional regarding the type of a removable medium, and accordingly may be a tape device, or may be a disc, or may be a memory card. It goes without saying that the recoding medium 1333 may be a non-contact IC card or the like.

Alternatively, the media drive 1323 and the recording medium 1333 may be configured so as to be integrated into a non-transportability recording medium, for example, such as a built-in hard disk drive, SSD (Solid State Drive), or the like.

The external interface 1319 is configured of, for example, a USB input/output terminal and so forth, and is connected to the printer 1334 in the event of performing printing of an image. Also, a drive 1331 is connected to the external interface 1319 according to need, on which the removable medium 1332 such as a magnetic disk, optical disc, or magneto-optical disk is mounted as appropriate, and a computer program read out therefrom is installed in the FLASH ROM 1324 according to need.

Further, the external interface 1319 includes a network interface to be connected to a predetermined network such as a LAN, the Internet, or the like. For example, in accordance with the instructions from the operating unit 1322, the controller 1321 can read out encoded data from the DRAM 1318, and supply this from the external interface 1319 to another device connected via the network. Also, the controller 1321 can obtain, via the external interface 1319, encoded data or image data supplied from another device via the network, and hold this in the DRAM 1318, or supply this to the image signal processing unit 1314.

The camera 1300 thus configured employs the image decoding device 200 as the decoder 1315. Accordingly, in the same way as with the image decoding device 200, the decoder 1315 can extract multiple slices worth of control information added to one slice header of the encoded data, and further can appropriately execute adaptive filter processing using that control information. As a result, suppression of deterioration of encoding efficiency due to local control of filter processing can be realized.

Accordingly, the camera 1300 can extract multiple slices worth of control information added to one slice header of the encoded data, and further can appropriately execute adaptive filter processing using that control information. As a result, the hard disk recorder 1200 can realize suppression of deterioration of encoding efficiency due to local control of filter processing regarding image data generated at the CCD/CMOS 1312, encoded data of video data read out from the dram 1318 or recording medium 1333, and encoded data of video data obtained via a network.

Also, the camera 1300 employs the image encoding device 100 as the encoder 1341. Accordingly, in the same way as with the case of the image encoding device 100, the encoder 1341 can suppress deterioration of encoding efficiency due to local control of filter processing. For example, multiple slices worth of control information added to one slice header of the encoded data are added, so encoding efficiency can be improved as compared to a case of embedding control information in each slice.

Accordingly, the camera 1300 can suppress deterioration in encoding efficiency due to local control of filter processing regarding the encoded data recorded in the DRAM 1318 or recording medium 1333, or encoded data to be provided to other devices, for example. As a result, the camera 1300 can use the storage region of the DRAM 1318 or recording medium 1333 more efficiently. Also, the camera 1300 can provide encoded data (image data) with good encoding efficiency to other devices.

Note that the decoding method of the image decoding device 200 may be applied to the decoding processing which the controller 1321 performs. In the same way, the encoding method of the image encoding device 100 may be applied to the encoding processing which the controller 1321 performs.

Also, the image data which the camera 1300 takes may be moving images or may be still images.

As a matter of course, the image encoding device 100 and image decoding device 200 may be applied to devices or systems other than the above-described devices.

Also, the size of macroblocks is not restricted to 16×16 pixels. Application can be made to macroblocks of various sizes, such as that of 32×32 pixels shown in FIG. 51, for example.

While description has been made above with flag information and the like being multiplexed (described) in the bit stream, flags and image data (or bit stream) may be transmitted (recorded), for example, besides being multiplexed. A form may be made where the flag and image data (or bit stream) are linked (added) as well.

Linking (adding) indicates a state in which image data (or bit streams) and flags are mutually linked (a correlated state), and the physical positional relation is arbitrary. For example, the image data (or bit stream) and flags may be transmitted over separate transmission paths. Also, the image data (or bit stream) and flags may each be recorded in separate recording mediums (or in separate recording areas within the same recording medium). Note that the increments in which image data (or bit streams) and flags are linked are optional, and may be set in increments of encoding processing (one frame, multiple frames, etc.), for example.

REFERENCE SIGNS LIST 100 image encoding device
112 control information generating unit
113 adaptive filter control unit
132 block information generating unit
141 processing object slice region identifying unit
142 ALF block setting unit
143 processing object ALF block region identifying unit
144 determining unit
145 filter block flag generating unit
171 control unit
172 adaptive filter
173 selecting unit
181 encoding unit
182 encoded data holding unit
183 control information holding unit
184 control information adding unit
200 image decoding device
202 lossless decoding unit
207 adaptive filter processing unit
221 control information extracting unit
222 decoding unit
223 decoded data holding unit
251 control unit
261 header analyzing unit
281 control information adding unit
291 flag adding unit
292 block size adding unit
293 filter coefficient adding unit
301 control information extracting unit
311 flag extracting unit
312 block size extracting unit
313 filter coefficient extracting unit

The invention claimed is:

1. An image processing device comprising:
circuitry configured to:
partition a frame of an image into a plurality of slices,
generate filter control information representing respective filter controls of each of said plurality of slices formed within said frame of the image; and
encode the image to generate encoded data including said filter control information, wherein said filter control information, which represents said respective filter controls of all slices of the plurality of slices, is included as syntax of the encoded data in a slice header of only one slice of the plurality of slices.

2. The image processing device according to claim 1, wherein the circuitry is further configured to set said filter control information to the slice header of only the one slice of the plurality of slices, which corresponds to a data increment of the encoded data of the frame which is first transmitted.

3. The image processing device according to claim 1, wherein the circuitry is further configured to set said filter control to the slice header of only the one slice of the plurality of slices that is a data increment situated at a start of the encoded data of said frame.

4. The image processing device according to claim 1, wherein the circuitry is further configured to set, to said slice header, a pointer indicating a position of said filter control information in said encoded data.

5. The image processing device according to claim 1, wherein a size of respective data increments is a size of the respective slices of the plurality of the slices forming said frame.

6. The image processing device according to claim 1, wherein said filter control information includes a filter coefficient for filter processing on the image based on the filter control information, a block size indicating a size of a region of a control block, and a flag indicating whether to perform said filter processing for each region of said control block.

7. The image processing device according to claim 1, wherein the circuitry is further configured to generate the filter control information to control filter processing performed for each slice of the plurality of slices.

8. The image processing device according to claim 7, wherein the circuitry is further configured to perform filter processing on a locally decoded image when performing an encoding process based on the filter control information.

9. An image processing method, comprising:
partitioning a frame of an image into a plurality of slices,
generating, by the circuitry, filter control information representing respective filter controls of each of said plurality of slices formed within said frame of the image; and
encoding, by the circuitry, said image to generate encoded data including said filter control information, wherein said filter control information, which represents said respective filter controls of all slices of said plurality of slices, is included as syntax of the encoded data in a slice header of only one slice of the plurality of slices.

10. The image processing method according to claim 9, further comprising deleting redundant portions of the filter control information in the slice header of the one slice of the plurality of slices.

* * * * *